(12) United States Patent
McDaniel et al.

(10) Patent No.: US 9,334,350 B2
(45) Date of Patent: *May 10, 2016

(54) LOW DENSITY POLYOLEFIN RESINS AND FILMS MADE THEREFROM

(71) Applicant: Chevron Phillips Chemical Company LP, The Woodlands, TX (US)

(72) Inventors: Max P. McDaniel, Bartlesville, OK (US); Ashish M. Sukhadia, Bartlesville, OK (US); Errun Ding, Bartlesville, OK (US); Chung Ching Tso, Bartlesville, OK (US); Albert P. Masino, Tulsa, OK (US); Qing Yang, Bartlesville, OK (US); Lloyd W. Guatney, Bartlesville, OK (US); Guylaine St. Jean, North Olmsted, OH (US); Daniel G. Hert, Owasso, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/639,582

(22) Filed: Mar. 5, 2015

(65) Prior Publication Data

US 2015/0175726 A1    Jun. 25, 2015

Related U.S. Application Data

(63) Continuation of application No. 14/072,828, filed on Nov. 6, 2013, now Pat. No. 9,006,367.

(60) Provisional application No. 61/723,335, filed on Nov. 7, 2012.

(51) Int. Cl.
| | |
|---|---|
| *C08F 210/02* | (2006.01) |
| *C08F 210/16* | (2006.01) |
| *C08F 210/14* | (2006.01) |

(Continued)

(52) U.S. Cl.
CPC ............. *C08F 210/16* (2013.01); *C08F 210/14* (2013.01); *C08J 5/18* (2013.01); *C08F 2500/05* (2013.01); *C08F 2500/08* (2013.01); *C08F 2500/09* (2013.01); *C08F 2500/12* (2013.01); *C08J 2323/08* (2013.01);
(Continued)

(58) Field of Classification Search
CPC ............... C08F 210/16; C08F 2410/03; C08F 2500/05; C08F 2500/08; C08F 2500/09; C08F 2500/12; C08F 2500/26
See application file for complete search history.

(56) References Cited

U.S. PATENT DOCUMENTS

| | | |
|---|---|---|
| 3,242,099 A | 3/1966 | Manyik |
| 3,248,179 A | 4/1966 | Norwood |

(Continued)

OTHER PUBLICATIONS

International Search Report and The Written Opinion of the International Searching Authority from International Application No. PCT/US2013/068785, dated Feb. 6, 2014, 9 pages.

(Continued)

*Primary Examiner* — Rip A Lee
(74) *Attorney, Agent, or Firm* — Merchant & Gould P.C.

(57) ABSTRACT

Disclosed herein are broad molecular weight distribution olefin polymers having densities in the 0.895 to 0.930 g/cm³ range, and with improved impact and tear resistance. These polymers can have a ratio of Mw/Mn in the 8 to 35 range, a high load melt index in the 4 to 50 range, less than about 0.008 LCB per 1000 total carbon atoms, and a reverse comonomer distribution.

26 Claims, 9 Drawing Sheets

(51) Int. Cl.
 *C08J 5/18* (2006.01)
 *C08L 23/08* (2006.01)

(52) U.S. Cl.
 CPC ........ *C08L 23/0815* (2013.01); *C08L 2205/02* (2013.01); *C08L 2205/025* (2013.01); *C08L 2314/06* (2013.01)

(56) References Cited

U.S. PATENT DOCUMENTS

| | | | |
|---|---|---|---|
| 4,060,480 A | 11/1977 | Reed | |
| 4,452,910 A | 6/1984 | Hopkins | |
| 4,501,885 A | 2/1985 | Sherk et al. | |
| 4,588,790 A | 5/1986 | Jenkins, III et al. | |
| 4,794,096 A | 12/1988 | Ewen | |
| 4,808,561 A | 2/1989 | Welborn | |
| 5,352,749 A | 10/1994 | DeChellis et al. | |
| 5,376,611 A | 12/1994 | Shveima | |
| 5,436,304 A | 7/1995 | Griffin et al. | |
| 5,455,314 A | 10/1995 | Burns et al. | |
| 5,565,175 A | 10/1996 | Hottovy et al. | |
| 5,575,979 A | 11/1996 | Hanson | |
| 5,576,259 A | 11/1996 | Hasegawa | |
| 5,739,220 A | 4/1998 | Shamshoum et al. | |
| 5,807,938 A | 9/1998 | Kaneko | |
| 5,919,983 A | 7/1999 | Rosen | |
| 6,107,230 A | 8/2000 | McDaniel et al. | |
| 6,165,929 A | 12/2000 | McDaniel et al. | |
| 6,239,235 B1 | 5/2001 | Hottovy et al. | |
| 6,262,191 B1 | 7/2001 | Hottovy et al. | |
| 6,294,494 B1 | 9/2001 | McDaniel et al. | |
| 6,300,271 B1 | 10/2001 | McDaniel et al. | |
| 6,316,553 B1 | 11/2001 | McDaniel et al. | |
| 6,355,594 B1 | 3/2002 | McDaniel et al. | |
| 6,376,415 B1 | 4/2002 | McDaniel et al. | |
| 6,388,017 B1 | 5/2002 | McDaniel et al. | |
| 6,391,816 B1 | 5/2002 | McDaniel et al. | |
| 6,395,666 B1 | 5/2002 | McDaniel et al. | |
| 6,524,987 B1 | 2/2003 | Collins et al. | |
| 6,548,441 B1 | 4/2003 | McDaniel et al. | |
| 6,548,442 B1 | 4/2003 | McDaniel et al. | |
| 6,576,583 B1 | 6/2003 | McDaniel et al. | |
| 6,613,712 B1 | 9/2003 | McDaniel et al. | |
| 6,632,894 B1 | 10/2003 | McDaniel et al. | |
| 6,667,274 B1 | 12/2003 | Hawley et al. | |
| 6,750,302 B1 | 6/2004 | McDaniel et al. | |
| 6,833,415 B2 | 12/2004 | Kendrick et al. | |
| 7,041,617 B2 * | 5/2006 | Jensen | C08F 10/00 502/113 |
| 7,119,153 B2 * | 10/2006 | Jensen | C08F 10/00 502/103 |
| 7,226,886 B2 | 6/2007 | Jayaratne et al. | |
| 7,300,983 B2 | 11/2007 | Degroot et al. | |
| 7,312,283 B2 * | 12/2007 | Martin | C08F 10/00 502/103 |
| 7,517,939 B2 | 4/2009 | Yang et al. | |
| 7,619,047 B2 | 11/2009 | Yang et al. | |
| 7,632,907 B2 | 12/2009 | Sukhadia et al. | |
| 7,652,160 B2 | 1/2010 | Yang et al. | |
| 7,732,542 B2 | 6/2010 | Yang et al. | |
| 7,829,646 B2 | 11/2010 | DesLauriers et al. | |
| 7,884,163 B2 | 2/2011 | McDaniel et al. | |
| 7,884,165 B2 | 2/2011 | McDaniel et al. | |
| 7,960,487 B2 | 6/2011 | Yang et al. | |
| 8,110,640 B2 | 2/2012 | McDaniel et al. | |
| 8,114,946 B2 * | 2/2012 | Yang | C08F 210/16 526/126 |
| 8,138,113 B2 | 3/2012 | Yang et al. | |
| 8,153,043 B2 | 4/2012 | Krishnaswamy et al. | |
| 8,153,734 B2 | 4/2012 | Michel et al. | |
| 8,242,221 B2 | 8/2012 | McDaniel et al. | |
| 8,268,944 B2 | 9/2012 | Yang et al. | |
| 8,288,487 B2 | 10/2012 | Yang et al. | |
| 8,309,485 B2 | 11/2012 | Yang et al. | |
| 8,309,748 B2 | 11/2012 | Ding et al. | |
| 8,476,394 B2 | 7/2013 | St. Jean et al. | |
| 8,912,285 B2 | 12/2014 | Yang et al. | |
| 9,006,367 B2 * | 4/2015 | McDaniel et al. | 526/348 |
| 9,156,970 B2 | 10/2015 | Hlavinka et al. | |
| 9,169,337 B2 | 10/2015 | Rohatgi et al. | |
| 2004/0059070 A1 | 3/2004 | Whitte et al. | |
| 2007/0043176 A1 | 2/2007 | Martin et al. | |
| 2007/0043182 A1 | 2/2007 | Martin et al. | |
| 2012/0271016 A1 | 10/2012 | O'Hare et al. | |
| 2012/0329641 A1 | 12/2012 | Yang et al. | |
| 2013/0085060 A1 | 4/2013 | Ding et al. | |
| 2014/0088274 A1 * | 3/2014 | Ding | C08F 4/65904 526/113 |
| 2014/0163181 A1 | 6/2014 | Yang et al. | |
| 2014/0342141 A1 | 11/2014 | Cui et al. | |
| 2015/0126692 A1 | 5/2015 | Sukhadia et al. | |
| 2015/0259455 A1 | 9/2015 | Hlavinka et al. | |

OTHER PUBLICATIONS

U.S. Patent Application filed Nov. 6, 2013, entitled "Low Density Polyolefin Resins With Low Molecular Weight and High Molecular Weight Components, and Films Made Therefrom," having U.S. Appl. No. 14/072,819.
Pinnavaia, "Intercalated Clay Catalysts," Science, 1983, 220(4595), pp. 365-371.
Thomas, "Sheet Silicate Intercalates: New Agents for Unusual Chemical Conversions," Intercalation Chemistry (S. Whittington and A. Jacobson, eds.), Academic Press, Inc. Ch. 3, 1972, pp. 55-99.
Li, et al., "Coordination Copolymerization of Severely Encumbered Isoalkenes with Ethylene: Enhanced Enchainment Mediated by Binuclear Catalysts and Cocatalysts," JACS Articles, 2005, 127, 14756-14768.
Modern Plastics Encyclopedia, Mid-Nov. 1995 Issue, vol. 72, No. 12, 3 pages.
Film Extrusion Manual—Process, Materials, Properties, TAPPI Press, 1992, 16 pages.
C. A. Hieber, et al., "Some Correlations Involving the Shear Viscosity of Polystyrene Melts," Rheol. Acta, 28, (1989), pp. 321-332.
C.A. Hieber, et al., Shear-Rate-Dependence Modeling of Polymer Melt Viscosity, *Polymer Engineering and Science*, (1992), vol. 32, No. 14, pp. 931-938.
R. B. Bird, et al, "*Dynamics of Polymeric Liquids*," vol. 1, Fluid Mechanics, 2nd Edition, John Wiley & Sons (1987), pp. 170-172.
Janzen, et al., "Diagnosing Long-Chain Branching in Polyethylenes," Journal of Molecular Structure, (1999), pp. 485-486, 569-584.
Wyatt, Philip J., "Light Scattering and the Absolute Characterization of Macromolecules," published in *Analytica Chimica Acta*, 272 (1993), Elsevier Science Publishers B.V., Amsterdam, pp. 1-40.
Arnett, Raymond, L., "Zero-Shear Viscosity of Some Ethyl Branched Paraffinic Model Polymers," J. Phys. Chem. (1980), vol. 84, pp. 649-652.
Y. Yu, et al., "Long Chain Branches in Metallocene-Catalyzed Polyethylene Determined by a Combination of SEC/Multi-Angle Lights Scattering, NMR and Rheology," *Polymer Preprints*, (2003), 44, pp. 49-50.

* cited by examiner

LOW DENSITY POLYOLEFIN RESINS AND FILMS MADE THEREFROM

REFERENCE TO RELATED APPLICATIONS

This application is a continuation application of U.S. patent application Ser. No. 14/072,828, filed on Nov. 6, 2013, now U.S. Pat. No. 9,006,367, which claims the benefit of U.S. Provisional Application Ser. No. 61/723,335, filed on Nov. 7, 2012, the disclosures of which are incorporated herein by reference in their entirety.

BACKGROUND OF THE INVENTION

The linear polyethylene film market is mainly composed of two major types of film resins: linear low density polyethylene (LLDPE) and high density, high molecular weight polyethylene (HMWPE). LLDPE grades typically have a density of 0.913 to 0.928 g/cm$^3$ and a narrow molecular weight distribution. Most of these resins are made with Ziegler catalysts, which often yield a polydispersity (Mw/Mn) of 3.5 to 5. However, a smaller segment of this group is made with metallocene catalysts, which typically produce a polydispersity of 2 to 4. Because polymers with a narrow molecular weight distribution have poor melt strength and are more difficult to extrude, LLDPE film resins typically have a relatively high melt index, such as 0.8 to 3 g/10 min, and are blown into films of about a 1-mil thickness with a wide die gap, near zero frostline height (also called "in the pocket"), and a low blow-up ratio. These conditions are usually referred to as "low density conditions" or "LLDPE conditions."

In contrast, HMWPE grades have a high density, typically 0.948 to 0.955 g/cm$^3$, and a broad molecular weight distribution, which permits easy processing at very high molecular weight. The molten polymer has excellent melt strength, and the high molecular weight results in improved physical properties, including toughness and tear resistance. Typically, these polymers have a high load melt index (HLMI) of 5 to 15 g/10 min, and a polydispersity of greater than 20. The broad molecular weight distribution and high molecular weight means that these films have higher melt strength and can be blown more easily, and line conditions known as "high density conditions" often are chosen, which are quite different from the "low density conditions" described above. Generally, the die gap is smaller, the blow-up ratio is greater, and the frostline height is quite high, producing a large expanded bubble during the film blowing process.

HMWPE film grades usually have a bimodal molecular weight distribution. Normally, a Ziegler catalyst is passed through two reaction zones to produce two narrow molecular weight distribution components, one of higher molecular weight and the other of lower molecular weight. When the branching is concentrated into the higher molecular weight component, film strength is usually improved. Thus, these polymers tend to have most of the branching in the long chains. In contrast, LLDPE film grades tend to have more branching (or at least an equal amount) in the lower molecular weight part of the molecular weight distribution.

The high density of HMWPE films means that they often have higher modulus and yield strength than LLDPE films. Accordingly, HMWPE films can be much less prone to sag and stretch when loaded, such as when formed into a plastic bag. However, the higher molecular weight and the different blowing conditions tend to introduce more orientation into HMWPE films, compared to LLDPE films. Higher orientation can produce unbalanced tear resistance. That is, resistance to tear in the transverse direction (TD) is much higher than LLDPE films, whereas resistance to tear in the machine direction (MD) generally is much worse. This can be an advantage, or a disadvantage, depending on the end-use application. Although the higher molecular weight of HMWPE resins tends to increase puncture resistance, the higher density tends to diminish it. Thus, puncture resistance can sometimes be comparable to LLDPE, although this depends on the choice of samples being compared.

In sum, it would be beneficial to produce LLDPE polymers having the broad molecular weight distribution and higher molecular weight normally associated with HMWPE film resins, but with densities (e.g., 0.910-0.926 g/cm$^3$) normally associated with LLDPE film resins. Accordingly, it is to these ends that the present invention is directed.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

The present invention generally relates to new catalyst compositions, methods for preparing catalyst compositions, methods for using the catalyst compositions to polymerize olefins, the polymer resins produced using such catalyst compositions, and articles produced using these polymer resins. In particular, aspects of the present invention are directed to catalyst compositions employing two catalyst components. The first catalyst component can comprise a single atom bridged metallocene compound with an alkenyl substituent, while the second catalyst component can comprise an unbridged zirconium or hafnium based metallocene compound, or a two carbon bridged, zirconium based metallocene compound containing two indenyl groups. Such catalyst compositions can be used to produce, for example, ethylene-based copolymers having broad molecular weight distributions and low densities.

In one aspect, a catalyst composition is disclosed which can comprise catalyst component I comprising a single atom bridged metallocene compound with an alkenyl substituent; catalyst component II comprising an unbridged zirconium or hafnium based metallocene compound, or a two carbon bridged, zirconium based metallocene compound containing two indenyl groups; and an activator-support. Optionally, this catalyst composition can further comprise a co-catalyst.

The present invention also contemplates and encompasses olefin polymerization processes. Such processes can comprise contacting a catalyst composition with an olefin monomer and an olefin comonomer under polymerization conditions to produce an olefin polymer. Generally, the catalyst composition employed can comprise any of the catalyst component I single atom bridged metallocene compounds, any of the catalyst component II metallocene compounds, and any of the activator-supports and optional co-catalysts disclosed herein. For example, organoaluminum compounds can be utilized in the catalyst compositions and/or polymerization processes.

Polymers produced from the polymerization of olefins, resulting in homopolymers, copolymers, terpolymers, etc., can be used to produce various articles of manufacture. A representative and non-limiting example of an olefin polymer (e.g., an ethylene copolymer) consistent with aspects of this invention can comprise a higher molecular weight component and a lower molecular weight component, and this olefin polymer can have a density of less than about 0.930 g/cm$^3$, a ratio of Mw/Mn in a range from about 6 to about 50, a HLMI in a range from about 4 to about 50 g/10 min, and less than about 0.008 LCB per 1000 total carbon atoms (less than about 8 LCB per 1,000,000 total carbon atoms). Another representative and non-limiting example of an olefin polymer (e.g., an ethylene copolymer) consistent with aspects of this invention can comprise a higher molecular weight component and a lower molecular weight component, and this olefin polymer can have a density in a range from about 0.895 to about 0.930 g/cm$^3$, a ratio of Mw/Mn in a range from about 8 to about 35, a HLMI in a range from about 4 to about 50 g/10 min, less than about 0.008 LCB per 1000 total carbon atoms, and a reverse comonomer distribution.

Both the foregoing summary and the following detailed description provide examples and are explanatory only. Accordingly, the foregoing summary and the following detailed description should not be considered to be restrictive. Further, features or variations may be provided in addition to those set forth herein. For example, certain aspects and embodiments may be directed to various feature combinations and sub-combinations described in the detailed description.

DEFINITIONS

Figure 1:
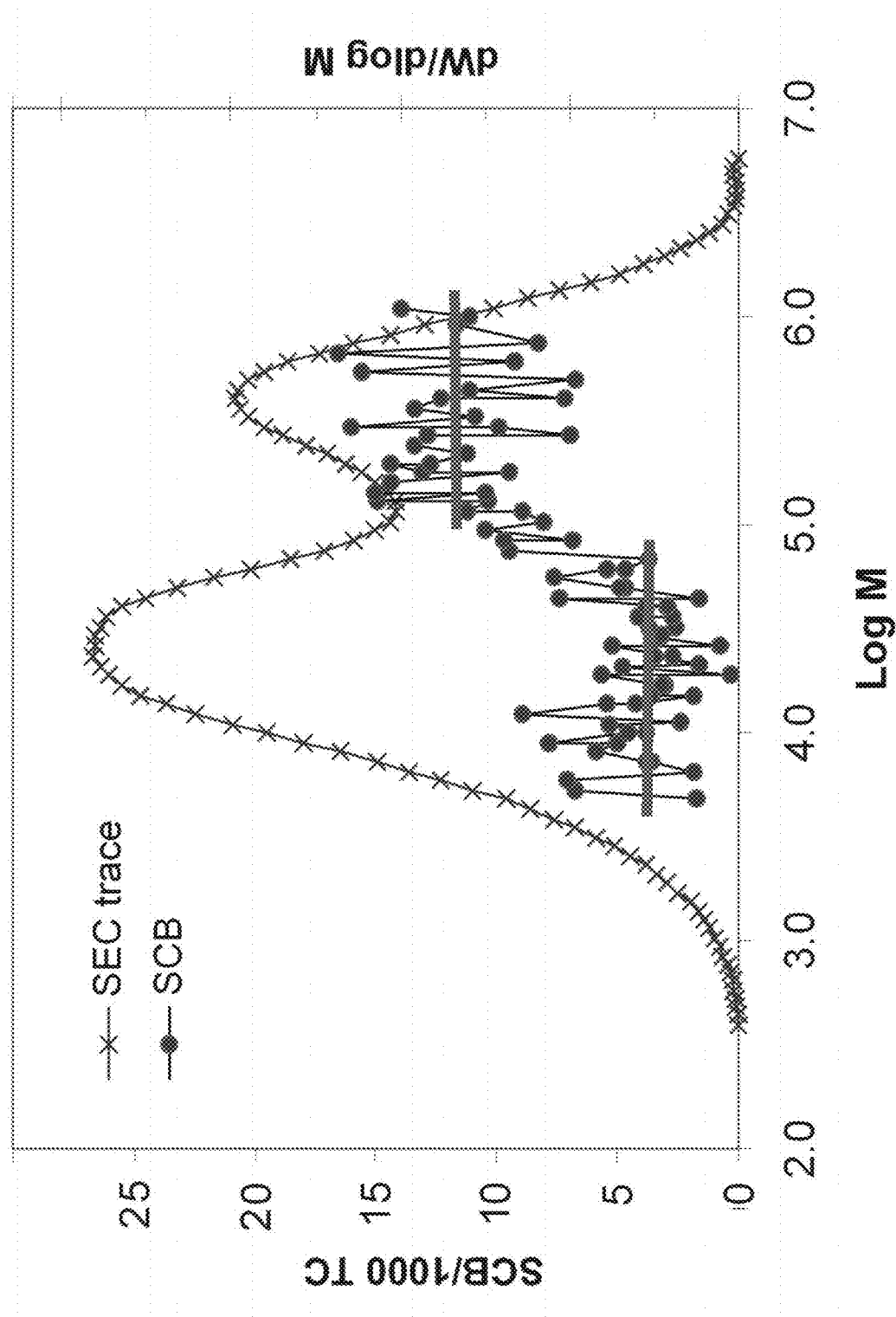
FIG. 1 presents a plot of the expected molecular weight distribution and short chain branch distribution of the polymer of Constructive Example 2.
Figure 2:
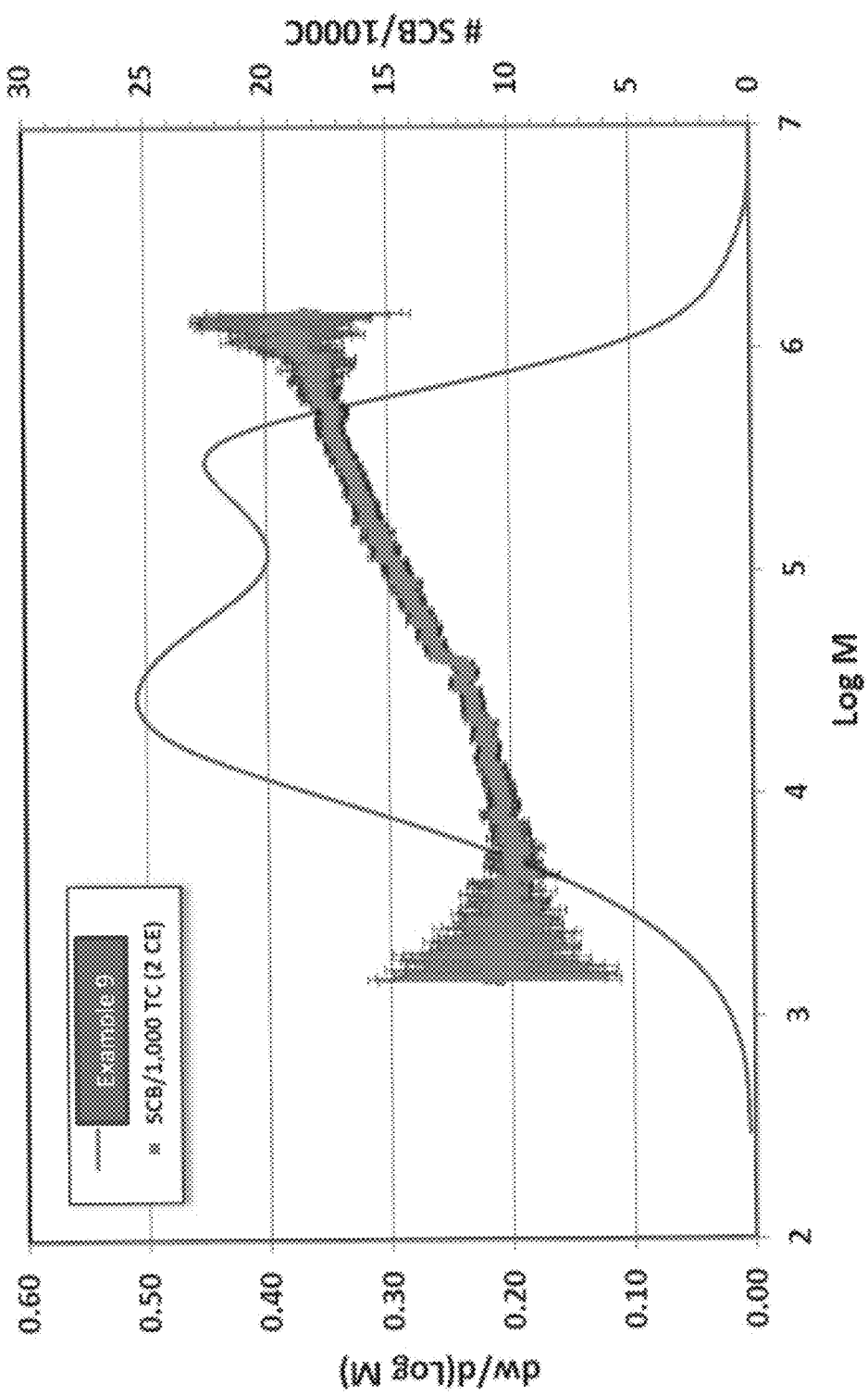
FIG. 2 presents a plot of the molecular weight distribution and short chain branch distribution of the polymer of Example 9.
Figure 3:
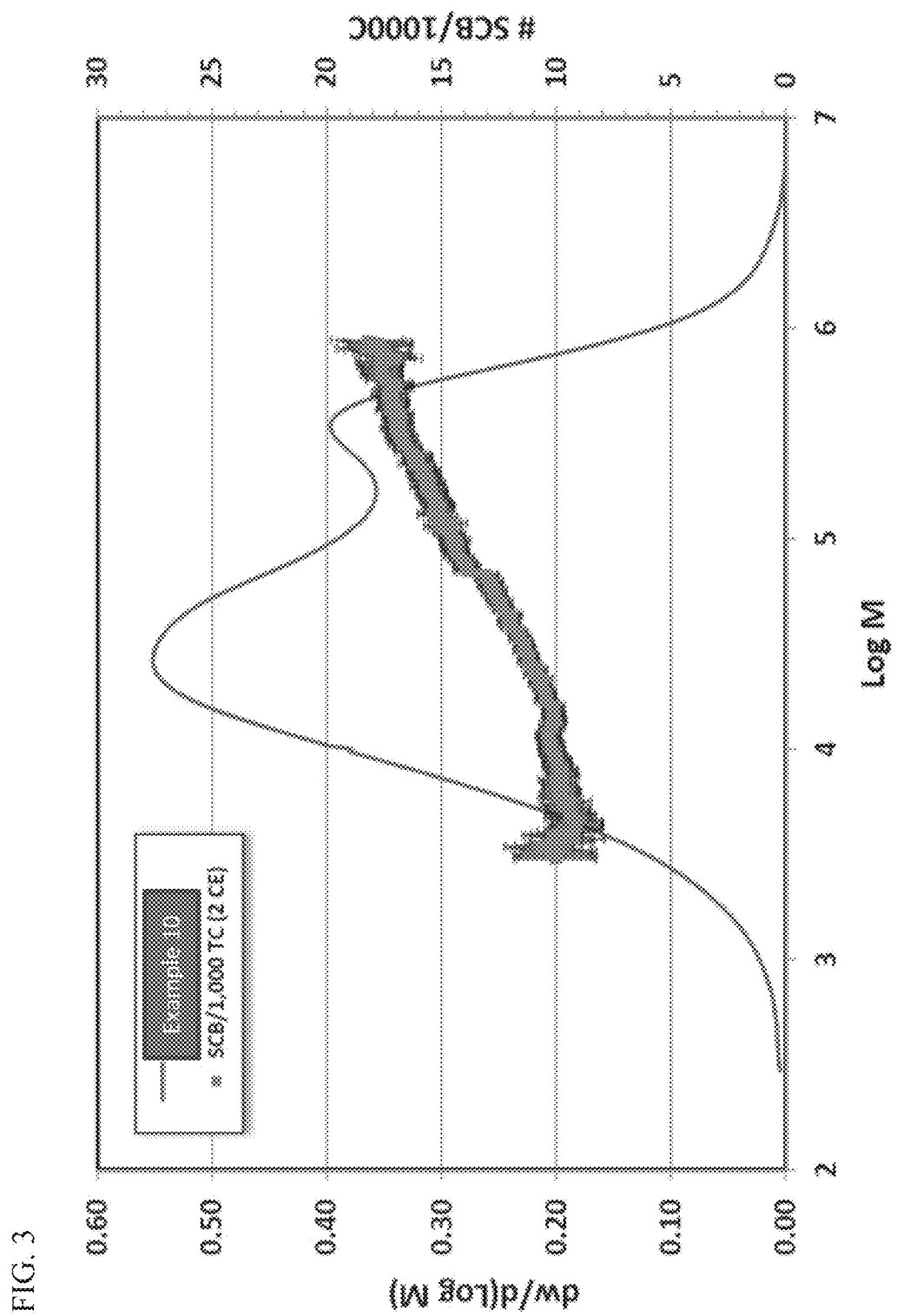
FIG. 3 presents a plot of the molecular weight distribution and short chain branch distribution of the polymer of Example 10.
Figure 4:
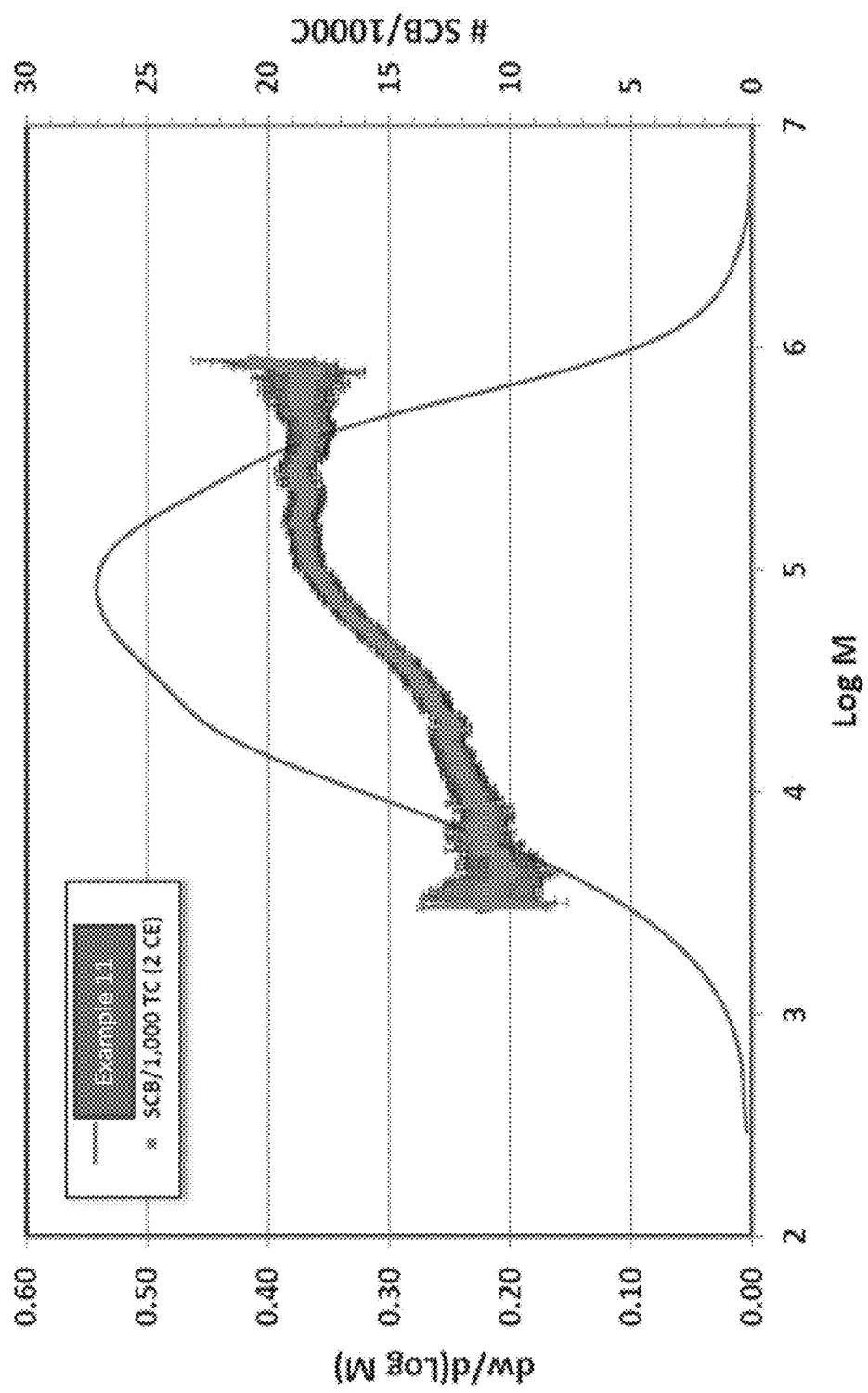
FIG. 4 presents a plot of the molecular weight distribution and short chain branch distribution of the polymer of Example 11.
Figure 5:
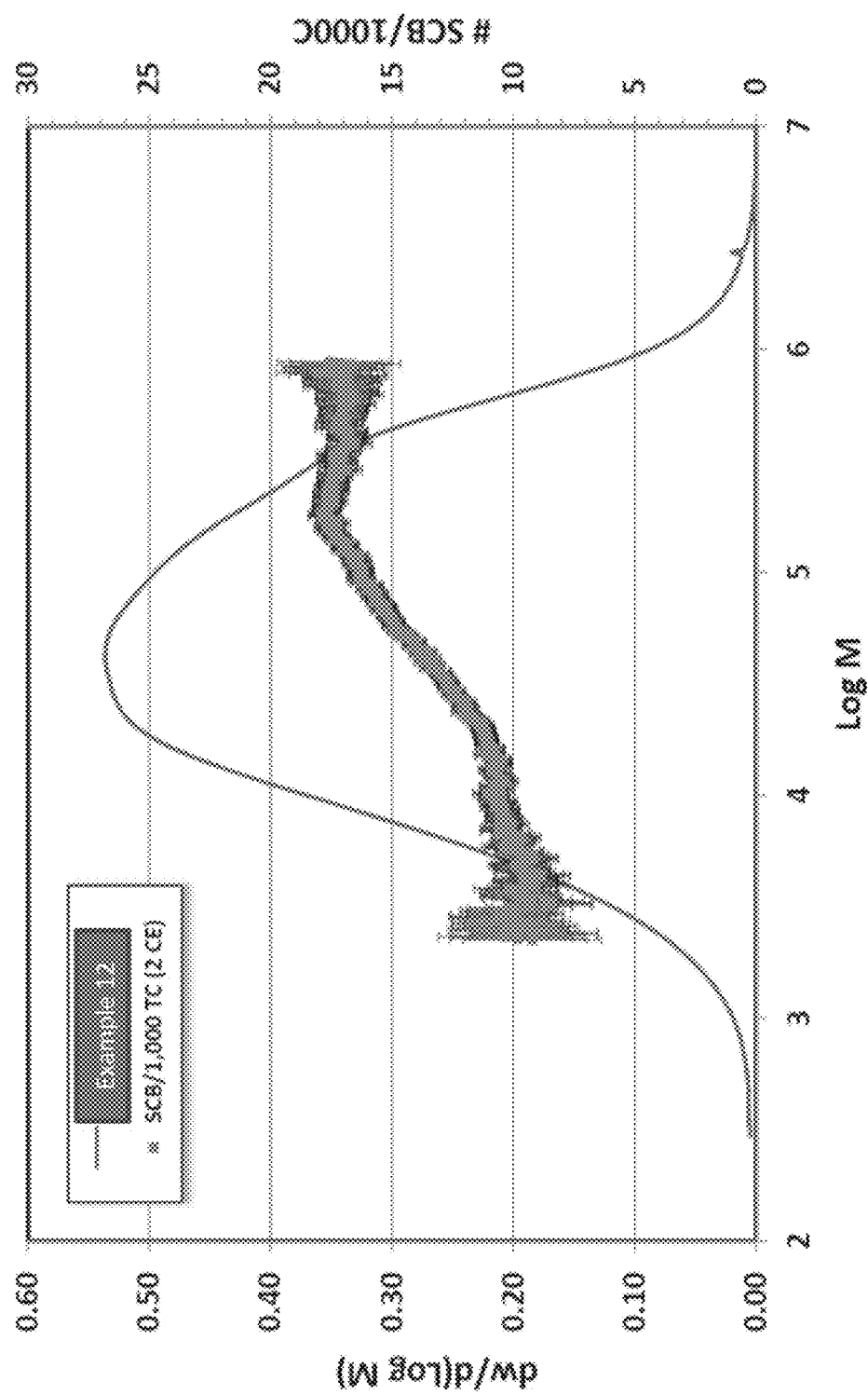
FIG. 5 presents a plot of the molecular weight distribution and short chain branch distribution of the polymer of Example 12.
Figure 6:
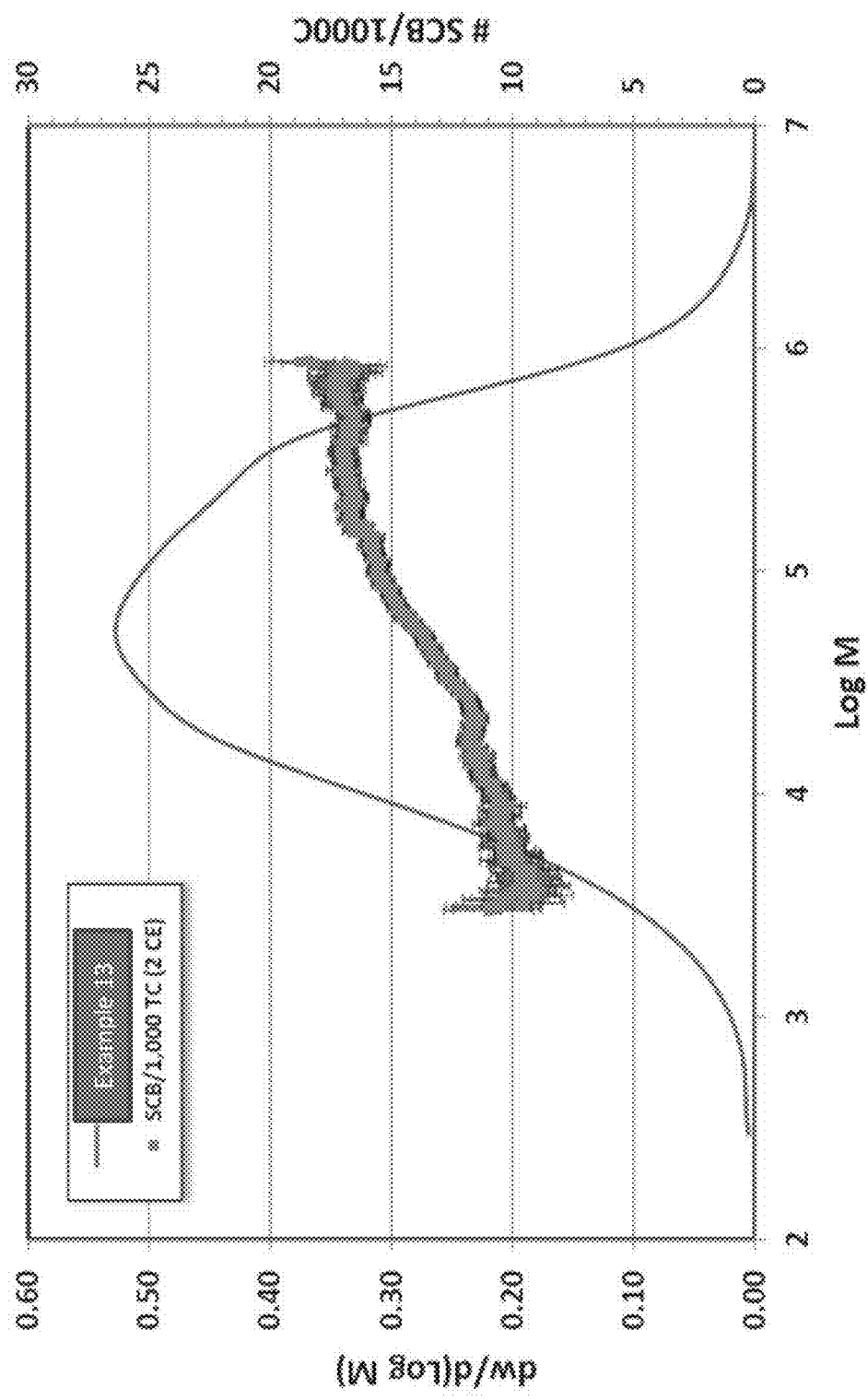
FIG. 6 presents a plot of the molecular weight distribution and short chain branch distribution of the polymer of Example 13.
Figure 7:
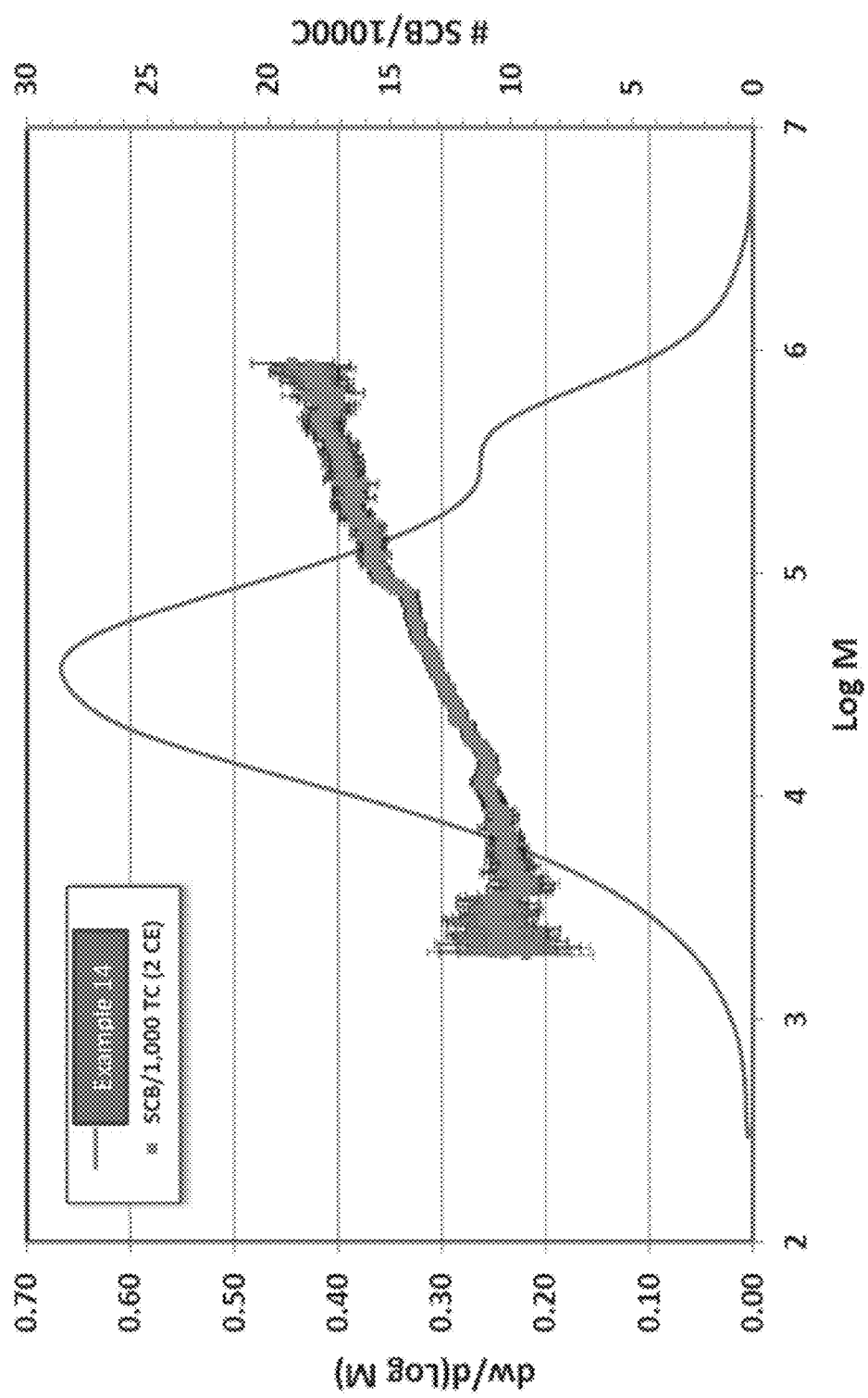
FIG. 7 presents a plot of the molecular weight distribution and short chain branch distribution of the polymer of Example 14.
Figure 8:
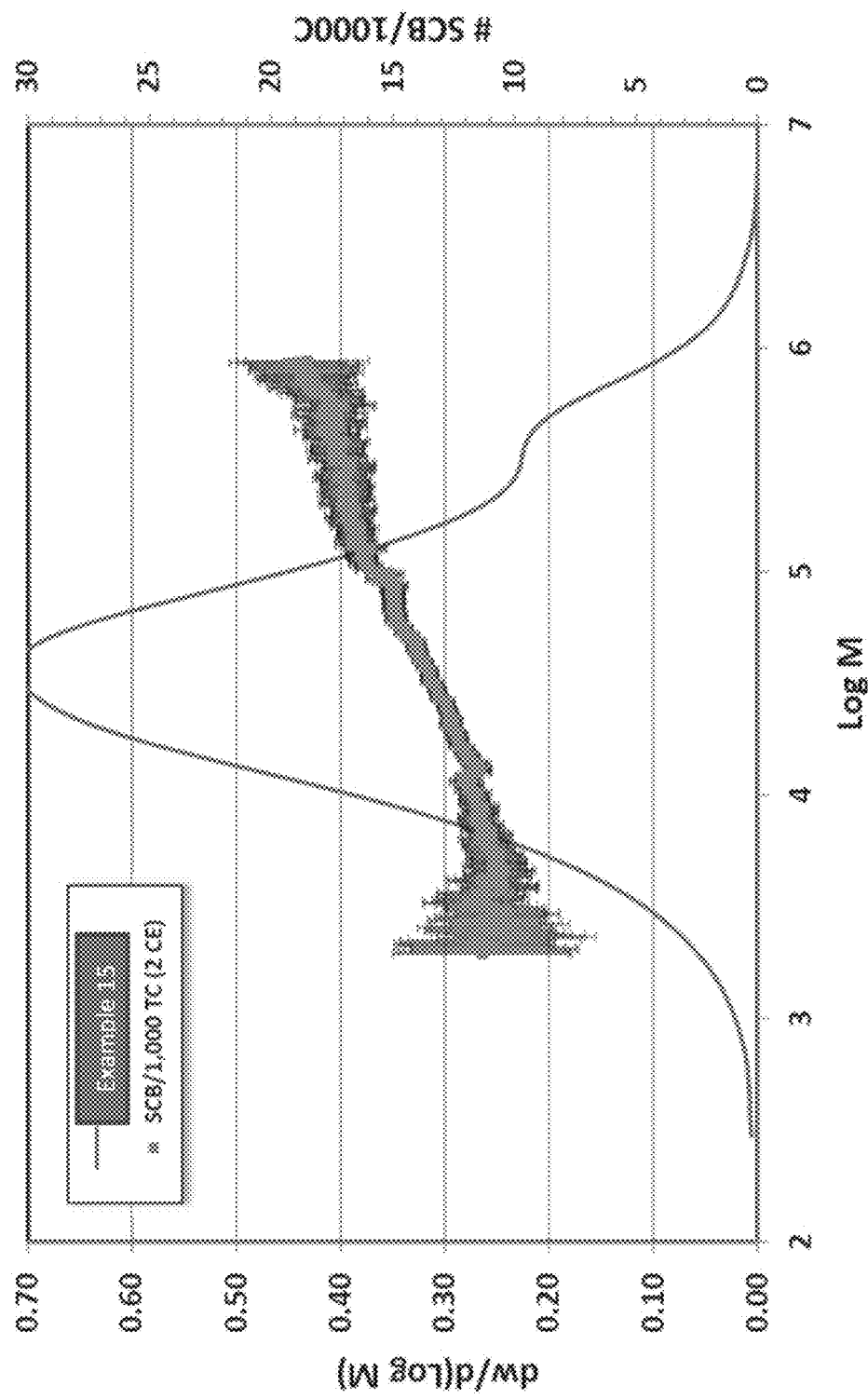
FIG. 8 presents a plot of the molecular weight distribution and short chain branch distribution of the polymer of Example 15.
Figure 9:
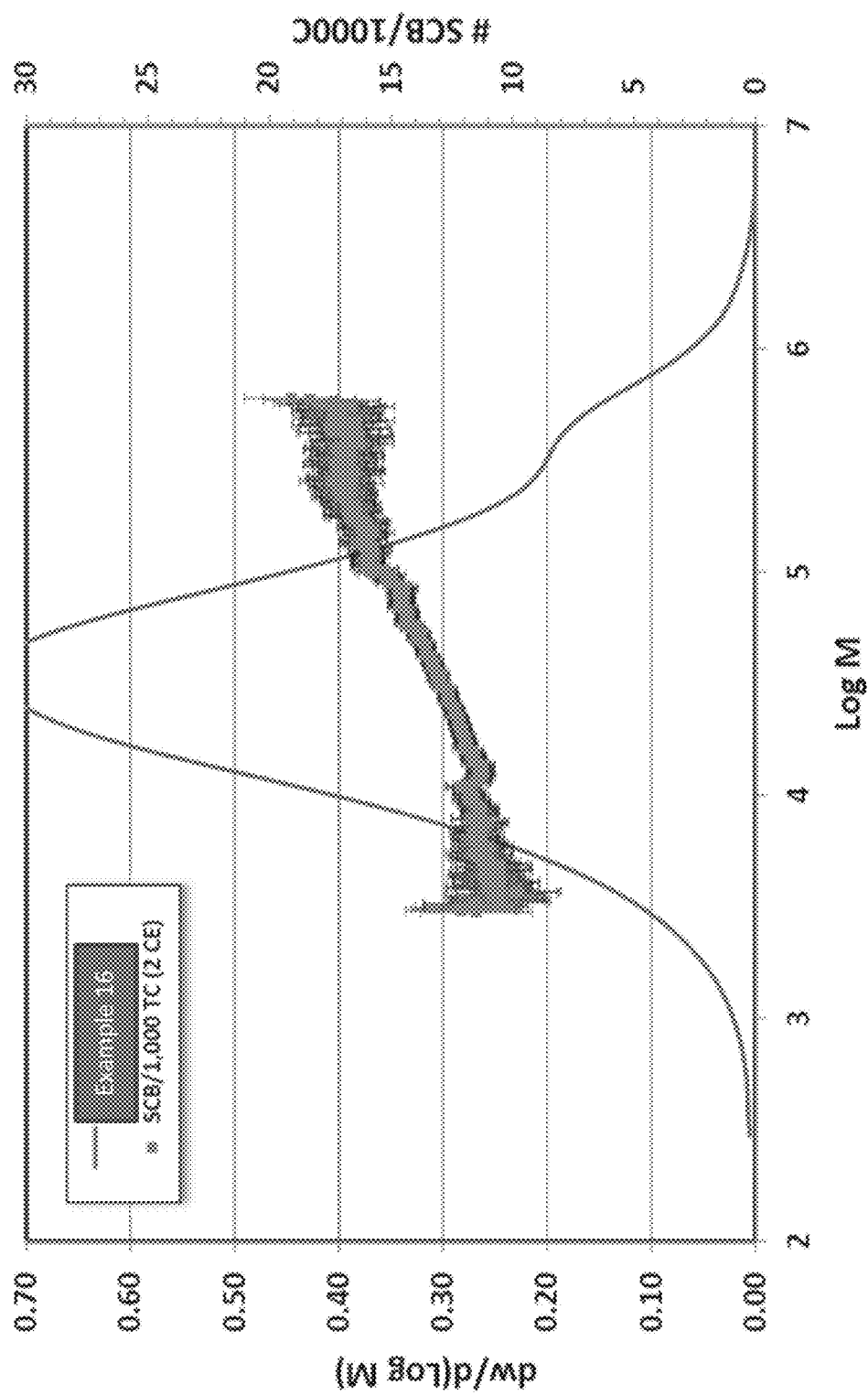
FIG. 9 presents a plot of the molecular weight distribution and short chain branch distribution of the polymer of Example 16.

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, 2nd Ed (1997) can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Regarding claim transitional terms or phrases, the transitional term "comprising," which is synonymous with "including," "containing," or "characterized by," is open-ended and does not exclude additional, unrecited elements or method steps. The transitional phrase "consisting of" excludes any element, step, or ingredient not specified in the claim. The transitional phrase "consisting essentially of" limits the scope of a claim to the specified components or steps and those that do not materially affect the basic and novel characteristic(s) of the claimed invention. A "consisting essentially of" claim occupies a middle ground between closed claims that are written in a "consisting of" format and fully open claims that are drafted in a "comprising" format. For example, a feedstock consisting essentially of component A can include impurities typically present in a commercially produced or commercially available sample of component A. When a claim includes different features and/or feature classes (for example, a method step, feedstock features, and/or product features, among other possibilities), the transitional terms comprising, consisting essentially of, and consisting of, apply only to the feature class to which it is utilized and it is possible to have different transitional terms or phrases utilized with different features within a claim. For example, a method can consist of certain steps, but utilize a catalyst system comprising recited components and other non-recited components. While compositions and methods are described herein in terms of "comprising" various components or steps, the compositions and methods can also "consist essentially of" or "consist of" the various components or steps, unless stated otherwise. For example, a catalyst composition consistent with aspects of the present invention can comprise; alternatively, can consist essentially of; or alternatively, can consist of; (i) catalyst component I, (ii) catalyst component II, (iii) an activator, and (iv) optionally, a co-catalyst.

The terms "a," "an," "the," etc., are intended to include plural alternatives, e.g., at least one, unless otherwise specified. For instance, the disclosure of "an activator-support" or "a metallocene compound" is meant to encompass one, or mixtures or combinations of more than one, activator-support or metallocene compound, respectively, unless otherwise specified.

Groups of elements are indicated using the numbering scheme indicated in the version of the periodic table of elements published in *Chemical and Engineering News*, 63(5), 27, 1985. In some instances, a group of elements can be indicated using a common name assigned to the group; for example, alkali metals for Group 1 elements, alkaline earth metals for Group 2 elements, transition metals for Group 3-12 elements, and halogens or halides for Group 17 elements.

For any particular compound disclosed herein, the general structure or name presented is also intended to encompass all structural isomers, conformational isomers, and stereoisomers that can arise from a particular set of substituents, unless indicated otherwise. Thus, a general reference to a compound includes all structural isomers unless explicitly indicated otherwise; e.g., a general reference to pentane includes n-pentane, 2-methyl-butane, and 2,2-dimethylpropane, while a general reference to a butyl group includes an n-butyl group, a sec-butyl group, an iso-butyl group, and a tert-butyl group. Additionally, the reference to a general structure or name encompasses all enantiomers, diastereomers, and other optical isomers whether in enantiomeric or racemic forms, as well as mixtures of stereoisomers, as the context permits or requires. For any particular formula or name that is presented, any general formula or name presented also encompasses all conformational isomers, regioisomers, and stereoisomers that can arise from a particular set of substituents.

A chemical "group" is described according to how that group is formally derived from a reference or "parent" compound, for example, by the number of hydrogen atoms formally removed from the parent compound to generate the group, even if that group is not literally synthesized in this manner. These groups can be utilized as substituents or coordinated or bonded to metal atoms. By way of example, an "alkyl group" formally can be derived by removing one hydrogen atom from an alkane, while an "alkylene group" formally can be derived by removing two hydrogen atoms from an alkane. Moreover, a more general term can be used to encompass a variety of groups that formally are derived by removing any number ("one or more") of hydrogen atoms from a parent compound, which in this example can be described as an "alkane group," and which encompasses an "alkyl group," an "alkylene group," and materials have three or more hydrogen atoms, as necessary for the situation, removed from the alkane. The disclosure that a substituent, ligand, or other chemical moiety can constitute a particular "group" implies that the well-known rules of chemical structure and bonding are followed when that group is employed as described. When describing a group as being "derived by," "derived from," "formed by," or "formed from," such terms are used in a formal sense and are not intended to reflect any specific synthetic method or procedure, unless specified otherwise or the context requires otherwise.

The term "substituted" when used to describe a group, for example, when referring to a substituted analog of a particular group, is intended to describe any non-hydrogen moiety that formally replaces a hydrogen in that group, and is intended to be non-limiting. A group or groups can also be referred to herein as "unsubstituted" or by equivalent terms such as "non-substituted," which refers to the original group in which a non-hydrogen moiety does not replace a hydrogen within that group. Unless otherwise specified, "substituted" is intended to be non-limiting and include inorganic substituents or organic substituents as understood by one of ordinary skill in the art.

The term "hydrocarbon" whenever used in this specification and claims refers to a compound containing only carbon and hydrogen. Other identifiers can be utilized to indicate the presence of particular groups in the hydrocarbon (e.g., halogenated hydrocarbon indicates that the presence of one or more halogen atoms replacing an equivalent number of hydrogen atoms in the hydrocarbon). The term "hydrocarbyl group" is used herein in accordance with the definition specified by IUPAC: a univalent group formed by removing a hydrogen atom from a hydrocarbon (that is, a group containing only carbon and hydrogen). Non-limiting examples of hydrocarbyl groups include ethyl, phenyl, tolyl, propenyl, and the like. Similarly, a "hydrocarbylene group" refers to a group formed by removing two hydrogen atoms from a hydrocarbon, either two hydrogen atoms from one carbon atom or one hydrogen atom from each of two different carbon atoms. Therefore, in accordance with the terminology used herein, a "hydrocarbon group" refers to a generalized group formed by removing one or more hydrogen atoms (as necessary for the particular group) from a hydrocarbon. A "hydrocarbyl group," "hydrocarbylene group," and "hydrocarbon group" can be aliphatic or aromatic, acyclic or cyclic, and/or linear or branched. A "hydrocarbyl group," "hydrocarbylene group," and "hydrocarbon group" can include rings, ring systems, aromatic rings, and aromatic ring systems, which contain only carbon and hydrogen. "Hydrocarbyl groups," "hydrocarbylene groups," and "hydrocarbon groups" include, by way of example, aryl, arylene, arene groups, alkyl, alkylene, alkane group, cycloalkyl, cycloalkylene, cycloalkane groups, aralkyl, aralkylene, and aralkane groups, respectively, among other groups as members.

An aliphatic compound is a class of acyclic or cyclic, saturated or unsaturated, carbon compounds, excluding aromatic compounds, e.g., an aliphatic compound is a non-aromatic organic compound. An "aliphatic group" is a generalized group formed by removing one or more hydrogen atoms (as necessary for the particular group) from a carbon atom of an aliphatic compound. Aliphatic compounds and therefore aliphatic groups can contain organic functional group(s) and/or atom(s) other than carbon and hydrogen.

The term "alkane" whenever used in this specification and claims refers to a saturated hydrocarbon compound. Other identifiers can be utilized to indicate the presence of particular groups in the alkane (e.g., halogenated alkane indicates that the presence of one or more halogen atoms replacing an equivalent number of hydrogen atoms in the alkane). The term "alkyl group" is used herein in accordance with the definition specified by IUPAC: a univalent group formed by removing a hydrogen atom from an alkane. Similarly, an "alkylene group" refers to a group formed by removing two hydrogen atoms from an alkane (either two hydrogen atoms from one carbon atom or one hydrogen atom from two different carbon atoms). An "alkane group" is a general term that refers to a group formed by removing one or more hydrogen atoms (as necessary for the particular group) from an alkane. An "alkyl group," "alkylene group," and "alkane group" can be acyclic or cyclic and/or linear or branched unless otherwise specified. Primary, secondary, and tertiary alkyl groups are derived by removal of a hydrogen atom from a primary, secondary, and tertiary carbon atom, respectively, of an alkane. The n-alkyl group can be derived by removal of a hydrogen atom from a terminal carbon atom of a linear alkane. The groups $RCH_2$ ($R \neq H$), $R_2CH$ ($R \neq H$), and $R_3C$ ($R \neq H$) are primary, secondary, and tertiary alkyl groups, respectively.

A cycloalkane is a saturated cyclic hydrocarbon, with or without side chains, for example, cyclobutane. Other identifiers can be utilized to indicate the presence of particular groups in the cycloalkane (e.g., halogenated cycloalkane indicates that the presence of one or more halogen atoms replacing an equivalent number of hydrogen atoms in the cycloalkane). Unsaturated cyclic hydrocarbons having one endocyclic double or one triple bond are called cycloalkenes and cycloalkynes, respectively. Those having more than one such multiple bond are cycloalkadienes, cycloalkatrienes, and so forth. Other identifiers can be utilized to indicate the presence of particular groups in the cycloalkenes, cycloalkadienes, cycloalkatrienes, and so forth.

A "cycloalkyl group" is a univalent group derived by removing a hydrogen atom from a ring carbon atom of a cycloalkane. For example, a 1-methylcyclopropyl group and a 2-methylcyclopropyl group are illustrated as follows.

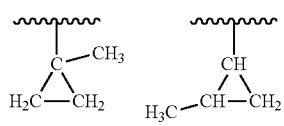

Similarly, a "cycloalkylene group" refers to a group derived by removing two hydrogen atoms from a cycloalkane, at least one of which is a ring carbon. Thus, a "cycloalkylene group"

includes a group derived from a cycloalkane in which two hydrogen atoms are formally removed from the same ring carbon, a group derived from a cycloalkane in which two hydrogen atoms are formally removed from two different ring carbons, and a group derived from a cycloalkane in which a first hydrogen atom is formally removed from a ring carbon and a second hydrogen atom is formally removed from a carbon atom that is not a ring carbon. A "cycloalkane group" refers to a generalized group formed by removing one or more hydrogen atoms (as necessary for the particular group and at least one of which is a ring carbon) from a cycloalkane.

The term "alkene" whenever used in this specification and claims refers a linear or branched hydrocarbon olefin that has one carbon-carbon double bond and the general formula $C_nH_{2n}$. Alkadienes refer to a linear or branched hydrocarbon olefin having two carbon-carbon double bonds and the general formula $C_nH_{2n-2}$, and alkatrienes refer to linear or branched hydrocarbon olefins having three carbon-carbon and the general formula $C_nH_{2n-4}$. Alkenes, alkadienes, and alkatrienes can be further identified by the position of the carbon-carbon double bond(s). Other identifiers can be utilized to indicate the presence or absence of particular groups within an alkene, alkadiene, or alkatriene. For example, a haloalkene refers to an alkene having one or more hydrogen atoms replace with a halogen atom.

An "alkenyl group" is a univalent group derived from an alkene by removal of a hydrogen atom from any carbon atom of the alkene. Thus, "alkenyl group" includes groups in which the hydrogen atom is formally removed from an $sp^2$ hybridized (olefinic) carbon atom and groups in which the hydrogen atom is formally removed from any other carbon atom. For example and unless otherwise specified, 1-propenyl (—CH═CHCH$_3$), 2-propenyl[(CH$_3$)C═CH$_2$], and 3-propenyl (—CH$_2$CH═CH$_2$) groups are encompassed with the term "alkenyl group." Similarly, an "alkenylene group" refers to a group formed by formally removing two hydrogen atoms from an alkene, either two hydrogen atoms from one carbon atom or one hydrogen atom from two different carbon atoms. An "alkene group" refers to a generalized group formed by removing one or more hydrogen atoms (as necessary for the particular group) from an alkene. When the hydrogen atom is removed from a carbon atom participating in a carbon-carbon double bond, the regiochemistry of the carbon from which the hydrogen atom is removed, and regiochemistry of the carbon-carbon double bond can both be specified. Other identifiers can be utilized to indicate the presence or absence of particular groups within an alkene group. Alkene groups can also be further identified by the position of the carbon-carbon double bond.

An arene is an aromatic hydrocarbon, with or without side chains (e.g., benzene, toluene, or xylene, among others). An "aryl group" is a group derived from the formal removal of a hydrogen atom from an aromatic ring carbon of an arene. It should be noted that the arene can contain a single aromatic hydrocarbon ring (e.g., benzene or toluene), contain fused aromatic rings (e.g., naphthalene or anthracene), and contain one or more isolated aromatic rings covalently linked via a bond (e.g., biphenyl) or non-aromatic hydrocarbon group(s) (e.g., diphenylmethane). One example of an "aryl group" is ortho-tolyl (o-tolyl), the structure of which is shown here.

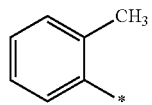

An "aralkyl group" is an aryl-substituted alkyl group having a free valance at a non-aromatic carbon atom, for example, a benzyl group, or a 2-phenyleth-1yl group, among others.

A "halide" has its usual meaning. Examples of halides include fluoride, chloride, bromide, and iodide.

The term "polymer" is used herein generically to include olefin homopolymers, copolymers, terpolymers, and so forth. A copolymer is derived from an olefin monomer and one olefin comonomer, while a terpolymer is derived from an olefin monomer and two olefin comonomers. Accordingly, "polymer" encompasses copolymers, terpolymers, etc., derived from any olefin monomer and comonomer(s) disclosed herein. Similarly, an ethylene polymer would include ethylene homopolymers, ethylene copolymers, ethylene terpolymers, and the like. As an example, an olefin copolymer, such as an ethylene copolymer, can be derived from ethylene and a comonomer, such as 1-butene, 1-hexene, or 1-octene. If the monomer and comonomer were ethylene and 1-hexene, respectively, the resulting polymer could be categorized an as ethylene/1-hexene copolymer.

In like manner, the scope of the term "polymerization" includes homopolymerization, copolymerization, terpolymerization, etc. Therefore, a copolymerization process could involve contacting one olefin monomer (e.g., ethylene) and one olefin comonomer (e.g., 1-hexene) to produce a copolymer.

The term "co-catalyst" is used generally herein to refer to compounds such as aluminoxane compounds, organoboron or organoborate compounds, ionizing ionic compounds, organoaluminum compounds, organozinc compounds, organomagnesium compounds, organolithium compounds, and the like, that can constitute one component of a catalyst composition, when used, for example, in addition to an activator-support. The term "co-catalyst" is used regardless of the actual function of the compound or any chemical mechanism by which the compound may operate.

The terms "chemically-treated solid oxide," "treated solid oxide compound," and the like, are used herein to indicate a solid, inorganic oxide of relatively high porosity, which can exhibit Lewis acidic or Brønsted acidic behavior, and which has been treated with an electron-withdrawing component, typically an anion, and which is calcined. The electron-withdrawing component is typically an electron-withdrawing anion source compound. Thus, the chemically-treated solid oxide can comprise a calcined contact product of at least one solid oxide with at least one electron-withdrawing anion source compound. Typically, the chemically-treated solid oxide comprises at least one acidic solid oxide compound. The "activator-support" of the present invention can be a chemically-treated solid oxide. The terms "support" and "activator-support" are not used to imply these components are inert, and such components should not be construed as an inert component of the catalyst composition. The term "activator," as used herein, refers generally to a substance that is capable of converting a metallocene component into a catalyst that can polymerize olefins, or converting a contact product of a metallocene component and a component that provides an activatable ligand (e.g., an alkyl, a hydride) to the metallocene, when the metallocene compound does not already comprise such a ligand, into a catalyst that can polymerize olefins. This term is used regardless of the actual activating mechanism. Illustrative activators include activator-supports, aluminoxanes, organoboron or organoborate compounds, ionizing ionic compounds, and the like. Aluminoxanes, organoboron or organoborate compounds, and ionizing ionic compounds generally are referred to as activators if used in a catalyst composition in which an activator-support is not present. If the catalyst composition contains an activator-support, then the aluminoxane, organoboron or organoborate, and ionizing ionic materials are typically referred to as co-catalysts.

The term "fluoroorgano boron compound" is used herein with its ordinary meaning to refer to neutral compounds of the form $BY_3$. The term "fluoroorgano borate compound" also has its usual meaning to refer to the monoanionic salts of a fluoroorgano boron compound of the form $[cation]^+[BY_4]^-$, where Y represents a fluorinated organic group. Materials of these types are generally and collectively referred to as "organoboron or organoborate compounds."

The term "metallocene," as used herein, describes compounds comprising at least one $\eta^3$ to $\eta^5$-cycloalkadienyl-type moiety, wherein $\eta^3$ to $\eta^5$-cycloalkadienyl moieties include cyclopentadienyl ligands, indenyl ligands, fluorenyl ligands, and the like, including partially saturated or substituted derivatives or analogs of any of these. Possible substituents on these ligands may include H, therefore this invention comprises ligands such as tetrahydroindenyl, tetrahydrofluorenyl, octahydrofluorenyl, partially saturated indenyl, partially saturated fluorenyl, substituted partially saturated indenyl, substituted partially saturated fluorenyl, and the like. In some contexts, the metallocene is referred to simply as the "catalyst," in much the same way the term "co-catalyst" is used herein to refer to, for example, an organoaluminum compound.

The terms "catalyst composition," "catalyst mixture," "catalyst system," and the like, do not depend upon the actual product or composition resulting from the contact or reaction of the initial components of the claimed catalyst composition/mixture/system, the nature of the active catalytic site, or the fate of the co-catalyst, the metallocene compound(s), any olefin monomer used to prepare a precontacted mixture, or the activator (e.g., activator-support), after combining these components. Therefore, the terms "catalyst composition," "catalyst mixture," "catalyst system," and the like, encompass the initial starting components of the composition, as well as whatever products) may result from contacting these initial starting components, and this is inclusive of both heterogeneous and homogenous catalyst systems or compositions. The terms "catalyst composition," "catalyst mixture," "catalyst system," and the like, are used interchangeably throughout this disclosure.

The term "contact product" is used herein to describe compositions wherein the components are contacted together in any order, in any manner, and for any length of time. For example, the components can be contacted by blending or mixing. Further, contacting of any component can occur in the presence or absence of any other component of the compositions described herein. Combining additional materials or components can be done by any suitable method. Further, the term "contact product" includes mixtures, blends, solutions, slurries, reaction products, and the like, or combinations thereof. Although "contact product" can include reaction products, it is not required for the respective components to react with one another. Similarly, the term "contacting" is used herein to refer to materials which can be blended, mixed, slurried, dissolved, reacted, treated, or otherwise contacted in some other manner.

The term "precontacted" mixture is used herein to describe a first mixture of catalyst components that are contacted for a first period of time prior to the first mixture being used to form a "postcontacted" or second mixture of catalyst components that are contacted for a second period of time. Typically, the precontacted mixture can describe a mixture of a metallocene compound (one or more than one), olefin monomer (or monomers), and organoaluminum compound (or compounds), before this mixture is contacted with an activator-support(s) and optional additional organoaluminum compound. Thus, precontacted describes components that are used to contact each other, but prior to contacting the components in the second, postcontacted mixture. Accordingly, this invention can occasionally distinguish between a component used to prepare the precontacted mixture and that component after the mixture has been prepared. For example, according to this description, it is possible for the precontacted organoaluminum compound, once it is contacted with the metallocene compound and the olefin monomer, to have reacted to form at least one chemical compound, formulation, or structure different from the distinct organoaluminum compound used to prepare the precontacted mixture. In this case, the precontacted organoaluminum compound or component is described as comprising an organoaluminum compound that was used to prepare the precontacted mixture.

Additionally, the precontacted mixture can describe a mixture of metallocene compound(s) and organoaluminum compound(s), prior to contacting this mixture with an activator-support(s). This precontacted mixture also can describe a mixture of metallocene compound(s), olefin monomer(s), and activator-support(s), before this mixture is contacted with an organoaluminum co-catalyst compound or compounds.

Similarly, the term "postcontacted" mixture is used herein to describe a second mixture of catalyst components that are contacted for a second period of time, and one constituent of which is the "precontacted" or first mixture of catalyst components that were contacted for a first period of time. Typically, the term "postcontacted" mixture is used herein to describe the mixture of metallocene compound(s), olefin monomer(s), organoaluminum compound(s), and activator-support(s) formed from contacting the precontacted mixture of a portion of these components with any additional components added to make up the postcontacted mixture. Often, the activator-support can comprise a chemically-treated solid oxide. For instance, the additional component added to make up the postcontacted mixture can be a chemically-treated solid oxide (one or more than one), and optionally, can include an organoaluminum compound which is the same as or different from the organoaluminum compound used to prepare the precontacted mixture, as described herein. Accordingly, this invention can also occasionally distinguish between a component used to prepare the postcontacted mixture and that component after the mixture has been prepared.

Although any methods, devices, and materials similar or equivalent to those described herein can be used in the practice or testing of the invention, the typical methods, devices and materials are herein described.

All publications and patents mentioned herein are incorporated herein by reference for the purpose of describing and disclosing, for example, the constructs and methodologies that are described in the publications, which might be used in connection with the presently described invention. The publications discussed throughout the text are provided solely for their disclosure prior to the filing date of the present application. Nothing herein is to be construed as an admission that the inventors are not entitled to antedate such disclosure by virtue of prior invention.

Applicants disclose several types of ranges in the present invention. When Applicants disclose or claim a range of any type, Applicants' intent is to disclose or claim individually each possible number that such a range could reasonably encompass, including end points of the range as well as any sub-ranges and combinations of sub-ranges encompassed therein. For example, when the Applicants disclose or claim a chemical moiety having a certain number of carbon atoms, Applicants' intent is to disclose or claim individually every possible number that such a range could encompass, consistent with the disclosure herein. For example, the disclosure that a moiety is a $C_1$ to $C_{18}$ hydrocarbyl group, or in alternative language, a hydrocarbyl group having from 1 to 18 carbon atoms, as used herein, refers to a moiety that can be selected independently from a hydrocarbyl group having 1, 2, 3, 4, 5, 6, 7, 8, 9, 10, 11, 12, 13, 14, 15, 16, 17, or 18 carbon atoms, as well as any range between these two numbers (for example, a $C_1$ to $C_8$ hydrocarbyl group), and also including any combination of ranges between these two numbers (for example, a $C_2$ to $C_4$ and a $C_{12}$ to $C_{16}$ hydrocarbyl group).

Similarly, another representative example follows for the number-average molecular weight (Mn) of an olefin polymer produced in an aspect of this invention. By a disclosure that the Mn can be in a range from about 8,000 to about 25,000 g/mol, Applicants intend to recite that the Mn can be equal to about 8,000, about 9,000, about 10,000, about 11,000, about 12,000, about 13,000, about 14,000, about 15,000, about 16,000, about 17,000, about 18,000, about 19,000, about 20,000, about 21,000, about 22,000, about 23,000, about 24,000, or about 25,000 g/mol. Additionally, the Mn can be within any range from about 8,000 to about 25,000 (for example, from about 10,000 to about 22,000), and this also includes any combination of ranges between about 8,000 and about 25,000 (for example, the Mn can be in a range from about 8,000 to about 10,000, or from about 15,000 to about 25,000). Likewise, all other ranges disclosed herein should be interpreted in a manner similar to these two examples.

Applicants reserve the right to proviso out or exclude any individual members of any such group, including any subranges or combinations of sub-ranges within the group, that can be claimed according to a range or in any similar manner, if for any reason Applicants choose to claim less than the full measure of the disclosure, for example, to account for a reference that Applicants may be unaware of at the time of the filing of the application. Further, Applicants reserve the right to proviso out or exclude any individual substituents, analogs, compounds, ligands, structures, or groups thereof, or any members of a claimed group, if for any reason Applicants choose to claim less than the full measure of the disclosure, for example, to account for a reference that Applicants may be unaware of at the time of the filing of the application.

DETAILED DESCRIPTION OF THE INVENTION

The present invention is directed generally to new catalyst compositions, methods for preparing catalyst compositions, methods for using the catalyst compositions to polymerize olefins, the polymer resins produced using such catalyst compositions, and articles produced using these polymer resins. In particular, the present invention relates to dual component catalyst compositions, polymerization processes utilizing such catalyst compositions, and low density olefin polymer and film articles resulting therefrom.

One object of the present invention is to produce a bimodal, broad high molecular weight polymer like a HMWPE film grade, but having a low density like a LLDPE film grade, thus achieving the best attributes of both types of film grades. The result would be a polymer with beneficial processability and improved physical properties, such as impact and tear resistance.

Slurry reactors can produce bimodal HMWPE polymers, but lower density polymers often present difficulties due to the polymer swelling and/or partially dissolving, generally leading to fouling. In the case of bimodal polymers, however, these issues may become more problematic because one of the components of the polymer may be made at a much lower density than the other component in order to achieve a final polymer density of, for instance, less than 0.920 g/cm³.

The use of two distinct metallocene compounds can overcome these issues. One metallocene compound can be selected to produce a generally higher molecular weight component, and this metallocene compound can be a single atom bridged metallocene compound and, moreover, can be an efficient comonomer incorporator. The other metallocene compound can be an unbridged metallocene compound or two carbon bridged metallocene compound that is more responsive to hydrogen, produces the generally lower molecular weight component, and this compound can incorporate comonomer less efficiently than the single atom bridged metallocene compound, although this is not a requirement.

Catalyst Component I

Catalyst component I can comprise a bridged metallocene compound with an alkenyl substituent, and more particularly, a single atom bridged zirconium, hafnium, or titanium based metallocene compound with an alkenyl substituent. In one aspect, for instance, catalyst component I can comprise a single atom bridged zirconium based metallocene compound with a cyclopentadienyl group and a fluorenyl group, and with an alkenyl substituent on the bridging group and/or on the cyclopentadienyl group. In another aspect, catalyst component I can comprise a single atom bridged hafnium based metallocene compound with a cyclopentadienyl group and a fluorenyl group, and with an alkenyl substituent on the bridging group and/or on the cyclopentadienyl group. In yet another aspect, catalyst component I can comprise a single atom bridged metallocene compound having an aryl group substituent on the bridging group. In still another aspect of this invention, catalyst component I can comprise a bridged metallocene compound having formula (A):

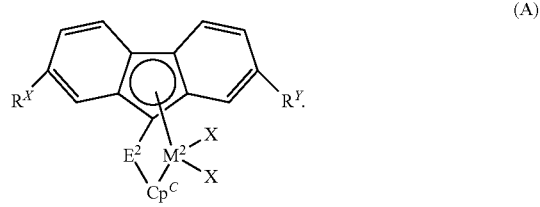

(A)

Within formula (A), $M^2$, $Cp^C$, $E^2$, $R^X$, $R^Y$, and each X are independent elements of the bridged metallocene compound. Accordingly, the bridged metallocene compound having formula (A) can be described using any combination of $M^2$, $Cp^C$, $E^2$, $R^X$, $R^Y$, and X disclosed herein.

Unless otherwise specified, formula (A) above, any other structural formulas disclosed herein, and any metallocene complex, compound, or species disclosed herein are not designed to show stereochemistry or isomeric positioning of the different moieties (e.g., these formulas are not intended to display cis or trans isomers, or R or S diastereoisomers), although such compounds are contemplated and encompassed by these formulas and/or structures.

In accordance with aspects of this invention, the metal in formula (A), $M^2$, can be Ti, Zr, or Hf. In one aspect, for instance, $M^2$ can be Zr, while in another aspect, $M^2$ can be Hf.

Each X in formula (A) independently can be a monoanionic ligand. In some aspects, suitable monoanionic ligands can include, but are not limited to, H (hydride), BH$_4$, a halide, a C$_1$ to C$_{36}$ hydrocarbyl group, a C$_1$ to C$_{36}$ hydrocarboxy group, a C$_1$ to C$_{36}$ hydrocarbylaminyl group, a C$_1$ to C$_{36}$ hydrocarbylsilyl group, a C$_1$ to C$_{36}$ hydrocarbylaminylsilyl group, —OBR$^1_2$, or —OSO$_2$R$^1$, wherein R$^1$ is a C$_1$ to C$_{36}$ hydrocarbyl group. It is contemplated that each X can be either the same or a different monoanionic ligand.

In one aspect, each X independently can be H, BH$_4$, a halide (e.g., F, Cl, Br, etc.), a C$_1$ to C$_{18}$ hydrocarbyl group, a C$_1$ to C$_{18}$ hydrocarboxy group, a C$_1$ to C$_{18}$ hydrocarbylaminyl group, a C$_1$ to C$_{18}$ hydrocarbylsilyl group, or a C$_1$ to C$_{18}$ hydrocarbylaminylsilyl group. Alternatively, each X independently can be H, BH$_4$, a halide, OBR$^1_2$, or OSO$_2$R$^1$, wherein R$^1$ is a C$_1$ to C$_{18}$ hydrocarbyl group. In another aspect, each X independently can be H, BH$_4$, a halide, a C$_1$ to C$_{12}$ hydrocarbyl group, a C$_1$ to C$_{12}$ hydrocarboxy group, a C$_1$ to C$_{12}$ hydrocarbylaminyl group, a C$_1$ to C$_{12}$ hydrocarbylsilyl group, a C$_1$ to C$_{12}$ hydrocarbylaminylsilyl group, OBR$^1_2$, or OSO$_2$R$^1$, wherein R$^1$ is a C$_1$ to C$_{12}$ hydrocarbyl group. In another aspect, each X independently can be H, BH$_4$, a halide, a C$_1$ to C$_{10}$ hydrocarbyl group, a C$_1$ to C$_{10}$ hydrocarboxy group, a C$_1$ to C$_{10}$ hydrocarbylaminyl group, a C$_1$ to C$_{10}$ hydrocarbylsilyl group, a C$_1$ to C$_{10}$ hydrocarbylaminylsilyl group, OBR$^1_2$, or OSO$_2$R$^1$, wherein R$^1$ is a C$_1$ to C$_{10}$ hydrocarbyl group. In yet another aspect, each X independently can be H, BH$_4$, a halide, a C$_1$ to C$_8$ hydrocarbyl group, a C$_1$ to C$_8$ hydrocarboxy group, a C$_1$ to C$_8$ hydrocarbylaminyl group, a C$_1$ to C$_8$ hydrocarbylsilyl group, a C$_1$ to C$_8$ hydrocarbylaminylsilyl group, OBR$^1_2$, or OSO$_2$R$^1$, wherein R$^1$ is a C$_1$ to C$_8$ hydrocarbyl group. In still another aspect, each X independently can be a halide or a C$_1$ to C$_{18}$ hydrocarbyl group. For example, each X can be Cl.

The hydrocarbyl group which can be an X in formula (A) can be a C$_1$ to C$_{36}$ hydrocarbyl group, including, but not limited to, a C$_1$ to C$_{36}$ alkyl group, a C$_2$ to C$_{36}$ alkenyl group, a C$_4$ to C$_{36}$ cycloalkyl group, a C$_6$ to C$_{36}$ aryl group, or a C$_7$ to C$_{36}$ aralkyl group. For instance, each X independently can be a C$_1$ to C$_{18}$ alkyl group, a C$_2$ to C$_{18}$ alkenyl group, a C$_4$ to C$_{18}$ cycloalkyl group, a C$_6$ to C$_{18}$ aryl group, or a C$_7$ to C$_{18}$ aralkyl group; alternatively, each X independently can be a C$_1$ to C$_{12}$ alkyl group, a C$_2$ to C$_{12}$ alkenyl group, a C$_4$ to C$_{12}$ cycloalkyl group, a C$_6$ to C$_{12}$ aryl group, or a C$_7$ to C$_{12}$ aralkyl group; alternatively, each X independently can be a C$_1$ to C$_{10}$ alkyl group, a C$_2$ to C$_{10}$ alkenyl group, a C$_4$ to C$_{10}$ cycloalkyl group, a C$_6$ to C$_{10}$ aryl group, or a C$_7$ to C$_{10}$ aralkyl group; or alternatively, each X independently can be a C$_1$ to C$_5$ alkyl group, a C$_2$ to C$_5$ alkenyl group, a C$_5$ to C$_8$ cycloalkyl group, a C$_6$ to C$_8$ aryl group, or a C$_7$ to C$_8$ aralkyl group.

Accordingly, in some aspects, the alkyl group which can be X (one or both) in formula (A) can be a methyl group, an ethyl group, a propyl group, a butyl group, a pentyl group, a hexyl group, a heptyl group, an octyl group, a nonyl group, a decyl group, a undecyl group, a dodecyl group, a tridecyl group, a tetradecyl group, a pentadecyl group, a hexadecyl group, a heptadecyl group, or an octadecyl group; or alternatively, a methyl group, an ethyl group, a propyl group, a butyl group, a pentyl group, a hexyl group, a heptyl group, an octyl group, a nonyl group, or a decyl group. In some aspects, the alkyl group which can be X in formula (A) can be a methyl group, an ethyl group, a n-propyl group, an iso-propyl group, a n-butyl group, an iso-butyl group, a sec-butyl group, a tert-butyl group, a n-pentyl group, an iso-pentyl group, a sec-pentyl group, or a neopentyl group; alternatively, a methyl group, an ethyl group, an iso-propyl group, a tert-butyl group, or a neopentyl group; alternatively, a methyl group; alternatively, an ethyl group; alternatively, a n-propyl group; alternatively, an iso-propyl group; alternatively, a tert-butyl group; or alternatively, a neopentyl group.

Suitable alkenyl groups which can be X in formula (I) can include, but are not limited to, an ethenyl group, a propenyl group, a butenyl group, a pentenyl group, a hexenyl group, a heptenyl group, an octenyl group, a nonenyl group, a decenyl group, a undecenyl group, a dodecenyl group, a tridecenyl group, a tetradecenyl group, a pentadecenyl group, a hexadecenyl group, a heptadecenyl group, or an octadecenyl group. Such alkenyl groups can be linear or branched, and the double bond can be located anywhere in the chain. In one aspect, each X in formula (A) independently can be an ethenyl group, a propenyl group, a butenyl group, a pentenyl group, a hexenyl group, a heptenyl group, an octenyl group, a nonenyl group, or a decenyl group, while in another aspect, each X in formula (A) independently can be an ethenyl group, a propenyl group, a butenyl group, a pentenyl group, or a hexenyl group. For example, each X independently can be an ethenyl group; alternatively, a propenyl group; alternatively, a butenyl group; alternatively, a pentenyl group; or alternatively, a hexenyl group. In yet another aspect, each X independently can be a terminal alkenyl group, such as a C$_3$ to C$_{18}$ terminal alkenyl group, a C$_3$ to C$_{12}$ terminal alkenyl group, or a C$_3$ to C$_8$ terminal alkenyl group. Illustrative terminal alkenyl groups can include, but are not limited to, a prop-2-en-1-yl group, a bute-3-en-1-yl group, a pent-4-en-1-yl group, a hex-5-en-1-yl group, a hept-6-en-1-yl group, an octe-7-en-1-yl group, a non-8-en-1-yl group, a dece-9-en-1-yl group, and so forth.

Each X in formula (A) independently can be a cycloalkyl group, including, but not limited to, a cyclobutyl group, a substituted cyclobutyl group, a cyclopentyl group, a substituted cyclopentyl group, a cyclohexyl group, a substituted cyclohexyl group, a cycloheptyl group, a substituted cycloheptyl group, a cyclooctyl group, or a substituted cyclooctyl group. For example, each X in formula (A) independently can be a cyclopentyl group, a substituted cyclopentyl group, a cyclohexyl group, or a substituted cyclohexyl group. Moreover, each X in formula (A) independently can be a cyclobutyl group or a substituted cyclobutyl group; alternatively, a cyclopentyl group or a substituted cyclopentyl group; alternatively, a cyclohexyl group or a substituted cyclohexyl group; alternatively, a cycloheptyl group or a substituted cycloheptyl group; alternatively, a cyclooctyl group or a substituted cyclooctyl group; alternatively, a cyclopentyl group; alternatively, a substituted cyclopentyl group; alternatively, a cyclohexyl group; or alternatively, a substituted cyclohexyl group. Substituents which can be utilized for the substituted cycloalkyl group are independently disclosed herein and can be utilized without limitation to further describe the substituted cycloalkyl group which can be an X in formula (A).

In some aspects, the aryl group which can be an X in formula (A) can be a phenyl group, a substituted phenyl group, a naphthyl group, or a substituted naphthyl group. In an aspect, the aryl group can be a phenyl group or a substituted phenyl group; alternatively, a naphthyl group or a substituted naphthyl group; alternatively, a phenyl group or a naphthyl group; alternatively, a substituted phenyl group or a substituted naphthyl group; alternatively, a phenyl group; or alternatively, a naphthyl group. Substituents which can be utilized for the substituted phenyl groups or substituted naphthyl groups are independently disclosed herein and can be utilized without limitation to further describe the substituted phenyl groups or substituted naphthyl groups which can be an X in formula (A).

In an aspect, the substituted phenyl group which can be an X in formula (A) can be a 2-substituted phenyl group, a 3-substituted phenyl group, a 4-substituted phenyl group, a 2,4-disubstituted phenyl group, a 2,6-disubstituted phenyl group, a 3,5-disubstituted phenyl group, or a 2,4,6-trisubstituted phenyl group. In other aspects, the substituted phenyl group can be a 2-substituted phenyl group, a 4-substituted phenyl group, a 2,4-disubstituted phenyl group, or a 2,6-disubstituted phenyl group; alternatively, a 3-substituted phenyl group or a 3,5-disubstituted phenyl group; alternatively, a 2-substituted phenyl group or a 4-substituted phenyl group; alternatively, a 2,4-disubstituted phenyl group or a 2,6-disubstituted phenyl group; alternatively, a 2-substituted phenyl group; alternatively, a 3-substituted phenyl group; alternatively, a 4-substituted phenyl group; alternatively, a 2,4-disubstituted phenyl group; alternatively, a 2,6-disubstituted phenyl group; alternatively, a 3,5-disubstituted phenyl group; or alternatively, a 2,4,6-trisubstituted phenyl group. Substituents which can be utilized for these specific substituted phenyl groups are independently disclosed herein and can be utilized without limitation to further describe these substituted phenyl groups which can be the X group (one or both) in formula (A).

In some aspects, the aralkyl group which can be an X group in formula (A) can be a benzyl group or a substituted benzyl group. In an aspect, the aralkyl group can be a benzyl group or, alternatively, a substituted benzyl group. Substituents which can be utilized for the substituted aralkyl group are independently disclosed herein and can be utilized without limitation to further describe the substituted aralkyl group which can be the X group (one or both) in formula (A).

In an aspect, each non-hydrogen substituent(s) for the substituted cycloalkyl group, substituted aryl group, or substituted aralkyl group which can be X in formula (A) independently can be a $C_1$ to $C_{18}$ hydrocarbyl group; alternatively, a $C_1$ to $C_8$ hydrocarbyl group; or alternatively, a $C_1$ to $C_5$ hydrocarbyl group. Specific hydrocarbyl groups are independently disclosed herein and can be utilized without limitation to further describe the substituents of the substituted cycloalkyl groups, substituted aryl groups, or substituted aralkyl groups which can be an X in formula (A). For instance, the hydrocarbyl substituent can be an alkyl group, such as a methyl group, an ethyl group, a n-propyl group, an isopropyl group, a n-butyl group, a sec-butyl group, an isobutyl group, a tert-butyl group, a n-pentyl group, a 2-pentyl group, a 3-pentyl group, a 2-methyl-1-butyl group, a tert-pentyl group, a 3-methyl-1-butyl group, a 3-methyl-2-butyl group, or a neo-pentyl group, and the like. Furthermore, the hydrocarbyl substituent can be a benzyl group, a phenyl group, a tolyl group, or a xylyl group, and the like.

A hydrocarboxy group is used generically herein to include, for instance, alkoxy, aryloxy, aralkoxy, and -(alkyl, aryl, or aralkyl)-O-(alkyl, aryl, or aralkyl) groups, and these groups can comprise up to about 36 carbon atoms (e.g., $C_1$ to $C_{36}$, $C_1$ to $C_{18}$, $C_1$ to $C_{10}$, or $C_1$ to $C_8$ hydrocarboxy groups). Illustrative and non-limiting examples of hydrocarboxy groups which can be an X in formula (A) can include, but are not limited to, a methoxy group, an ethoxy group, an n-propoxy group, an isopropoxy group, an n-butoxy group, a sec-butoxy group, an isobutoxy group, a tert-butoxy group, an n-pentoxy group, a 2-pentoxy group, a 3-pentoxy group, a 2-methyl-1-butoxy group, a tert-pentoxy group, a 3-methyl-1-butoxy group, a 3-methyl-2-butoxy group, a neo-pentoxy group, a phenoxy group, a toloxy group, a xyloxy group, a 2,4,6-trimethylphenoxy group, a benzoxy group, an acetylacetonate group (acac), and the like. In an aspect, the hydrocarboxy group which can be X in formula (A) can be a methoxy group; alternatively, an ethoxy group; alternatively, an n-propoxy group; alternatively, an isopropoxy group; alternatively, an n-butoxy group; alternatively, a sec-butoxy group; alternatively, an isobutoxy group; alternatively, a tert-butoxy group; alternatively, an n-pentoxy group; alternatively, a 2-pentoxy group; alternatively, a 3-pentoxy group; alternatively, a 2-methyl-1-butoxy group; alternatively, a tert-pentoxy group; alternatively, a 3-methyl-1-butoxy group, alternatively, a 3-methyl-2-butoxy group; alternatively, a neo-pentoxy group; alternatively, a phenoxy group; alternatively, a toloxy group; alternatively, a xyloxy group; alternatively, a 2,4,6-trimethylphenoxy group; alternatively, a benzoxy group; or alternatively, an acetylacetonate group.

The term hydrocarbylaminyl group is used generically herein to refer collectively to, for instance, alkylaminyl, arylaminyl, aralkylaminyl, dialkylaminyl, diarylaminyl, diaralkylaminyl, and -(alkyl, aryl, or aralkyl)-N-(alkyl, aryl, or aralkyl) groups, and unless otherwise specified, the hydrocarbylaminyl groups which can be X in formula (A) can comprise up to about 36 carbon atoms (e.g., $C_1$ to $C_{36}$, $C_1$ to $C_{18}$, $C_1$ to $C_{10}$, or $C_1$ to $C_8$ hydrocarbylaminyl groups). Accordingly, hydrocarbylaminyl is intended to cover both (mono) hydrocarbylaminyl and dihydrocarbylaminyl groups. In some aspects, the hydrocarbylaminyl group which can be X in formula (A) can be, for instance, a methylaminyl group ($—NHCH_3$), an ethylaminyl group ($—NHCH_2CH_3$), an n-propylaminyl group ($—NHCH_2CH_2CH_3$), an iso-propylaminyl group ($—NHCH(CH_3)_2$), an n-butylaminyl group ($—NHCH_2CH_2CH_2CH_3$), a t-butylaminyl group ($—NHC(CH_3)_3$), an n-pentylaminyl group ($—NHCH_2CH_2CH_2CH_2CH_3$), a neo-pentylaminyl group ($—NHCH_2C(CH_3)_3$), a phenylaminyl group ($—NHC_6H_5$), a tolylaminyl group ($—NHC_6H_4CH_3$), or a xylylaminyl group ($—NHC_6H_3(CH_3)_2$); alternatively, a methylaminyl group; alternatively, an ethylaminyl group; alternatively, a propylaminyl group; or alternatively, a phenylaminyl group. In other aspects, the hydrocarbylaminyl group which can be X in formula (A) can be, for instance, a dimethylaminyl group ($—N(CH_3)_2$), a diethylaminyl group ($—N(CH_2CH_3)_2$), a di-n-propylaminyl group ($—N(CH_2CH_2CH_3)_2$), a di-iso-propylaminyl group ($—N(CH(CH_3)_2)_2$), a di-n-butylaminyl group ($—N(CH_2CH_2CH_2CH_3)_2$), a di-t-butylaminyl group ($—N(C(CH_3)_3)_2$), a di-n-pentylaminyl group ($—N(CH_2CH_2CH_2CH_2CH_3)_2$), a di-neo-pentylaminyl group ($—N(CH_2C(CH_3)_3)_2$), a di-phenylaminyl group ($—N(C_6H_5)_2$), a di-tolylaminyl group ($—N(C_6H_4CH_3)_2$), or a di-xylylaminyl group ($—N(C_6H_3(CH_3)_2)_2$); alternatively, a dimethylaminyl group; alternatively, a di-ethylaminyl group; alternatively, a di-n-propylaminyl group; or alternatively, a di-phenylaminyl group.

In accordance with some aspects disclosed herein, each X independently can be a $C_1$ to $C_{36}$ hydrocarbylsilyl group; alternatively, a $C_1$ to $C_{24}$ hydrocarbylsilyl group; alternatively, a $C_1$ to $C_{18}$ hydrocarbylsilyl group; or alternatively, a $C_1$ to $C_8$ hydrocarbylsilyl group. In an aspect, each hydrocarbyl (one or more) of the hydrocarbylsilyl group can be any hydrocarbyl group disclosed herein (e.g., a $C_1$ to $C_5$ alkyl group, a $C_2$ to $C_5$ alkenyl group, a $C_5$ to $C_8$ cycloalkyl group, a $C_6$ to $C_8$ aryl group, a $C_7$ to $C_8$ aralkyl group, etc.). As used herein, hydrocarbylsilyl is intended to cover (mono)hydrocarbylsilyl ($—SiH_2R$), dihydrocarbylsilyl ($—SiHR_2$), and trihydrocarbylsilyl ($—SiR_3$) groups, with R being a hydrocarbyl group. In one aspect, the hydrocarbylsilyl group can be a $C_3$ to $C_{36}$ or a $C_3$ to $C_{18}$ trihydrocarbylsilyl group, such as, for example, a trialkylsilyl group or a triphenylsilyl group. Illustrative and non-limiting examples of hydrocarbylsilyl groups which can be the X group (one or both) in formula (A) can include, but are not limited to, trimethylsilyl, triethylsilyl, tripropylsilyl (e.g., triisopropylsilyl), tributylsilyl, tripentylsilyl, triphenylsilyl, allyldimethylsilyl, and the like.

A hydrocarbylaminylsilyl group is used herein to refer to groups containing at least one hydrocarbon moiety, at least one N atom, and at least one Si atom. Illustrative and non-limiting examples of hydrocarbylaminylsilyl groups which can be X can include, but are not limited to —N(SiMe$_3$)$_2$, —N(SiEt$_3$)$_2$, and the like. Unless otherwise specified, the hydrocarbylaminylsilyl groups which can be X can comprise up to about 36 carbon atoms (e.g., $C_1$ to $C_{36}$, $C_1$ to $C_{18}$, $C_1$ to $C_{12}$, or $C_1$ to $C_8$ hydrocarbylaminylsilyl groups). In an aspect, each hydrocarbyl (one or more) of the hydrocarbylaminylsilyl group can be any hydrocarbyl group disclosed herein (e.g., a $C_1$ to $C_5$ alkyl group, a $C_2$ to $C_5$ alkenyl group, a $C_5$ to $C_8$ cycloalkyl group, a $C_6$ to $C_8$ aryl group, a $C_7$ to $C_8$ aralkyl group, etc.). Moreover, hydrocarbylaminylsilyl is intended to cover —NH(SiH$_2$R), —NH(SiHR$_2$), —NH(SiR$_3$), —N(SiH$_2$R)$_2$, —N(SiHR$_2$)$_2$, and —N(SiR$_3$)$_2$ groups, among others, with R being a hydrocarbyl group.

In an aspect, each X independently can be —OBR$^1_2$ or —OSO$_2$R$^1$, wherein R$^1$ is a $C_1$ to $C_{36}$ hydrocarbyl group, or alternatively, a $C_1$ to $C_{18}$ hydrocarbyl group. The hydrocarbyl group in OBR$^1_2$ and/or OSO$_2$R$^1$ independently can be any hydrocarbyl group disclosed herein, such as, for instance, a $C_1$ to $C_{18}$ alkyl group, a $C_2$ to $C_{18}$ alkenyl group, a $C_4$ to $C_{18}$ cycloalkyl group, a $C_6$ to $C_{18}$ aryl group, or a $C_7$ to $C_{18}$ aralkyl group; alternatively, a $C_1$ to $C_{12}$ alkyl group, a $C_2$ to $C_{12}$ alkenyl group, a $C_4$ to $C_{12}$ cycloalkyl group, a $C_6$ to $C_{12}$ aryl group, or a $C_7$ to $C_{12}$ aralkyl group; or alternatively, a $C_1$ to $C_8$ alkyl group, a $C_2$ to $C_8$ alkenyl group, a $C_5$ to $C_8$ cycloalkyl group, a $C_6$ to $C_8$ aryl group, or a $C_7$ to $C_8$ aralkyl group.

In one aspect, each X independently can be H, BH$_4$, a halide, or a $C_1$ to $C_{36}$ hydrocarbyl group, hydrocarboxy group, hydrocarbylaminyl group, hydrocarbylsilyl group, or hydrocarbylaminylsilyl group, while in another aspect, each X independently can be H, BH$_4$, or a $C_1$ to $C_{18}$ hydrocarboxy group, hydrocarbylaminyl group, hydrocarbylsilyl group, or hydrocarbylaminylsilyl group. In yet another aspect, each X independently can be a halide; alternatively, a $C_1$ to $C_{18}$ hydrocarbyl group; alternatively, a $C_1$ to $C_{18}$ hydrocarboxy group; alternatively, a $C_1$ to $C_{18}$ hydrocarbylaminyl group; alternatively, a $C_1$ to $C_{18}$ hydrocarbylsilyl group; or alternatively, a $C_1$ to $C_{18}$ hydrocarbylaminylsilyl group. In still another aspect, both X groups can be H; alternatively, F; alternatively, Cl; alternatively, Br; alternatively, I; alternatively, BH$_4$; alternatively, a $C_1$ to $C_{18}$ hydrocarbyl group; alternatively, a $C_1$ to $C_{18}$ hydrocarboxy group; alternatively, a $C_1$ to $C_{18}$ hydrocarbylaminyl group; alternatively, a $C_1$ to $C_{18}$ hydrocarbylsilyl group; or alternatively, a $C_1$ to $C_{18}$ hydrocarbylaminylsilyl group.

Each X independently can be, in some aspects, H, a halide, methyl, phenyl, benzyl, an alkoxy, an aryloxy, acetylacetonate, an alkylaminyl, a dialkylaminyl, a trihydrocarbylsilyl, or a hydrocarbylaminylsilyl; alternatively, H, a halide, methyl, phenyl, or benzyl; alternatively, an alkoxy, an aryloxy, or acetylacetonate; alternatively, an alkylaminyl or a dialkylaminyl; alternatively, a trihydrocarbylsilyl or hydrocarbylaminylsilyl; alternatively, H or a halide; alternatively, methyl, phenyl, benzyl, an alkoxy, an aryloxy, acetylacetonate, an alkylaminyl, or a dialkylaminyl; alternatively, H; alternatively, a halide; alternatively, methyl; alternatively, phenyl; alternatively, benzyl; alternatively, an alkoxy; alternatively, an aryloxy; alternatively, acetylacetonate; alternatively, an alkylaminyl; alternatively, a dialkylaminyl; alternatively, a trihydrocarbylsilyl; or alternatively, a hydrocarbylaminylsilyl. In these and other aspects, the alkoxy, aryloxy, alkylaminyl, dialkylaminyl, trihydrocarbylsilyl, and hydrocarbylaminylsilyl can be a $C_1$ to $C_{36}$, a $C_1$ to $C_{18}$, a $C_1$ to $C_{12}$, or a $C_1$ to $C_8$ alkoxy, aryloxy, alkylaminyl, dialkylaminyl, trihydrocarbylsilyl, and hydrocarbylaminylsilyl.

Moreover, each X independently can be, in certain aspects, a halide or a $C_1$ to $C_{18}$ hydrocarbyl group; alternatively, a halide or a $C_1$ to $C_8$ hydrocarbyl group; alternatively, F, Cl, Br, I, methyl, benzyl, or phenyl; alternatively, Cl, methyl, benzyl, or phenyl; alternatively, a $C_1$ to $C_{18}$ alkoxy, aryloxy, alkylaminyl, dialkylaminyl, trihydrocarbylsilyl, or hydrocarbylaminylsilyl group; alternatively, a $C_1$ to $C_8$ alkoxy, aryloxy, alkylaminyl, dialkylaminyl, trihydrocarbylsilyl, or hydrocarbylaminylsilyl group; or alternatively, methyl, ethyl, propyl, butyl, pentyl, hexyl, heptyl, octyl, nonyl, decyl, ethenyl, propenyl, butenyl, pentenyl, hexenyl, heptenyl, octenyl, nonenyl, decenyl, phenyl, tolyl, benzyl, naphthyl, trimethylsilyl, triisopropylsilyl, triphenylsilyl, or allyldimethylsilyl.

In formula (A), Cp$^C$ can be a substituted cyclopentadienyl, indenyl, or fluorenyl group. In one aspect, Cp$^C$ can be a substituted cyclopentadienyl group, while in another aspect, Cp$^C$ can be a substituted indenyl group.

In some aspects, Cp$^C$ can contain no additional substituents, e.g., other than bridging group E$^2$, discussed further herein below. In other aspects, Cp$^C$ can be further substituted with one substituent, two substituents, three substituents, four substituents, and so forth. If present, each substituent on Cp$^C$ independently can be H, a halide, a $C_1$ to $C_{36}$ hydrocarbyl group, a $C_1$ to $C_{36}$ halogenated hydrocarbyl group, a $C_1$ to $C_{36}$ hydrocarboxy group, or a $C_1$ to $C_{36}$ hydrocarbylsilyl group. Importantly, each substituent on Cp$^C$ can be either the same or a different substituent group. Moreover, each substituent can be at any position on the respective cyclopentadienyl, indenyl, or fluorenyl ring structure that conforms with the rules of chemical valence.

In some aspects, each substituent on Cp$^C$ independently can be H; alternatively, a halide; alternatively, a $C_1$ to $C_{18}$ hydrocarbyl group; alternatively, a $C_1$ to $C_{18}$ halogenated hydrocarbyl group; alternatively, a $C_1$ to $C_{18}$ hydrocarboxy group; alternatively, a $C_1$ to $C_{18}$ hydrocarbylsilyl group; alternatively, a $C_1$ to $C_{12}$ hydrocarbyl group or a $C_1$ to $C_{12}$ hydrocarbylsilyl group; or alternatively, a $C_1$ to $C_8$ alkyl group or a $C_3$ to $C_8$ alkenyl group. The halide, $C_1$ to $C_{36}$ hydrocarbyl group, $C_1$ to $C_{36}$ hydrocarboxy group, and $C_1$ to $C_{36}$ hydrocarbylsilyl group which can be a substituent on Cp$^C$ in formula (A) can be any halide, $C_1$ to $C_{36}$ hydrocarbyl group, $C_1$ to $C_{36}$ hydrocarboxy group, and $C_1$ to $C_{36}$ hydrocarbylsilyl group described herein (e.g., as pertaining to X in formula (A)). A substituent on Cp$^C$ in formula (A) can be, in certain aspects, a $C_1$ to $C_{36}$ halogenated hydrocarbyl group, where the halogenated hydrocarbyl group indicates the presence of one or more halogen atoms replacing an equivalent number of hydrogen atoms in the hydrocarbyl group. The halogenated hydrocarbyl group often can be a halogenated alkyl group, a halogenated alkenyl group, a halogenated cycloalkyl group, a halogenated aryl group, or a halogenated aralkyl group. Representative and non-limiting halogenated hydrocarbyl groups include pentafluorophenyl, trifluoromethyl (CF$_3$), and the like.

As a non-limiting example, if present, each substituent on Cp$^C$ independently can be H, Cl, CF$_3$, a methyl group, an ethyl group, a propyl group, a butyl group (e.g., t-Bu), a pentyl group, a hexyl group, a heptyl group, an octyl group, a nonyl group, a decyl group, an ethenyl group, a propenyl group, a butenyl group, a pentenyl group, a hexenyl group, a heptenyl group, an octenyl group, a nonenyl group, a decenyl group, a phenyl group, a tolyl group (or other substituted aryl group), a benzyl group, a naphthyl group, a trimethylsilyl group, a triisopropylsilyl group, a triphenylsilyl group, or an allyldimethylsilyl group; alternatively, H; alternatively, Cl; alternatively, $CF_3$; alternatively, a methyl group; alternatively, an ethyl group; alternatively, a propyl group; alternatively, a butyl group; alternatively, a pentyl group; alternatively, a hexyl group; alternatively, a heptyl group; alternatively, an octyl group, a nonyl group; alternatively, a decyl group; alternatively, an ethenyl group; alternatively, a propenyl group; alternatively, a butenyl group; alternatively, a pentenyl group; alternatively, a hexenyl group; alternatively, a heptenyl group; alternatively, an octenyl group; alternatively, a nonenyl group; alternatively, a decenyl group; alternatively, a phenyl group; alternatively, a tolyl group; alternatively, a benzyl group; alternatively, a naphthyl group; alternatively, a trimethylsilyl group; alternatively, a triisopropylsilyl group; alternatively, a triphenylsilyl group; or alternatively, an allyldimethylsilyl group.

Similarly, $R^X$ and $R^Y$ in formula (A) independently can be H or any halide, $C_1$ to $C_{36}$ hydrocarbyl group, $C_1$ to $C_{36}$ halogenated hydrocarbyl group, $C_1$ to $C_{36}$ hydrocarboxy group, or $C_1$ to $C_{36}$ hydrocarbylsilyl group disclosed herein (e.g., as pertaining to X or substituents on $Cp^C$ in formula (A)). In one aspect, for example, $R^X$ and $R^Y$ independently can be H or a $C_1$ to $C_{12}$ hydrocarbyl group. In another aspect, $R^X$ and $R^Y$ independently can be a $C_1$ to $C_{10}$ hydrocarbyl group. In yet another aspect, $R^X$ and $R^Y$ independently can be H, Cl, $CF_3$, a methyl group, an ethyl group, a propyl group, a butyl group (e.g., t-Bu), a pentyl group, a hexyl group, a heptyl group, an octyl group, a nonyl group, a decyl group, an ethenyl group, a propenyl group, a butenyl group, a pentenyl group, a hexenyl group, a heptenyl group, an octenyl group, a nonenyl group, a decenyl group, a phenyl group, a tolyl group, a benzyl group, a naphthyl group, a trimethylsilyl group, a triisopropylsilyl group, a triphenylsilyl group, or an allyldimethylsilyl group, and the like. In still another aspect, $R^X$ and $R^Y$ independently can be a methyl group, an ethyl group, a propyl group, a butyl group, a pentyl group, a hexyl group, a heptyl group, an octyl group, a nonyl group, a decyl group, an ethenyl group, a propenyl group, a butenyl group, a pentenyl group, a hexenyl group, a heptenyl group, an octenyl group, a nonenyl group, a decenyl group, a phenyl group, a tolyl group, or a benzyl group.

Bridging group $E^2$ in formula (A) can be (i) a bridging group having the formula $>E^4R^4R^B$, wherein $E^4$ can be a single C or Si atom, and $R^4$ and $R^B$ independently can be H or a $C_1$ to $C_{18}$ hydrocarbyl group; or a bridging chain of 2 to 5 carbon or silicon atoms, each substituent on the atoms of the bridging chain independently can be H or a $C_1$ to $C_{18}$ hydrocarbyl group.

In the first option, the bridging group $E^2$ can have the formula $>E^4R^4R^B$, wherein $E^4$ can be a single C or Si atom, and $R^4$ and $R^B$ independently can be H or any $C_1$ to $C_{18}$ hydrocarbyl group disclosed herein. In some aspects of this invention, $R^4$ and $R^B$ independently can be a $C_1$ to $C_{15}$ hydrocarbyl group; alternatively, $R^4$ and $R^B$ independently can be a $C_1$ to $C_8$ hydrocarbyl group; alternatively, $R^4$ and $R^B$ independently can be an alkyl, alkenyl, or aryl group having up to 8 carbon atoms; alternatively, $R^4$ and $R^B$ independently can be a methyl group, an ethyl group, a propyl group, a butyl group, a pentyl group, a hexyl group, a heptyl group, an octyl group, a nonyl group, a decyl group, an ethenyl group, a propenyl group, a butenyl group, a pentenyl group, a hexenyl group, a heptenyl group, an octenyl group, a nonenyl group, a decenyl group, a phenyl group, a tolyl group, a cyclohexylphenyl group, a naphthyl group, or a benzyl group; or alternatively, $R^4$ and $R^B$ independently can be a methyl group, an ethyl group, a propyl group, a butyl group, a pentyl group, a hexyl group, a propenyl group, a butenyl group, a pentenyl group, a hexenyl group, a phenyl group, a cyclohexylphenyl group, a naphthyl group, or a benzyl group. In these and other aspects, $R^4$ and $R^B$ can be either the same or different.

In a particular aspect, $E^2$ can be a bridging group having the formula $>E^4R^4R^B$, wherein $E^4$ is C or Si, and wherein at least one of $R^4$ and $R^B$ can be a methyl group or a phenyl group. Additionally, or alternatively, at least one of $R^4$ and $R^B$ can be a $C_3$ to $C_8$ terminal alkenyl group.

In the second option, for instance, $E^2$ can be a bridging group having the formula $—CR^CR^D—CR^ER^F—$, wherein $R^C$, $R^D$, $R^E$, and $R^u$ independently can be H or a $C_1$ to $C_{18}$ hydrocarbyl group; or alternatively, a bridging group having the formula $—SiR^GR^H—SiR^IR^J—$, wherein $R^G$, $R^H$, $R^I$, and $R^J$ independently can be H or a $C_1$ to $C_{18}$ hydrocarbyl group. In some aspects, $R^C$, $R^D$, $R^E$, and $R^F$ independently can be H or a methyl group, and $R^G$, $R^H$, $R^I$, and $R^J$ independently can be H or a methyl group.

The options for $M^2$, $Cp^C$, $E^2$, $R^X$, $R^Y$, and X in the bridged metallocene compound having formula (A) are provided above. However, in certain beneficial aspects, $Cp^C$ has an alkenyl substituent and/or $E^2$ has an alkenyl substituent.

Illustrative and non-limiting examples of bridged metallocene compounds having formula (A) and/or suitable for use as catalyst component I can include, but are not limited to, the following compounds (Me=methyl, Ph=phenyl, t-Bu=tert-butyl):

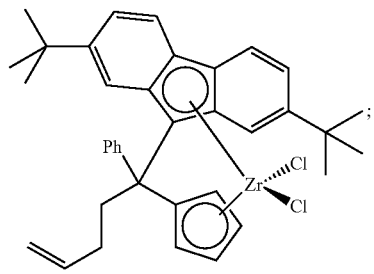

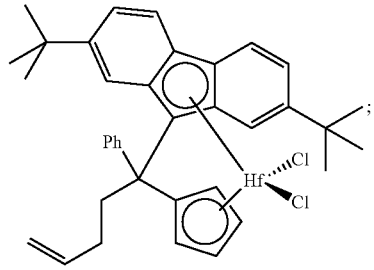

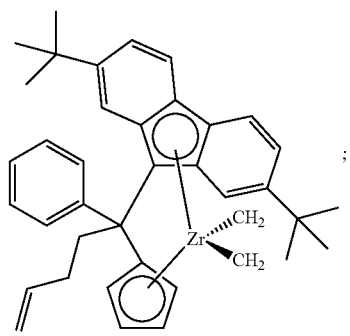

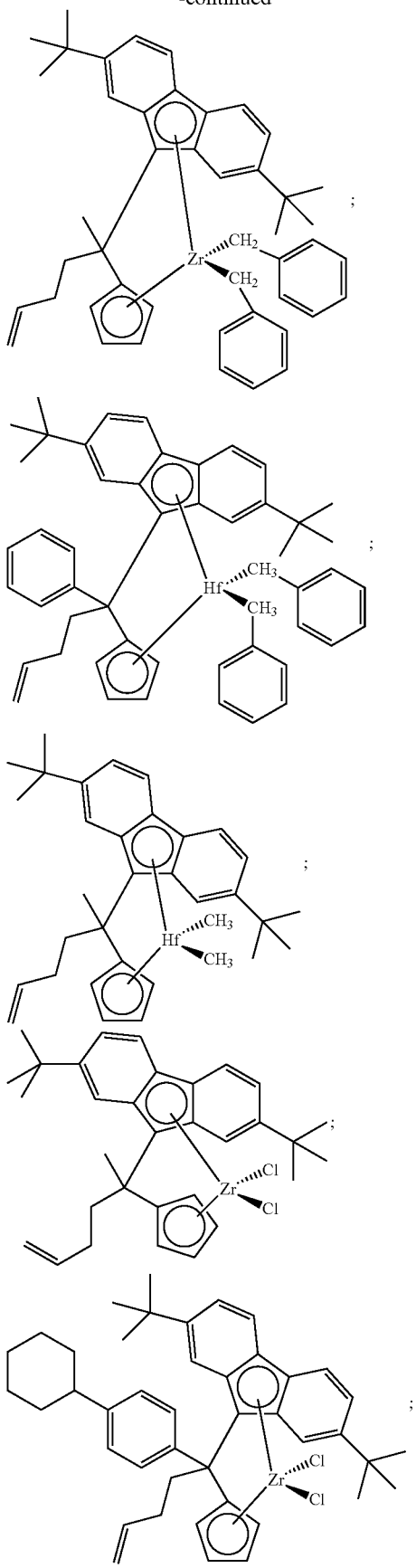
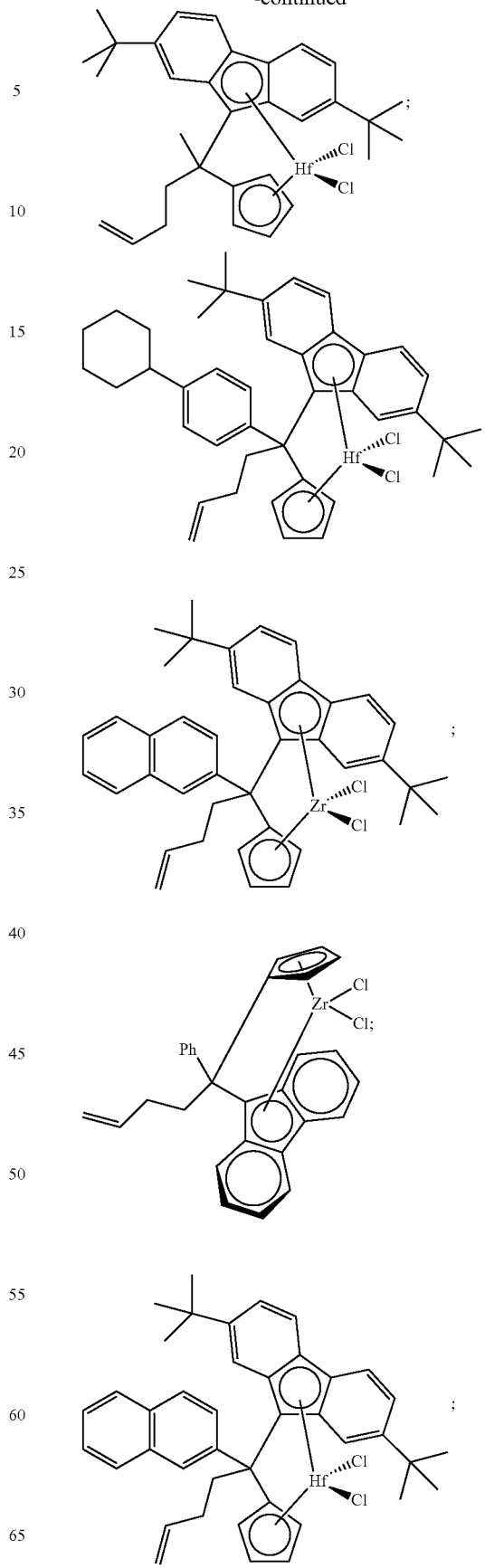

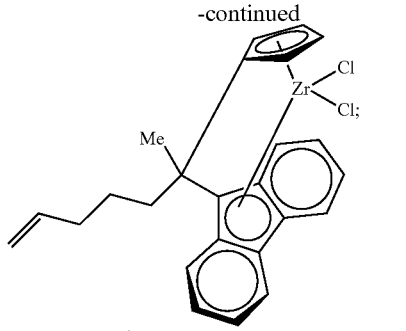
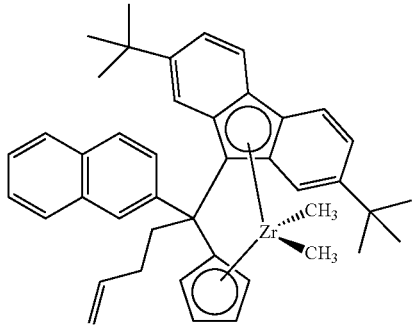
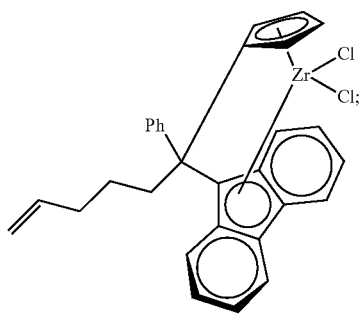
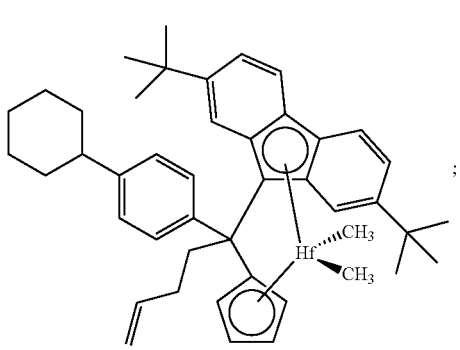
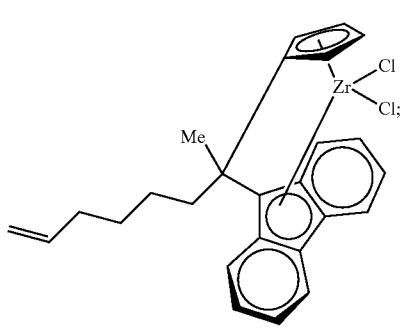
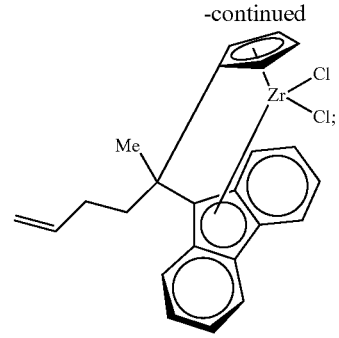
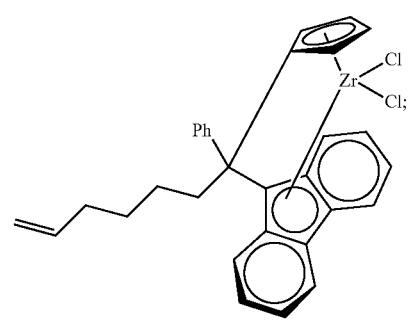
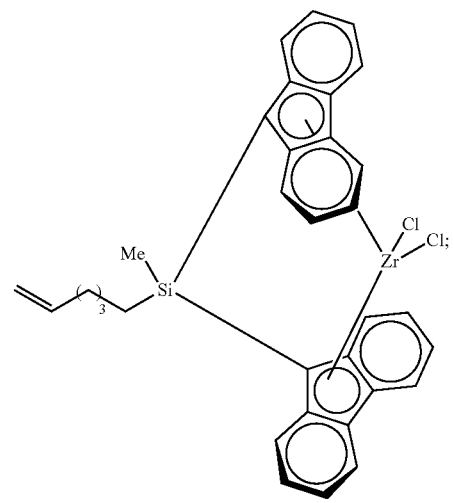
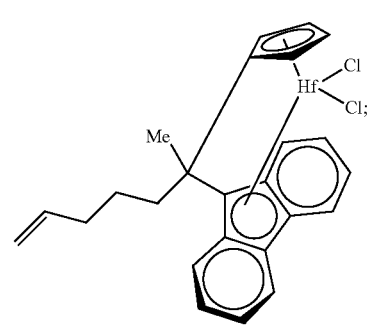

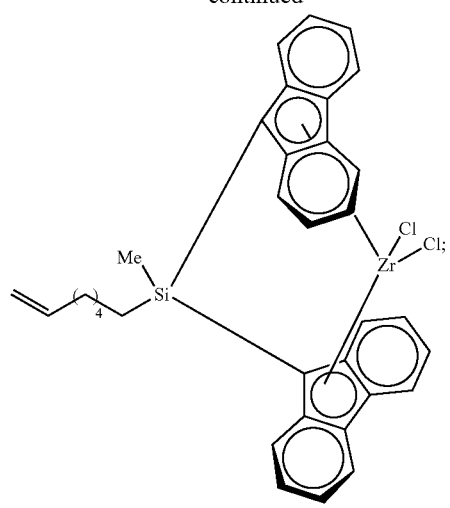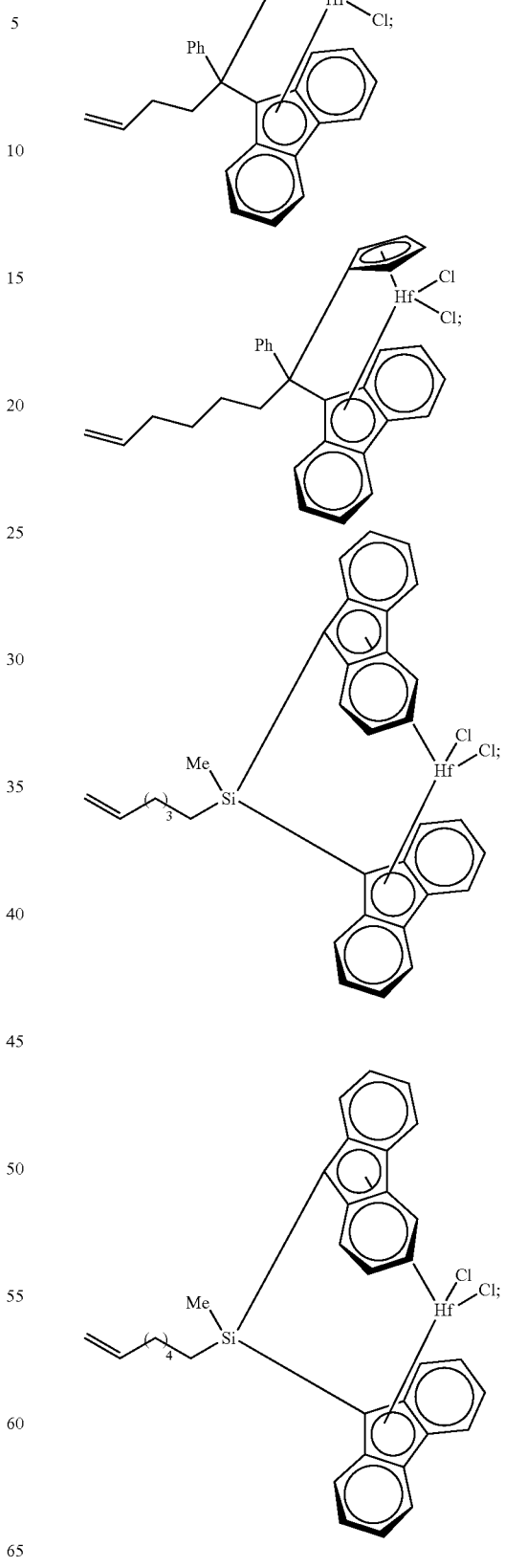
and the like, as well as combinations thereof.

Further non-limiting examples of bridged metallocene compounds having formula (A) and/or suitable for use as catalyst component I can include, but are not limited to, the following compounds:
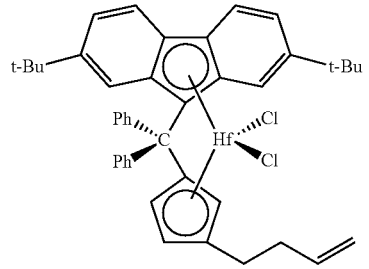
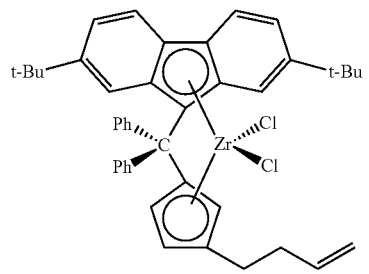
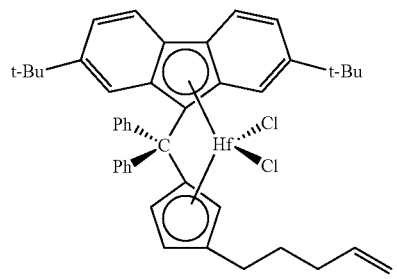
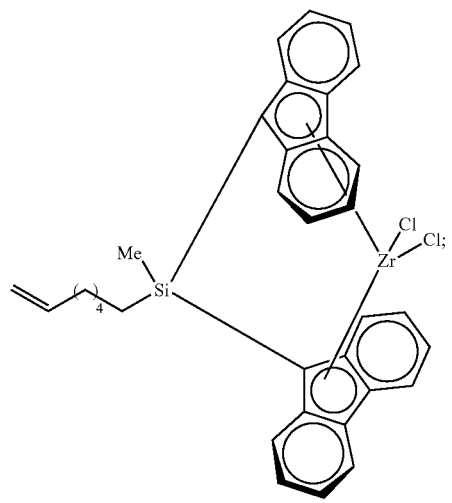
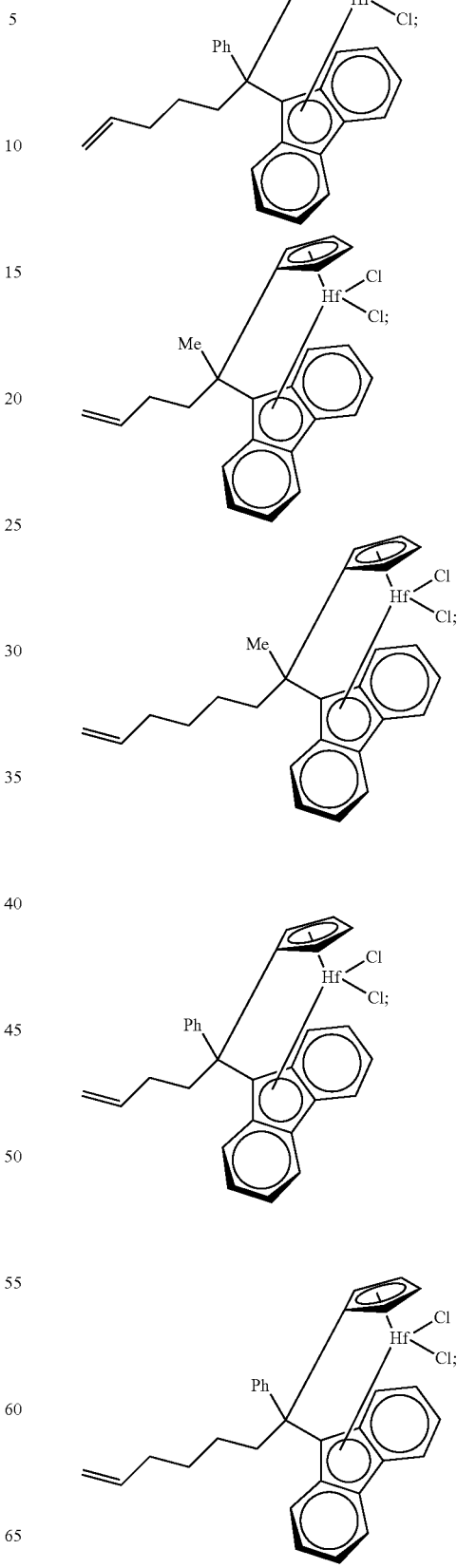

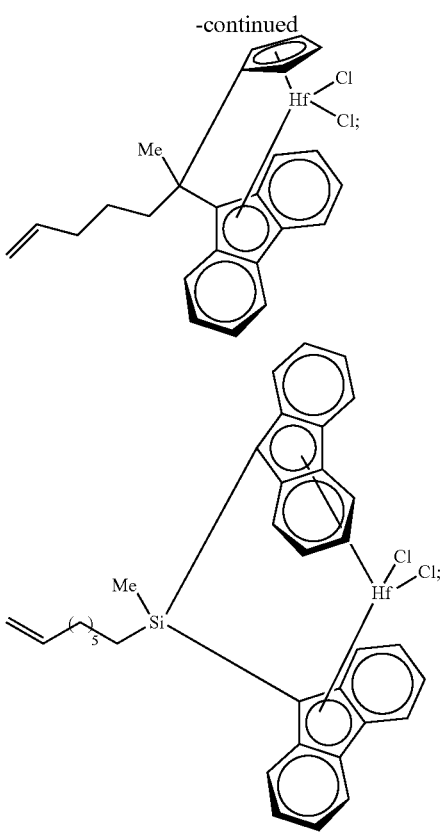

and the like, as well as combinations thereof

Catalyst Component II

Catalyst component II can comprise an unbridged zirconium or hafnium based metallocene compound, or a two carbon bridged, zirconium based metallocene compound containing two indenyl groups. In one aspect, catalyst component II can comprise an unbridged zirconium or hafnium based metallocene compound containing two cyclopentadienyl groups, two indenyl groups, or a cyclopentadienyl and an indenyl group. In another aspect, catalyst component II can comprise an unbridged zirconium based metallocene compound containing two cyclopentadienyl groups, two indenyl groups, or a cyclopentadienyl and an indenyl group. In yet another aspect of this invention, catalyst component II can comprise a two carbon bridged, zirconium based metallocene compound containing two indenyl groups. In still another aspect of this invention, catalyst component II can comprise an unbridged metallocene compound having formula (B):

(B)

Within formula (B), $M^1$, $Cp^A$, $Cp^B$, and each X are independent elements of the unbridged metallocene compound. Accordingly, the unbridged metallocene compound having formula (B) can be described using any combination of $M^1$, $Cp^A$, $Cp^B$, and X disclosed herein. The monoanionic ligand selections for X in formula (B) are the same as those described herein above for formula (A).

In accordance with aspects of this invention, the metal in formula (B), $M^1$, can be Zr or Hf. In one aspect, for instance, $M^1$ can be Zr, while in another aspect, $M^1$ can be Hf.

In formula (B), $Cp^A$ and $Cp^B$ independently can be a substituted or unsubstituted cyclopentadienyl or indenyl group. In one aspect, $Cp^A$ and $Cp^B$ independently can be an unsubstituted cyclopentadienyl or indenyl group.

Alternatively, $Cp^A$ and $Cp^B$ independently can be a substituted indenyl or cyclopentadienyl group, for example, having up to 5 substituents.

If present, each substituent on $Cp^A$ and $Cp^B$ independently can be H, a halide, a $C_1$ to $C_{36}$ hydrocarbyl group, a $C_1$ to $C_{36}$ halogenated hydrocarbyl group, a $C_1$ to $C_{36}$ hydrocarboxy group, or a $C_1$ to $C_{36}$ hydrocarbylsilyl group. Importantly, each substituent on $Cp^A$ and/or $Cp^B$ can be either the same or a different substituent group. Moreover, each substituent can be at any position on the respective cyclopentadienyl or indenyl ring structure that conforms with the rules of chemical valence. In an aspect, the number of substituents on $Cp^A$ and/or on $Cp^B$ and/or the positions of each substituent on $Cp^A$ and/or on $Cp^B$ are independent of each other. For instance, two or more substituents on $Cp^A$ can be different, or alternatively, each substituent on $Cp^A$ can be the same. Additionally or alternatively, two or more substituents on $Cp^B$ can be different, or alternatively, all substituents on $Cp^B$ can be the same. In another aspect, one or more of the substituents on $Cp^A$ can be different from the one or more of the substituents on $Cp^B$, or alternatively, all substituents on both $Cp^A$ and/or on $Cp^B$ can be the same. In these and other aspects, each substituent can be at any position on the respective cyclopentadienyl or indenyl ring structure. If substituted, $Cp^A$ and/or $Cp^B$ independently can have one substituent, two substituents, three substituents, four substituents, and so forth.

In formula (B), each substituent on $Cp^A$ and/or on $Cp^B$ independently can be H, or any halide, $C_1$ to $C_{36}$ hydrocarbyl group, $C_1$ to $C_{36}$ halogenated hydrocarbyl group, $C_1$ to $C_{36}$ hydrocarboxy group, or $C_1$ to $C_{36}$ hydrocarbylsilyl group disclosed herein (e.g., as pertaining to substituents on $Cp^C$ in formula (A)). In one aspect, for example, each substituent on $Cp^A$ and $Cp^B$ independently can be a $C_1$ to $C_{12}$ hydrocarbyl group or a $C_1$ to $C_{12}$ hydrocarbylsilyl group. In another aspect, each substituent on $Cp^A$ and $Cp^B$ independently can be a $C_1$ to $C_8$ alkyl group or a $C_3$ to $C_8$ alkenyl group. In yet another aspect, each substituent on $Cp^A$ and $Cp^B$ independently can be H, Cl, $CF_3$, a methyl group, an ethyl group, a propyl group, a butyl group, a pentyl group, a hexyl group, a heptyl group, an octyl group, a nonyl group, a decyl group, an ethenyl group, a propenyl group, a butenyl group, a pentenyl group, a hexenyl group, a heptenyl group, an octenyl group, a nonenyl group, a decenyl group, a phenyl group, a tolyl group, a benzyl group, a naphthyl group, a trimethylsilyl group, a triisopropylsilyl group, a triphenylsilyl group, or an allyldimethylsilyl group.

Illustrative and non-limiting examples of unbridged metallocene compounds having formula (B) and/or suitable for use as catalyst component II can include, but are not limited to, the following compounds:

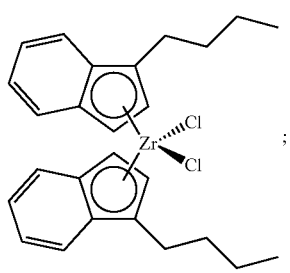

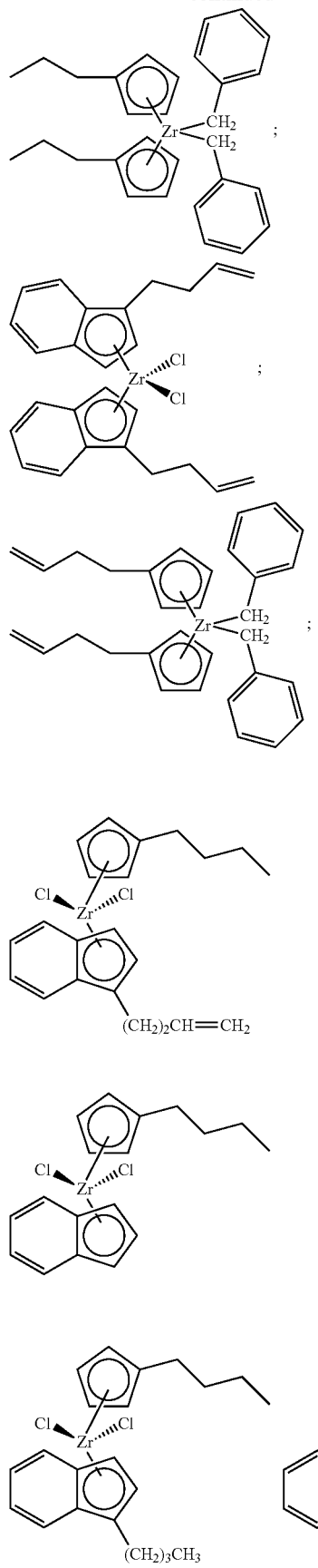
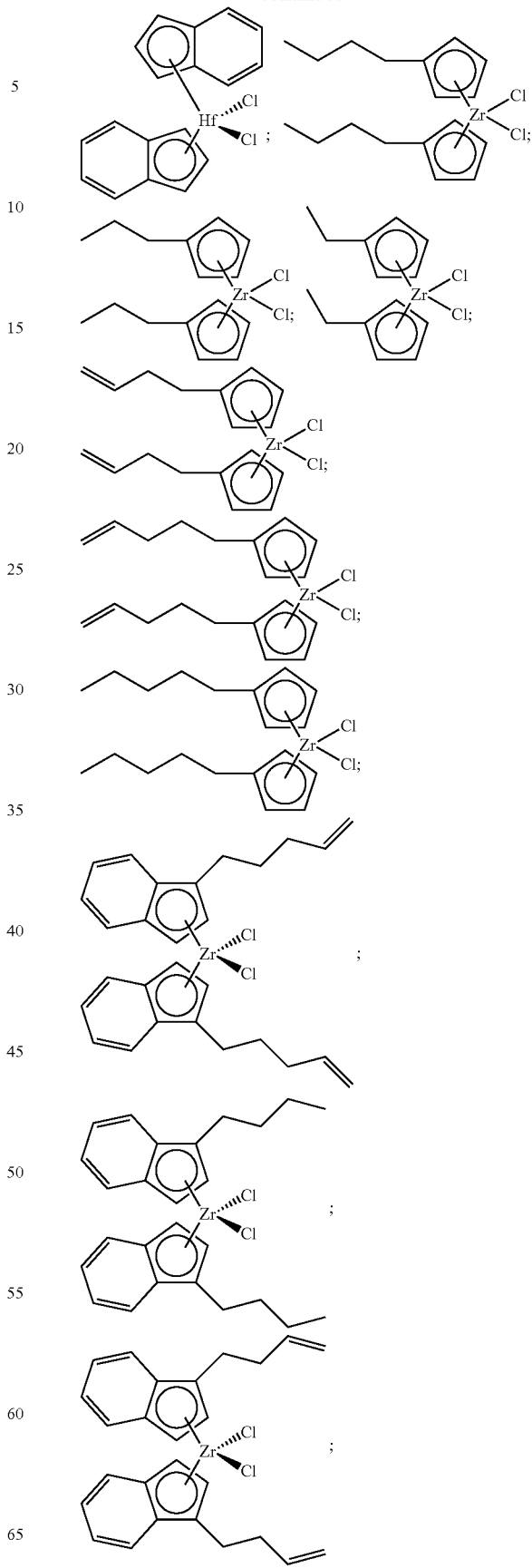

-continued

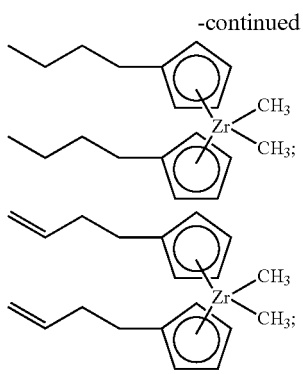

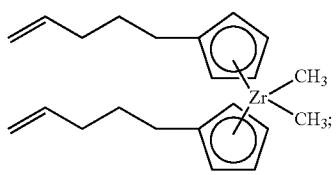

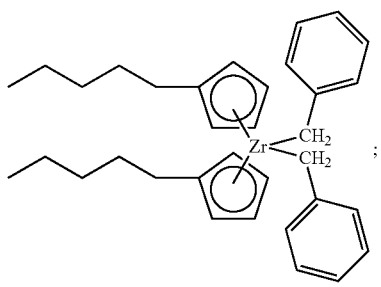

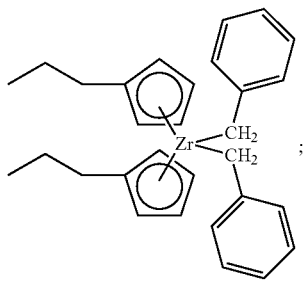

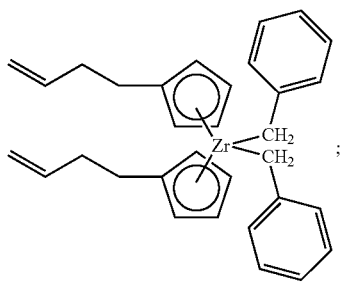

and the like, as well as combinations thereof.

In other aspects of this invention, catalyst component II can comprise a two carbon bridged metallocene compound containing two indenyl groups having the following formula:

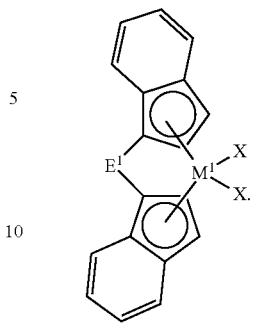

In this formula, the monoanionic ligand selections for X are the same as those described herein above for formula (A), e.g., both X's can be Cl. The metal in this formula, $M^1$, can be Ti, Zr, or Hf. In one aspect, for instance, $M^1$ can be Zr, while in another aspect, $M^1$ can be Hf.

Activator-Supports

The present invention encompasses various catalyst compositions containing an activator-support. In one aspect, the activator-support can comprise a chemically-treated solid oxide. Alternatively, in another aspect, the activator-support can comprise a clay mineral, a pillared clay, an exfoliated clay, an exfoliated clay gelled into another oxide matrix, a layered silicate mineral, a non-layered silicate mineral, a layered aluminosilicate mineral, a non-layered aluminosilicate mineral, or combinations thereof.

Generally, chemically-treated solid oxides exhibit enhanced acidity as compared to the corresponding untreated solid oxide compound. The chemically-treated solid oxide also can function as a catalyst activator as compared to the corresponding untreated solid oxide. While the chemically-treated solid oxide can activate a metallocene complex in the absence of co-catalysts, it is not necessary to eliminate co-catalysts from the catalyst composition. The activation function of the activator-support can enhance the activity of catalyst composition as a whole, as compared to a catalyst composition containing the corresponding untreated solid oxide. However, it is believed that the chemically-treated solid oxide can function as an activator, even in the absence of organoaluminum compounds, aluminoxanes, organoboron or organoborate compounds, ionizing ionic compounds, and the like.

The chemically-treated solid oxide can comprise a solid oxide treated with an electron-withdrawing anion. While not intending to be bound by the following statement, it is believed that treatment of the solid oxide with an electron-withdrawing component augments or enhances the acidity of the oxide. Thus, either the activator-support exhibits Lewis or Brønsted acidity that is typically greater than the Lewis or Brønsted acid strength of the untreated solid oxide, or the activator-support has a greater number of acid sites than the untreated solid oxide, or both. One method to quantify the acidity of the chemically-treated and untreated solid oxide materials can be by comparing the polymerization activities of the treated and untreated oxides under acid catalyzed reactions.

Chemically-treated solid oxides of this invention generally can be formed from an inorganic solid oxide that exhibits Lewis acidic or Brønsted acidic behavior and has a relatively high porosity. The solid oxide can be chemically-treated with an electron-withdrawing component, typically an electron-withdrawing anion, to form an activator-support.

According to one aspect of the present invention, the solid oxide used to prepare the chemically-treated solid oxide can have a pore volume greater than about 0.1 cc/g. According to another aspect of the present invention, the solid oxide can have a pore volume greater than about 0.5 cc/g. According to yet another aspect of the present invention, the solid oxide can have a pore volume greater than about 1.0 cc/g.

In another aspect, the solid oxide can have a surface area of from about 100 to about 1000 m$^2$/g. In yet another aspect, the solid oxide can have a surface area of from about 200 to about 800 m$^2$/g. In still another aspect of the present invention, the solid oxide can have a surface area of from about 250 to about 600 m$^2$/g.

The chemically-treated solid oxide can comprise a solid inorganic oxide comprising oxygen and one or more elements selected from Group 2, 3, 4, 5, 6, 7, 8, 9, 10, 11, 12, 13, 14, or 15 of the periodic table, or comprising oxygen and one or more elements selected from the lanthanide or actinide elements (See: Hawley's Condensed Chemical Dictionary, 11$^{th}$ Ed., John Wiley & Sons, 1995; Cotton, F. A., Wilkinson, G., Murillo, C. A., and Bochmann, M., Advanced Inorganic Chemistry, 6$^{th}$ Ed., Wiley-Interscience, 1999). For example, the inorganic oxide can comprise oxygen and an element, or elements, selected from Al, B, Be, Bi, Cd, Co, Cr, Cu, Fe, Ga, La, Mn, Mo, Ni, Sb, Si, Sn, Sr, Th, Ti, V, W, P, Y, Zn, and Zr.

Suitable examples of solid oxide materials or compounds that can be used to form the chemically-treated solid oxide can include, but are not limited to, $Al_2O_3$, $B_2O_3$, BeO, $Bi_2O_3$, CdO, $Co_3O_4$, $Cr_2O_3$, CuO, $Fe_2O_3$, $Ga_2O_3$, $La_2O_3$, $Mn_2O_3$, $MoO_3$, NiO, $P_2O_5$, $Sb_2O_5$, $SiO_2$, $SnO_2$, SrO, $ThO_2$, $TiO_2$, $V_2O_5$, $WO_3$, $Y_2O_3$, ZnO, $ZrO_2$, and the like, including mixed oxides thereof, coatings of one oxide with another, and combinations thereof. For example, the solid oxide can comprise silica, alumina, silica-alumina, silica-coated alumina, aluminum phosphate, aluminophosphate, heteropolytungstate, titania, zirconia, magnesia, boria, zinc oxide, mixed oxides thereof, or any combination thereof.

The solid oxide of this invention encompasses oxide materials such as alumina, "mixed oxide" compounds thereof such as silica-alumina, and combinations and mixtures thereof. The mixed oxide compounds such as silica-alumina can be single or multiple chemical phases with more than one metal combined with oxygen to form a solid oxide compound. Examples of mixed oxides that can be used in the activator-support of the present invention, either singly or in combination, can include, but are not limited to, silica-alumina, silica-titania, silica-zirconia, zeolites, various clay minerals, alumina-titania, alumina-zirconia, zinc-aluminate, alumina-boria, silica-boria, aluminophosphate-silica, titania-zirconia, and the like. The solid oxide of this invention also encompasses oxide materials such as silica-coated alumina, as described in U.S. Pat. No. 7,884,163, the disclosure of which is incorporated herein by reference in its entirety.

The electron-withdrawing component used to treat the solid oxide can be any component that increases the Lewis or Brønsted acidity of the solid oxide upon treatment (as compared to the solid oxide that is not treated with at least one electron-withdrawing anion). According to one aspect of the present invention, the electron-withdrawing component can be an electron-withdrawing anion derived from a salt, an acid, or other compound, such as a volatile organic compound, that serves as a source or precursor for that anion. Examples of electron-withdrawing anions can include, but are not limited to, sulfate, bisulfate, fluoride, chloride, bromide, iodide, fluorosulfate, fluoroborate, phosphate, fluorophosphate, trifluoroacetate, triflate, fluorozirconate, fluorotitanate, phosphotungstate, and the like, including mixtures and combinations thereof. In addition, other ionic or non-ionic compounds that serve as sources for these electron-withdrawing anions also can be employed in the present invention. It is contemplated that the electron-withdrawing anion can be, or can comprise, fluoride, chloride, bromide, phosphate, triflate, bisulfate, or sulfate, and the like, or any combination thereof, in some aspects of this invention. In other aspects, the electron-withdrawing anion can comprise sulfate, bisulfate, fluoride, chloride, bromide, iodide, fluorosulfate, fluoroborate, phosphate, fluorophosphate, trifluoroacetate, triflate, fluorozirconate, fluorotitanate, and the like, or combinations thereof.

Thus, for example, the activator-support (e.g., chemically-treated solid oxide) used in the catalyst compositions of the present invention can be, or can comprise, fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, and the like, or combinations thereof. In one aspect, the activator-support can be, or can comprise, fluorided alumina, sulfated alumina, fluorided silica-alumina, sulfated silica-alumina, fluorided silica-coated alumina, sulfated silica-coated alumina, phosphated silica-coated alumina, and the like, or any combination thereof. In another aspect, the activator-support can comprise fluorided alumina; alternatively, chlorided alumina; alternatively, sulfated alumina; alternatively, fluorided silica-alumina; alternatively, sulfated silica-alumina; alternatively, fluorided silica-zirconia; alternatively, chlorided silica-zirconia; or alternatively, fluorided silica-coated alumina.

When the electron-withdrawing component comprises a salt of an electron-withdrawing anion, the counterion or cation of that salt can be selected from any cation that allows the salt to revert or decompose back to the acid during calcining. Factors that dictate the suitability of the particular salt to serve as a source for the electron-withdrawing anion can include, but are not limited to, the solubility of the salt in the desired solvent, the lack of adverse reactivity of the cation, ion-pairing effects between the cation and anion, hygroscopic properties imparted to the salt by the cation, and the like, and thermal stability of the anion. Examples of suitable cations in the salt of the electron-withdrawing anion can include, but are not limited to, ammonium, trialkyl ammonium, tetraalkyl ammonium, tetraalkyl phosphonium, H$^+$, [H(OEt$_2$)$_2$]$^+$, and the like.

Further, combinations of one or more different electron-withdrawing anions, in varying proportions, can be used to tailor the specific acidity of the activator-support to the desired level. Combinations of electron-withdrawing components can be contacted with the oxide material simultaneously or individually, and in any order that affords the desired chemically-treated solid oxide acidity. For example, one aspect of this invention can employ two or more electron-withdrawing anion source compounds in two or more separate contacting steps.

Thus, a process by which a chemically-treated solid oxide can be prepared is as follows: a selected solid oxide, or combination of solid oxides, can be contacted with a first electron-withdrawing anion source compound to form a first mixture; this first mixture can be calcined and then contacted with a second electron-withdrawing anion source compound to form a second mixture; the second mixture then can be calcined to form a treated solid oxide. In such a process, the first and second electron-withdrawing anion source compounds can be either the same or different compounds.

According to another aspect of the present invention, the chemically-treated solid oxide can comprise a solid inorganic oxide material, a mixed oxide material, or a combination of inorganic oxide materials, that is chemically-treated with an electron-withdrawing component, and optionally treated with a metal source, including metal salts, metal ions, or other metal-containing compounds. Non-limiting examples of the metal or metal ion can include zinc, nickel, vanadium, titanium, silver, copper, gallium, tin, tungsten, molybdenum, zirconium, and the like, or combinations thereof. Examples of chemically-treated solid oxides that contain a metal or metal ion can include, but are not limited to, chlorided zinc-impregnated alumina, fluorided titanium-impregnated alumina, fluorided zinc-impregnated alumina, chlorided zinc-impregnated silica-alumina, fluorided zinc-impregnated silica-alumina, sulfated zinc-impregnated alumina, chlorided zinc aluminate, fluorided zinc aluminate, sulfated zinc aluminate, silica-coated alumina treated with hexafluorotitanic acid, silica-coated alumina treated with zinc and then fluorided, and the like, or any combination thereof.

Any method of impregnating the solid oxide material with a metal can be used. The method by which the oxide is contacted with a metal source, typically a salt or metal-containing compound, can include, but is not limited to, gelling, co-gelling, impregnation of one compound onto another, and the like. If desired, the metal-containing compound can be added to or impregnated into the solid oxide in solution form, and subsequently converted into the supported metal upon calcining. Accordingly, the solid inorganic oxide can further comprise a metal selected from zinc, titanium, nickel, vanadium, silver, copper, gallium, tin, tungsten, molybdenum, and the like, or combinations of these metals. For example, zinc often can be used to impregnate the solid oxide because it can provide improved catalyst activity at a low cost.

The solid oxide can be treated with metal salts or metal-containing compounds before, after, or at the same time that the solid oxide is treated with the electron-withdrawing anion. Following any contacting method, the contacted mixture of solid compound, electron-withdrawing anion, and the metal ion can be calcined. Alternatively, a solid oxide material, an electron-withdrawing anion source, and the metal salt or metal-containing compound can be contacted and calcined simultaneously.

Various processes can be used to form the chemically-treated solid oxide useful in the present invention. The chemically-treated solid oxide can comprise the contact product of one or more solid oxides with one or more electron-withdrawing anion sources. It is not required that the solid oxide be calcined prior to contacting the electron-withdrawing anion source. Typically, the contact product can be calcined either during or after the solid oxide is contacted with the electron-withdrawing anion source. The solid oxide can be calcined or uncalcined. Various processes to prepare solid oxide activator-supports that can be employed in this invention have been reported. For example, such methods are described in U.S. Pat. Nos. 6,107,230, 6,165,929, 6,294,494, 6,300,271, 6,316,553, 6,355,594, 6,376,415, 6,388,017, 6,391,816, 6,395,666, 6,524,987, 6,548,441, 6,548,442, 6,576,583, 6,613,712, 6,632,894, 6,667,274, and 6,750,302, the disclosures of which are incorporated herein by reference in their entirety.

According to one aspect of the present invention, the solid oxide material can be chemically-treated by contacting it with an electron-withdrawing component, typically an electron-withdrawing anion source. Further, the solid oxide material optionally can be chemically treated with a metal ion, and then calcined to form a metal-containing or metal-impregnated chemically-treated solid oxide. According to another aspect of the present invention, the solid oxide material and electron-withdrawing anion source can be contacted and calcined simultaneously.

The method by which the oxide is contacted with the electron-withdrawing component, typically a salt or an acid of an electron-withdrawing anion, can include, but is not limited to, gelling, co-gelling, impregnation of one compound onto another, and the like. Thus, following any contacting method, the contacted mixture of the solid oxide, electron-withdrawing anion, and optional metal ion, can be calcined.

The solid oxide activator-support (i.e., chemically-treated solid oxide) thus can be produced by a process comprising:
1) contacting a solid oxide (or solid oxides) with an electron-withdrawing anion source compound (or compounds) to form a first mixture; and
2) calcining the first mixture to form the solid oxide activator-support.

According to another aspect of the present invention, the solid oxide activator-support (chemically-treated solid oxide) can be produced by a process comprising:
1) contacting a solid oxide (or solid oxides) with a first electron-withdrawing anion source compound to form a first mixture;
2) calcining the first mixture to produce a calcined first mixture;
3) contacting the calcined first mixture with a second electron-withdrawing anion source compound to form a second mixture; and
4) calcining the second mixture to form the solid oxide activator-support.

According to yet another aspect of the present invention, the chemically-treated solid oxide can be produced or formed by contacting the solid oxide with the electron-withdrawing anion source compound, where the solid oxide compound is calcined before, during, or after contacting the electron-withdrawing anion source, and where there is a substantial absence of aluminoxanes, organoboron or organoborate compounds, and ionizing ionic compounds.

Calcining of the treated solid oxide generally can be conducted in an ambient atmosphere, typically in a dry ambient atmosphere, at a temperature from about 200° C. to about 900° C., and for a time of about 1 minute to about 100 hours. Calcining can be conducted at a temperature of from about 300° C. to about 800° C., or alternatively, at a temperature of from about 400° C. to about 700° C. Calcining can be conducted for about 30 minutes to about 50 hours, or for about 1 hour to about 15 hours. Thus, for example, calcining can be carried out for about 1 to about 10 hours at a temperature of from about 350° C. to about 550° C. Any suitable ambient atmosphere can be employed during calcining. Generally, calcining can be conducted in an oxidizing atmosphere, such as air. Alternatively, an inert atmosphere, such as nitrogen or argon, or a reducing atmosphere, such as hydrogen or carbon monoxide, can be used.

According to one aspect of the present invention, the solid oxide material can be treated with a source of halide ion, sulfate ion, or a combination of anions, optionally treated with a metal ion, and then calcined to provide the chemically-treated solid oxide in the form of a particulate solid. For example, the solid oxide material can be treated with a source of sulfate (termed a "sulfating agent"), a source of bromide ion (termed a "bromiding agent"), a source of chloride ion (termed a "chloriding agent"), a source of fluoride ion (termed a "fluoriding agent"), or a combination thereof, and calcined to provide the solid oxide activator. Useful acidic activator-supports can include, but are not limited to, bromided alumina, chlorided alumina, fluorided alumina, sulfated alumina, bromided silica-alumina, chlorided silica-alumina, fluorided silica-alumina, sulfated silica-alumina, bromided silica-zirconia, chlorided silica-zirconia, fluorided silica-zirconia, sulfated silica-zirconia, fluorided silica-titania, alumina treated with hexafluorotitanic acid, silica-coated alumina treated with hexafluorotitanic acid, silica-alumina treated with hexafluorozirconic acid, silica-alumina treated with trifluoroacetic acid, fluorided boria-alumina, silica treated with tetrafluoroboric acid, alumina treated with tetrafluoroboric acid, alumina treated with hexafluorophosphoric acid, a pillared clay, such as a pillared montmorillonite, optionally treated with fluoride, chloride, or sulfate; phosphated alumina or other aluminophosphates optionally treated with sulfate, fluoride, or chloride; or any combination of the above. Further, any of these activator-supports optionally can be treated or impregnated with a metal ion.

In an aspect, the chemically-treated solid oxide can comprise a fluorided solid oxide in the form of a particulate solid. The fluorided solid oxide can be formed by contacting a solid oxide with a fluoriding agent. The fluoride ion can be added to the oxide by forming a slurry of the oxide in a suitable solvent such as alcohol or water including, but not limited to, the one to three carbon alcohols because of their volatility and low surface tension. Examples of suitable fluoriding agents can include, but are not limited to, hydrofluoric acid (HF), ammonium fluoride ($NH_4F$), ammonium bifluoride ($NH_4HF_2$), ammonium tetrafluoroborate ($NH_4BF_4$), ammonium silicofluoride (hexafluorosilicate) (($NH_4)_2SiF_6$), ammonium hexafluorophosphate ($NH_4PF_6$), hexafluorotitanic acid ($H_2TiF_6$), ammonium hexafluorotitanic acid (($NH_4)_2TiF_6$), hexafluorozirconic acid ($H_2ZrF_6$), $AlF_3$, $NH_4AlF_4$, analogs thereof, and combinations thereof. Triflic acid and ammonium triflate also can be employed. For example, ammonium bifluoride ($NH_4HF_2$) can be used as the fluoriding agent, due to its ease of use and availability.

If desired, the solid oxide can be treated with a fluoriding agent during the calcining step. Any fluoriding agent capable of thoroughly contacting the solid oxide during the calcining step can be used. For example, in addition to those fluoriding agents described previously, volatile organic fluoriding agents can be used. Examples of volatile organic fluoriding agents useful in this aspect of the invention can include, but are not limited to, freons, perfluorohexane, perfluorobenzene, fluoromethane, trifluoroethanol, and the like, and combinations thereof. Calcining temperatures generally must be high enough to decompose the compound and release fluoride.

Gaseous hydrogen fluoride (HF) or fluorine ($F_2$) itself also can be used with the solid oxide if fluorided while calcining. Silicon tetrafluoride ($SiF_4$) and compounds containing tetrafluoroborate ($BF_4^-$) also can be employed. One convenient method of contacting the solid oxide with the fluoriding agent can be to vaporize a fluoriding agent into a gas stream used to fluidize the solid oxide during calcination.

Similarly, in another aspect of this invention, the chemically-treated solid oxide can comprise a chlorided solid oxide in the form of a particulate solid. The chlorided solid oxide can be formed by contacting a solid oxide with a chloriding agent. The chloride ion can be added to the oxide by forming a slurry of the oxide in a suitable solvent. The solid oxide can be treated with a chloriding agent during the calcining step. Any chloriding agent capable of serving as a source of chloride and thoroughly contacting the oxide during the calcining step can be used, such as $SiCl_4$, $SiMe_2Cl_2$, $TiCl_4$, $BCl_3$, and the like, including mixtures thereof. Volatile organic chloriding agents can be used. Examples of suitable volatile organic chloriding agents can include, but are not limited to, certain freons, perchlorobenzene, chloromethane, dichloromethane, chloroform, carbon tetrachloride, trichloroethanol, and the like, or any combination thereof. Gaseous hydrogen chloride or chlorine itself also can be used with the solid oxide during calcining. One convenient method of contacting the oxide with the chloriding agent can be to vaporize a chloriding agent into a gas stream used to fluidize the solid oxide during calcination.

The amount of fluoride or chloride ion present before calcining the solid oxide generally can be from about 1 to about 50% by weight, where the weight percent is based on the weight of the solid oxide, for example, silica-alumina, before calcining According to another aspect of this invention, the amount of fluoride or chloride ion present before calcining the solid oxide can be from about 1 to about 25% by weight, and according to another aspect of this invention, from about 2 to about 20% by weight. According to yet another aspect of this invention, the amount of fluoride or chloride ion present before calcining the solid oxide can be from about 4 to about 10% by weight. Once impregnated with halide, the halided oxide can be dried by any suitable method including, but not limited to, suction filtration followed by evaporation, drying under vacuum, spray drying, and the like, although it is also possible to initiate the calcining step immediately without drying the impregnated solid oxide.

The silica-alumina used to prepare the treated silica-alumina typically can have a pore volume greater than about 0.5 cc/g. According to one aspect of the present invention, the pore volume can be greater than about 0.8 cc/g, and according to another aspect of the present invention, greater than about 1.0 cc/g. Further, the silica-alumina generally can have a surface area greater than about 100 $m^2/g$. According to another aspect of this invention, the surface area can be greater than about 250 $m^2/g$. Yet, in another aspect, the surface area can be greater than about 350 $m^2/g$.

The silica-alumina utilized in the present invention typically can have an alumina content from about 5 to about 95% by weight. According to one aspect of this invention, the alumina content of the silica-alumina can be from about 5 to about 50%, or from about 8% to about 30%, alumina by weight. In another aspect, high alumina content silica-alumina compounds can be employed, in which the alumina content of these silica-alumina compounds typically ranges from about 60% to about 90%, or from about 65% to about 80%, alumina by weight. According to yet another aspect of this invention, the solid oxide component can comprise alumina without silica, and according to another aspect of this invention, the solid oxide component can comprise silica without alumina.

The sulfated solid oxide can comprise sulfate and a solid oxide component, such as alumina or silica-alumina, in the form of a particulate solid. Optionally, the sulfated oxide can be treated further with a metal ion such that the calcined sulfated oxide comprises a metal. According to one aspect of the present invention, the sulfated solid oxide can comprise sulfate and alumina. In some instances, the sulfated alumina can be formed by a process wherein the alumina is treated with a sulfate source, for example, sulfuric acid or a sulfate salt such as ammonium sulfate. This process generally can be performed by forming a slurry of the alumina in a suitable solvent, such as alcohol or water, in which the desired concentration of the sulfating agent has been added. Suitable organic solvents can include, but are not limited to, the one to three carbon alcohols because of their volatility and low surface tension.

According to one aspect of this invention, the amount of sulfate ion present before calcining can be from about 0.5 to about 100 parts by weight sulfate ion to about 100 parts by weight solid oxide. According to another aspect of this invention, the amount of sulfate ion present before calcining can be from about 1 to about 50 parts by weight sulfate ion to about 100 parts by weight solid oxide, and according to still another aspect of this invention, from about 5 to about 30 parts by weight sulfate ion to about 100 parts by weight solid oxide. These weight ratios are based on the weight of the solid oxide before calcining. Once impregnated with sulfate, the sulfated oxide can be dried by any suitable method including, but not limited to, suction filtration followed by evaporation, drying under vacuum, spray drying, and the like, although it is also possible to initiate the calcining step immediately.

According to another aspect of the present invention, the activator-support used in preparing the catalyst compositions of this invention can comprise an ion-exchangeable activator-support including, but not limited to, silicate and aluminosilicate compounds or minerals, either with layered or non-layered structures, and combinations thereof. In another aspect of this invention, ion-exchangeable, layered aluminosilicates such as pillared clays can be used as activator-supports. When the acidic activator-support comprises an ion-exchangeable activator-support, it can optionally be treated with at least one electron-withdrawing anion such as those disclosed herein, though typically the ion-exchangeable activator-support is not treated with an electron-withdrawing anion.

According to another aspect of the present invention, the activator-support of this invention can comprise clay minerals having exchangeable cations and layers capable of expanding. Typical clay mineral activator-supports can include, but are not limited to, ion-exchangeable, layered aluminosilicates such as pillared clays. Although the term "support" is used, it is not meant to be construed as an inert component of the catalyst composition, but rather can be considered an active part of the catalyst composition, because of its intimate association with the metallocene component(s).

According to another aspect of the present invention, the clay materials of this invention can encompass materials either in their natural state or that have been treated with various ions by wetting, ion exchange, or pillaring. Typically, the clay material activator-support of this invention can comprise clays that have been ion exchanged with large cations, including polynuclear, highly charged metal complex cations. However, the clay material activator-supports of this invention also can encompass clays that have been ion exchanged with simple salts, including, but not limited to, salts of Al(III), Fe(II), Fe(III), and Zn(II) with ligands such as halide, acetate, sulfate, nitrate, or nitrite.

According to another aspect of the present invention, the activator-support can comprise a pillared clay. The term "pillared clay" is used to refer to clay materials that have been ion exchanged with large, typically polynuclear, highly charged metal complex cations. Examples of such ions can include, but are not limited to, Keggin ions which can have charges such as 7+, various polyoxometallates, and other large ions. Thus, the term pillaring can refer to a simple exchange reaction in which the exchangeable cations of a clay material are replaced with large, highly charged ions, such as Keggin ions. These polymeric cations then can be immobilized within the interlayers of the clay and when calcined are converted to metal oxide "pillars," effectively supporting the clay layers as column-like structures. Thus, once the clay is dried and calcined to produce the supporting pillars between clay layers, the expanded lattice structure can be maintained and the porosity can be enhanced. The resulting pores can vary in shape and size as a function of the pillaring material and the parent clay material used. Examples of pillaring and pillared clays are found in: T. J. Pinnavaia, Science 220 (4595), 365-371 (1983); J. M. Thomas, Intercalation Chemistry, (S. Whittington and A. Jacobson, eds.) Ch. 3, pp. 55-99, Academic Press, Inc., (1972); U.S. Pat. No. 4,452,910; U.S. Pat. No. 5,376,611; and U.S. Pat. No. 4,060,480; the disclosures of which are incorporated herein by reference in their entirety.

The pillaring process can utilize clay minerals having exchangeable cations and layers capable of expanding. Any pillared clay that can enhance the polymerization of olefins in the catalyst composition of the present invention can be used. Therefore, suitable clay minerals for pillaring can include, but are not limited to, allophanes; smectites, both dioctahedral (Al) and tri-octahedral (Mg) and derivatives thereof such as montmorillonites (bentonites), nontronites, hectorites, or laponites; halloysites; vermiculites; micas; fluoromicas; chlorites; mixed-layer clays; the fibrous clays including but not limited to sepiolites, attapulgites, and palygorskites; a serpentine clay; illite; laponite; saponite; and any combination thereof. In one aspect, the pillared clay activator-support can comprise bentonite or montmorillonite. The principal component of bentonite is montmorillonite.

The pillared clay can be pretreated if desired. For example, a pillared bentonite can be pretreated by drying at about 300° C. under an inert atmosphere, typically dry nitrogen, for about 3 hours, before being added to the polymerization reactor. Although an exemplary pretreatment is described herein, it should be understood that the preheating can be carried out at many other temperatures and times, including any combination of temperature and time steps, all of which are encompassed by this invention.

The activator-support used to prepare the catalyst compositions of the present invention can be combined with other inorganic support materials, including, but not limited to, zeolites, inorganic oxides, phosphated inorganic oxides, and the like. In one aspect, typical support materials that can be used include, but are not limited to, silica, silica-alumina, alumina, titania, zirconia, magnesia, boria, thoria, aluminophosphate, aluminum phosphate, silica-titania, coprecipitated silica/titania, mixtures thereof, or any combination thereof.

According to another aspect of the present invention, one or more of the metallocene compounds can be precontacted with an olefin monomer and an organoaluminum compound for a first period of time prior to contacting this mixture with the activator-support. Once the precontacted mixture of metallocene complex(es), olefin monomer, and organoaluminum compound is contacted with the activator-support, the composition further comprising the activator-support can be termed a "postcontacted" mixture. The postcontacted mixture can be allowed to remain in further contact for a second period of time prior to being charged into the reactor in which the polymerization process will be carried out.

According to yet another aspect of the present invention, one or more of the metallocene compounds can be precontacted with an olefin monomer and an activator-support for a first period of time prior to contacting this mixture with the organoaluminum compound. Once the precontacted mixture of the metallocene complex(es), olefin monomer, and activator-support is contacted with the organoaluminum compound, the composition further comprising the organoaluminum can be termed a "postcontacted" mixture. The postcontacted mixture can be allowed to remain in further contact for a second period of time prior to being introduced into the polymerization reactor.

Co-Catalysts

In certain aspects directed to catalyst compositions containing a co-catalyst, the co-catalyst can comprise a metal hydrocarbyl compound, examples of which include non-halide metal hydrocarbyl compounds, metal hydrocarbyl halide compounds, non-halide metal alkyl compounds, metal alkyl halide compounds, and so forth. The hydrocarbyl group (or alkyl group) can be any hydrocarbyl (or alkyl) group disclosed herein. Moreover, in some aspects, the metal of the metal hydrocarbyl can be a group 1, 2, 11, 12, 13, or 14 metal; alternatively, a group 13 or 14 metal; or alternatively, a group 13 metal. Hence, in some aspects, the metal of the metal hydrocarbyl (non-halide metal hydrocarbyl or metal hydrocarbyl halide) can be lithium, sodium, potassium, rubidium, cesium, beryllium, magnesium, calcium, strontium, barium, zinc, cadmium, boron, aluminum, or tin; alternatively, lithium, sodium, potassium, magnesium, calcium, zinc, boron, aluminum, or tin; alternatively, lithium, sodium, or potassium; alternatively, magnesium or calcium; alternatively, lithium; alternatively, sodium; alternatively, potassium; alternatively, magnesium; alternatively, calcium; alternatively, zinc; alternatively, boron; alternatively, aluminum; or alternatively, tin. In some aspects, the metal hydrocarbyl or metal alkyl, with or without a halide, can comprise a lithium hydrocarbyl or alkyl, a magnesium hydrocarbyl or alkyl, a boron hydrocarbyl or alkyl, a zinc hydrocarbyl or alkyl, or an aluminum hydrocarbyl or alkyl.

In particular aspects directed to catalyst compositions containing a co-catalyst (e.g., the activator can comprise a solid oxide treated with an electron-withdrawing anion), the co-catalyst can comprise an aluminoxane compound, an organoboron or organoborate compound, an ionizing ionic compound, an organoaluminum compound, an organozinc compound, an organomagnesium compound, or an organolithium compound, and this includes any combinations of these materials. In one aspect, the co-catalyst can comprise an organoaluminum compound. In another aspect, the co-catalyst can comprise an aluminoxane compound, an organoboron or organoborate compound, an ionizing ionic compound, an organozinc compound, an organomagnesium compound, an organolithium compound, or any combination thereof. In yet another aspect, the co-catalyst can comprise an aluminoxane compound; alternatively, an organoboron or organoborate compound; alternatively, an ionizing ionic compound; alternatively, an organozinc compound; alternatively, an organomagnesium compound; or alternatively, an organolithium compound.

Organoaluminum Compounds

In some aspects, catalyst compositions of the present invention can comprise one or more organoaluminum compounds. Such compounds can include, but are not limited to, compounds having the formula:

where each $R^Z$ independently can be an aliphatic group having from 1 to 10 carbon atoms. For example, each $R^Z$ independently can be methyl, ethyl, propyl, butyl, hexyl, or isobutyl.

Other organoaluminum compounds which can be used in catalyst compositions disclosed herein can include, but are not limited to, compounds having the formula:

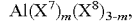

where each $X^7$ independently can be a hydrocarbyl; each $X^8$ independently can be an alkoxide or an aryloxide, a halide, or a hydride; and m can be from 1 to 3, inclusive. Hydrocarbyl is used herein to specify a hydrocarbon radical group and includes, for instance, aryl, alkyl, cycloalkyl, alkenyl, cycloalkenyl, cycloalkadienyl, alkynyl, aralkyl, aralkenyl, and aralkynyl groups.

In one aspect, each $X^7$ independently can be any hydrocarbyl having from 1 to about 18 carbon atoms disclosed herein. In another aspect of the present invention, each $X^7$ independently can be any alkyl having from 1 to 10 carbon atoms disclosed herein. For example, each $X^7$ independently can be methyl, ethyl, propyl, n-butyl, sec-butyl, isobutyl, or hexyl, and the like, in yet another aspect of the present invention.

According to one aspect of the present invention, each $X^8$ independently can be an alkoxide or an aryloxide, any one of which has from 1 to 18 carbon atoms, a halide, or a hydride. In another aspect of the present invention, each $X^8$ can be selected independently from fluorine and chlorine. Yet, in another aspect, $X^8$ can be chlorine.

In the formula, $Al(X^7)_m(X^8)_{3-m}$, m can be a number from 1 to 3, inclusive, and typically, m can be 3. The value of m is not restricted to be an integer; therefore, this formula can include sesquihalide compounds or other organoaluminum cluster compounds.

Examples of organoaluminum compounds suitable for use in accordance with the present invention can include, but are not limited to, trialkylaluminum compounds, dialkylaluminum halide compounds, dialkylaluminum alkoxide compounds, dialkylaluminum hydride compounds, and combinations thereof. Specific non-limiting examples of suitable organoaluminum compounds can include trimethylaluminum (TMA), triethylaluminum (TEA), tri-n-propylaluminum (TNPA), tri-n-butylaluminum (TNBA), triisobutylaluminum (TIBA), tri-n-hexylaluminum, tri-n-octylaluminum, diisobutylaluminum hydride, diethylaluminum ethoxide, diethylaluminum chloride, and the like, or combinations thereof.

The present invention contemplates a method of precontacting a metallocene compound (one or more) with an organoaluminum compound and an olefin monomer to form a precontacted mixture, prior to contacting this precontacted mixture with an activator-support to form a catalyst composition. When the catalyst composition is prepared in this manner, typically, though not necessarily, a portion of the organoaluminum compound can be added to the precontacted mixture and another portion of the organoaluminum compound can be added to the postcontacted mixture prepared when the precontacted mixture is contacted with the solid oxide activator-support. However, the entire organoaluminum compound can be used to prepare the catalyst composition in either the precontacting or postcontacting step. Alternatively, all the catalyst components can be contacted in a single step.

Further, more than one organoaluminum compound can be used in either the precontacting or the postcontacting step. When an organoaluminum compound is added in multiple steps, the amounts of organoaluminum compound disclosed herein include the total amount of organoaluminum compound used in both the precontacted and postcontacted mixtures, and any additional organoaluminum compound added to the polymerization reactor. Therefore, total amounts of organoaluminum compounds are disclosed regardless of whether a single organoaluminum compound or more than one organoaluminum compound is used.

Aluminoxane Compounds

Certain aspects of the present invention provide a catalyst composition which can comprise an aluminoxane compound. As used herein, the terms "aluminoxane" and "aluminoxane compound" refer to aluminoxane compounds, compositions, mixtures, or discrete species, regardless of how such aluminoxanes are prepared, formed or otherwise provided. For example, a catalyst composition comprising an aluminoxane compound can be prepared in which aluminoxane is provided as the poly(hydrocarbyl aluminum oxide), or in which aluminoxane is provided as the combination of an aluminum alkyl compound and a source of active protons such as water. Aluminoxanes also can be referred to as poly(hydrocarbyl aluminum oxides) or organoaluminoxanes.

The other catalyst components typically can be contacted with the aluminoxane in a saturated hydrocarbon compound solvent, though any solvent that is substantially inert to the reactants, intermediates, and products of the activation step can be used. The catalyst composition formed in this manner can be collected by any suitable method, for example, by filtration. Alternatively, the catalyst composition can be introduced into the polymerization reactor without being isolated.

The aluminoxane compound of this invention can be an oligomeric aluminum compound comprising linear structures, cyclic structures, or cage structures, or mixtures of all three. Cyclic aluminoxane compounds having the formula:

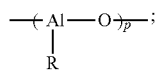

wherein each R in this formula independently can be a linear or branched alkyl having from 1 to 10 carbon atoms, and p in this formula can be an integer from 3 to 20, are encompassed by this invention. The AlRO moiety shown here also can constitute the repeating unit in a linear aluminoxane. Thus, linear aluminoxanes having the formula:

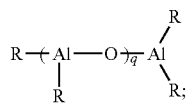

wherein each R in this formula independently can be a linear or branched alkyl having from 1 to 10 carbon atoms, and q in this formula can be an integer from 1 to 50, are also encompassed by this invention.

Further, aluminoxanes can have cage structures of the formula $R^t_{5r+\alpha} R^b_{r-\alpha} Al_{4r} O_{3r}$, wherein each $R^t$ independently can be a terminal linear or branched alkyl group having from 1 to 10 carbon atoms; each $R^b$ independently can be a bridging linear or branched alkyl group having from 1 to 10 carbon atoms; r can be 3 or 4; and a can be equal to $n_{Al(3)} - n_{O(2)} + n_{O(4)}$, wherein $n_{Al(3)}$ is the number of three coordinate aluminum atoms, $n_{O(2)}$ is the number of two coordinate oxygen atoms, and $n_{O(4)}$ is the number of 4 coordinate oxygen atoms.

Thus, aluminoxanes which can be employed in the catalyst compositions of the present invention can be represented generally by formulas such as $(R-Al-O)_p$, $R(R-Al-jO)_q AlR_2$, and the like. In these formulas, each R group independently can be a linear or branched $C_1$-$C_6$ alkyl, such as methyl, ethyl, propyl, butyl, pentyl, or hexyl. Examples of aluminoxane compounds that can be used in accordance with the present invention can include, but are not limited to, methylaluminoxane, modified methylaluminoxane, ethylaluminoxane, n-propylaluminoxane, iso-propylaluminoxane, n-butylaluminoxane, t-butylaluminoxane, sec-butylaluminoxane, iso-butylaluminoxane, 1-pentylaluminoxane, 2-pentylaluminoxane, 3-pentylaluminoxane, isopentylaluminoxane, neopentylaluminoxane, and the like, or any combination thereof. Methylaluminoxane, ethylaluminoxane, and iso-butylaluminoxane can be prepared from trimethylaluminum, triethylaluminum, or triisobutylaluminum, respectively, and sometimes are referred to as poly(methyl aluminum oxide), poly(ethyl aluminum oxide), and poly(isobutyl aluminum oxide), respectively. It is also within the scope of the invention to use an aluminoxane in combination with a trialkylaluminum, such as that disclosed in U.S. Pat. No. 4,794,096, incorporated herein by reference in its entirety.

The present invention contemplates many values of p and q in the aluminoxane formulas $(R-Al-O)_p$ and $R(R-Al-O)_q AlR_2$, respectively. In some aspects, p and q can be at least 3. However, depending upon how the organoaluminoxane is prepared, stored, and used, the value of p and q can vary within a single sample of aluminoxane, and such combinations of organoaluminoxanes are contemplated herein.

In preparing a catalyst composition containing an aluminoxane, the molar ratio of the total moles of aluminum in the aluminoxane (or aluminoxanes) to the total moles of metallocene complex(es) in the composition generally can be between about 1:10 and about 100,000:1. In another aspect, the molar ratio can be in a range from about 5:1 to about 15,000:1. Optionally, aluminoxane can be added to a polymerization zone in ranges from about 0.01 mg/L to about 1000 mg/L, from about 0.1 mg/L to about 100 mg/L, or from about 1 mg/L to about 50 mg/L.

Organoaluminoxanes can be prepared by various procedures. Examples of organoaluminoxane preparations are disclosed in U.S. Pat. Nos. 3,242,099 and 4,808,561, the disclosures of which are incorporated herein by reference in their entirety. For example, water in an inert organic solvent can be reacted with an aluminum alkyl compound, such as $(R^Z)_3Al$, to form the desired organoaluminoxane compound. While not intending to be bound by this statement, it is believed that this synthetic method can afford a mixture of both linear and cyclic R—Al—O aluminoxane species, both of which are encompassed by this invention. Alternatively, organoaluminoxanes can be prepared by reacting an aluminum alkyl compound, such as $(R^Z)_3Al$, with a hydrated salt, such as hydrated copper sulfate, in an inert organic solvent.

Organoboron & Organoborate Compounds

According to another aspect of the present invention, the catalyst composition can comprise an organoboron or organoborate compound. Such compounds can include neutral boron compounds, borate salts, and the like, or combinations thereof. For example, fluoroorgano boron compounds and fluoroorgano borate compounds are contemplated.

Any fluoroorgano boron or fluoroorgano borate compound can be utilized with the present invention. Examples of fluoroorgano borate compounds that can be used in the present invention can include, but are not limited to, fluorinated aryl borates such as N,N-dimethylanilinium tetrakis(pentafluorophenyl)borate, triphenylcarbenium tetrakis(pentafluorophenyl)borate, lithium tetrakis(pentafluorophenyl)borate, N,N-dimethylanilinium tetrakis[3,5-bis(trifluoromethyl)phenyl]borate, triphenylcarbenium tetrakis[3,5-bis(trifluoromethyl)phenyl]borate, and the like, or mixtures thereof. Examples of fluoroorgano boron compounds that can be used as co-catalysts in the present invention can include, but are not limited to, tris(pentafluorophenyl)boron, tris[3,5-bis(trifluoromethyl)phenyl]boron, and the like, or mixtures thereof. Although not intending to be bound by the following theory, these examples of fluoroorgano borate and fluoroorgano boron compounds, and related compounds, can form "weakly-coordinating" anions when combined with a transition metal complex (see e.g., U.S. Pat. No. 5,919,983, the disclosure of which is incorporated herein by reference in its entirety). Applicants also contemplate the use of diboron, or bis-boron, compounds or other bifunctional compounds containing two or more boron atoms in the chemical structure, such as disclosed in J. Am. Chem. Soc., 2005, 127, pp. 14756-14768, the content of which is incorporated herein by reference in its entirety.

Generally, any amount of organoboron compound can be used. According to one aspect of this invention, the molar ratio of the total moles of organoboron or organoborate compound (or compounds) to the total moles of metallocene compounds in the catalyst composition can be in a range from about 0.1:1 to about 15:1. Typically, the amount of the fluoroorgano boron or fluoroorgano borate compound used can be from about 0.5 moles to about 10 moles of boron/borate compound per mole of metallocene complexes. According to another aspect of this invention, the amount of fluoroorgano boron or fluoroorgano borate compound can be from about 0.8 moles to about 5 moles of boron/borate compound per mole of metallocene complexes.

Ionizing Ionic Compounds

In another aspect, catalyst compositions disclosed herein can comprise an ionizing ionic compound. An ionizing ionic compound is an ionic compound that can function as a co-catalyst to enhance the activity of the catalyst composition. While not intending to be bound by theory, it is believed that the ionizing ionic compound can be capable of reacting with a metallocene complex and converting the metallocene complex into one or more cationic metallocene complexes, or incipient cationic metallocene complexes. Again, while not intending to be bound by theory, it is believed that the ionizing ionic compound can function as an ionizing compound by completely or partially extracting an anionic ligand, such as monoanionic ligand X, from the metallocene complex. However, the ionizing ionic compound can be a co-catalyst regardless of whether it is ionizes the metallocene compound, abstracts a X ligand in a fashion as to form an ion pair, weakens the metal-X bond in the metallocene, simply coordinates to a X ligand, or activates the metallocene by some other mechanism.

Further, it is not necessary that the ionizing ionic compound activate the metallocene compound only. The activation function of the ionizing ionic compound can be evident in the enhanced activity of catalyst composition as a whole, as compared to a catalyst composition that does not contain an ionizing ionic compound.

Examples of ionizing ionic compounds can include, but are not limited to, the following compounds: tri(n-butyl)ammonium tetrakis(p-tolyl)borate, tri(n-butyl) ammonium tetrakis(m-tolyl)borate, tri(n-butyl)ammonium tetrakis(2,4-dimethylphenyl)borate, tri(n-butyl)ammonium tetrakis(3,5-dimethylphenyl)borate, tri(n-butyl)ammonium tetrakis[3,5-bis(trifluoromethyl)phenyl]borate, tri(n-butyl)ammonium tetrakis(pentafluorophenyl)borate, N,N-dimethylanilinium tetrakis(p-tolyl)borate, N,N-dimethylanilinium tetrakis(m-tolyl)borate, N,N-dimethylanilinium tetrakis(2,4-dimethylphenyl)borate, N,N-dimethylanilinium tetrakis(3,5-dimethyl-phenyl)borate, N,N-dimethylanilinium tetrakis[3,5-bis(trifluoromethyl)phenyl]borate, N,N-dimethylanilinium tetrakis(pentafluorophenyl)borate, triphenylcarbenium tetrakis(p-tolyl)borate, triphenylcarbenium tetrakis(m-tolyl) borate, triphenylcarbenium tetrakis(2,4-dimethylphenyl)borate, triphenylcarbenium tetrakis(3,5-dimethylphenyl) borate, triphenylcarbenium tetrakis[3,5-bis(trifluoromethyl) phenyl]borate, triphenylcarbenium tetrakis (pentafluorophenyl)borate, tropylium tetrakis(p-tolyl)borate, tropylium tetrakis(m-tolyl)borate, tropylium tetrakis(2,4-dimethylphenyl)borate, tropylium tetrakis(3,5-dimethylphenyl)borate, tropylium tetrakis[3,5-bis(trifluoromethyl)phenyl]borate, tropylium tetrakis(pentafluorophenyl)borate, lithium tetrakis(pentafluorophenyl)borate, lithium tetraphenylborate, lithium tetrakis(p-tolyl)borate, lithium tetrakis(m-tolyl)borate, lithium tetrakis(2,4-dimethylphenyl)borate, lithium tetrakis(3,5-dimethylphenyl)borate, lithium tetrafluoroborate, sodium tetrakis(pentafluorophenyl)borate, sodium tetraphenylborate, sodium tetrakis(p-tolyl)borate, sodium tetrakis(m-tolyl)borate, sodium tetrakis(2,4-dimethylphenyl)borate, sodium tetrakis(3,5-dimethylphenyl)borate, sodium tetrafluoroborate, potassium tetrakis(pentafluorophenyl)borate, potassium tetraphenylborate, potassium tetrakis(p-tolyl)borate, potassium tetrakis(m-tolyl)borate, potassium tetrakis(2,4-dimethylphenyl)borate, potassium tetrakis(3,5-dimethylphenyl)borate, potassium tetrafluoroborate, lithium tetrakis(pentafluorophenyl)aluminate, lithium tetraphenylaluminate, lithium tetrakis(p-tolyl)aluminate, lithium tetrakis(m-tolyl)aluminate, lithium tetrakis(2,4-dimethylphenyl)aluminate, lithium tetrakis(3,5-dimethylphenyl)aluminate, lithium tetrafluoroaluminate, sodium tetrakis(pentafluorophenyl)aluminate, sodium tetraphenylaluminate, sodium tetrakis(p-tolyl)aluminate, sodium tetrakis (m-tolyl)aluminate, sodium tetrakis(2,4-dimethylphenyl) aluminate, sodium tetrakis(3,5-dimethylphenyl)aluminate, sodium tetrafluoroaluminate, potassium tetrakis(pentafluorophenyl)aluminate, potassium tetraphenylaluminate, potassium tetrakis(p-tolyl)aluminate, potassium tetrakis(m-tolyl) aluminate, potassium tetrakis(2,4-dimethylphenyl) aluminate, potassium tetrakis(3,5-dimethylphenyl) aluminate, potassium tetrafluoroaluminate, and the like, or combinations thereof. Ionizing ionic compounds useful in this invention are not limited to these; other examples of ionizing ionic compounds are disclosed in U.S. Pat. Nos. 5,576,259 and 5,807,938, the disclosures of which are incorporated herein by reference in their entirety.

Organozinc, Organomagnesium, & Organolithium Compounds

Other aspects are directed to catalyst compositions which can include an organozinc compound, an organomagnesium compound, an organolithium compound, or a combination thereof. In some aspects, these compounds have the following general formulas:

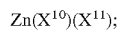

$Zn(X^{10})(X^{11})$;

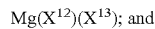

$Mg(X^{12})(X^{13})$; and

$Li(X^{14})$.

In these formulas, $X^{10}$, $X^{12}$, and $X^{14}$ independently can be a $C_1$ to $C_{18}$ hydrocarbyl group, and $X^{11}$ and $X^{13}$ independently can be H, a halide, or a $C_1$ to $C_{18}$ hydrocarbyl or $C_1$ to $C_{18}$ hydrocarboxy group. It is contemplated $X^{10}$ and $X^{11}$ (or $X^{12}$ and $X^{13}$) can be the same, or that $X^{10}$ and $X^{11}$ (or $X^{12}$ and $X^{13}$) can be different.

In one aspect, $X^{10}$, $X^{11}$, $X^{12}$, $X^{13}$, and $X^{14}$ independently can be any $C_1$ to $C_{18}$ hydrocarbyl group, $C_1$ to $C_{12}$ hydrocarbyl group, $C_1$ to $C_8$ hydrocarbyl group, or $C_1$ to $C_5$ hydrocarbyl group disclosed herein. In another aspect, $X^{10}$, $X^{11}$, $X^{12}$, $X^{13}$, and $X^{14}$ independently can be any $C_1$ to $C_{18}$ alkyl group, $C_2$ to $C_{18}$ alkenyl group, $C_6$ to $C_{18}$ aryl group, or $C_7$ to $C_{18}$ aralkyl group disclosed herein; alternatively, any $C_1$ to $C_{12}$ alkyl group, $C_2$ to $C_{12}$ alkenyl group, $C_6$ to $C_{12}$ aryl group, or $C_7$ to $C_{12}$ aralkyl group disclosed herein; or alternatively, any $C_1$ to $C_5$ alkyl group, $C_2$ to $C_5$ alkenyl group, $C_6$ to $C_8$ aryl group, or $C_7$ to $C_8$ aralkyl group disclosed herein. Thus, $X^{10}$, $X^{11}$, $X^{12}$, $X^{13}$ and $X^{14}$ independently can be a methyl group, an ethyl group, a propyl group, a butyl group, a pentyl group, a hexyl group, a heptyl group, an octyl group, a nonyl group, a decyl group, a undecyl group, a dodecyl group, a tridecyl group, a tetradecyl group, a pentadecyl group, a hexadecyl group, a heptadecyl group, an octadecyl group, an ethenyl group, a propenyl group, a butenyl group, a pentenyl group, a hexenyl group, a heptenyl group, an octenyl group, a nonenyl group, a decenyl group, a undecenyl group, a dodecenyl group, a tridecenyl group, a tetradecenyl group, a pentadecenyl group, a hexadecenyl group, a heptadecenyl group, an octadecenyl group, a phenyl group, a naphthyl group, a benzyl group, or a tolyl group, and the like. In yet another aspect, $X^{10}$, $X^{11}$, $X^{12}$, $X^{13}$, and $X^{14}$ independently can be methyl, ethyl, propyl, butyl, or pentyl (e.g., neopentyl), or both $X^{10}$ and $X^{11}$ (or both $X^{12}$ and $X^{13}$) can be methyl, or ethyl, or propyl, or butyl, or pentyl (e.g., neopentyl).

$X^{11}$ and $X^{13}$ independently can be H, a halide, or a $C_1$ to $C_{18}$ hydrocarbyl or $C_1$ to $C_{18}$ hydrocarboxy group (e.g., any $C_1$ to $C_{18}$, $C_1$ to $C_{12}$, $C_1$ to $C_{10}$, or $C_1$ to $C_8$ hydrocarboxy group disclosed herein). In some aspects, $X^{11}$ and $X^{13}$ independently can be H, a halide (e.g., Cl), or a $C_1$ to $C_{18}$ hydrocarbyl or $C_1$ to $C_{18}$ hydrocarboxy group; alternatively, H, a halide, or a $C_1$ to $C_8$ hydrocarbyl or $C_1$ to $C_8$ hydrocarboxy group; or alternatively, H, Br, Cl, F, I, methyl, ethyl, propyl, butyl, pentyl (e.g., neopentyl), hexyl, heptyl, octyl, nonyl, decyl, ethenyl, propenyl, butenyl, pentenyl, hexenyl, heptenyl, octenyl, nonenyl, decenyl, phenyl, benzyl, tolyl, methoxy, ethoxy, propoxy, butoxy, pentoxy, phenoxy, toloxy, xyloxy, or benzoxy.

In other aspects, the organozinc and/or the organomagnesium compound can have one or two hydrocarbylsilyl moieties. Each hydrocarbyl of the hydrocarbylsilyl group can be any hydrocarbyl group disclosed herein (e.g., a $C_1$ to $C_{18}$ alkyl group, a $C_2$ to $C_{18}$ alkenyl group, a $C_6$ to $C_{18}$ aryl group, a $C_7$ to $C_{18}$ aralkyl group, etc.). Illustrative and non-limiting examples of hydrocarbylsilyl groups can include, but are not limited to, trimethylsilyl, triethylsilyl, tripropylsilyl (e.g., triisopropylsilyl), tributylsilyl, tripentylsilyl, triphenylsilyl, allyldimethylsilyl, trimethylsilylmethyl, and the like.

Exemplary organozinc compounds which can be used as co-catalysts can include, but are not limited to, dimethylzinc, diethylzinc, dipropylzinc, dibutylzinc, dineopentylzinc, di(trimethylsilyl)zinc, di(triethylsilyl)zinc, di(triisoproplysilyl) zinc, di(triphenylsilyl)zinc, di(allyldimethylsilyl)zinc, di(trimethylsilylmethyl)zinc, and the like, or combinations thereof.

Similarly, exemplary organomagnesium compounds can include, but are not limited to, dimethylmagnesium, diethylmagnesium, dipropylmagnesium, dibutylmagnesium, dineopentylmagnesium, di(trimethylsilylmethyl)magnesium, methylmagnesium chloride, ethylmagnesium chloride, propylmagnesium chloride, butylmagnesium chloride, neopentylmagnesium chloride, trimethylsilylmethylmagnesium chloride, methylmagnesium bromide, ethylmagnesium bromide, propylmagnesium bromide, butylmagnesium bromide, neopentylmagnesium bromide, trimethylsilylmethylmagnesium bromide, methylmagnesium iodide, ethylmagnesium iodide, propylmagnesium iodide, butylmagnesium iodide, neopentylmagnesium iodide, trimethylsilylmethylmagnesium iodide, methylmagnesium ethoxide, ethylmagnesium ethoxide, propylmagnesium ethoxide, butylmagnesium ethoxide, neopentylmagnesium ethoxide, trimethylsilylmethylmagnesium ethoxide, methylmagnesium prop oxide, ethylmagnesium propoxide, propylmagnesium propoxide, butylmagnesium propoxide, neopentylmagnesium propoxide, trimethylsilylmethylmagnesium propoxide, methylmagnesium phenoxide, ethylmagnesium phenoxide, propylmagnesium phenoxide, butylmagnesium phenoxide, neopentylmagnesium phenoxide, trimethylsilylmethylmagnesium phenoxide, and the like, or any combinations thereof.

Likewise, exemplary organolithium compounds can include, but are not limited to, methyllithium, ethyllithium, propyllithium, butyllithium (e.g., t-butyllithium), neopentyllithium, trimethylsilylmethyllithium, phenyllithium, tolyllithium, xylyllithium, benzyllithium, (dimethylphenyl)methyllithium, allyllithium, and the like, or combinations thereof.

Olefin Monomers

Unsaturated reactants that can be employed with catalyst compositions and polymerization processes of this invention typically can include olefin compounds having from 2 to 30 carbon atoms per molecule and having at least one olefinic double bond. This invention encompasses homopolymerization processes using a single olefin such as ethylene or propylene, as well as copolymerization, terpolymerization, etc., reactions using an olefin monomer with at least one different olefinic compound. For example, the resultant ethylene copolymers, terpolymers, etc., generally can contain a major amount of ethylene (>50 mole percent) and a minor amount of comonomer (<50 mole percent), though this is not a requirement. Comonomers that can be copolymerized with ethylene often can have from 3 to 20 carbon atoms in their molecular chain.

Acyclic, cyclic, polycyclic, terminal (a), internal, linear, branched, substituted, unsubstituted, functionalized, and non-functionalized olefins can be employed in this invention. For example, typical unsaturated compounds that can be polymerized with the catalyst compositions of this invention can include, but are not limited to, ethylene, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-hexene, 3-ethyl-1-hexene, 1-heptene, 2-heptene, 3-heptene, the four normal octenes (e.g., 1-octene), the four normal nonenes, the five normal decenes, and the like, or mixtures of two or more of these compounds. Cyclic and bicyclic olefins, including but not limited to, cyclopentene, cyclohexene, norbornylene, norbornadiene, and the like, also can be polymerized as described above. Styrene can also be employed as a monomer in the present invention. In an aspect, the olefin monomer can comprise a $C_2$-$C_{20}$ olefin; alternatively, the olefin monomer can comprise a $C_2$-$C_{10}$ olefin; alternatively, the olefin monomer can comprise ethylene; or alternatively, the olefin monomer can comprise propylene.

When a copolymer (or alternatively, a terpolymer) is desired, the olefin monomer can comprise, for example, ethylene or propylene, which is copolymerized with at least one comonomer. According to one aspect of this invention, the olefin monomer in the polymerization process can comprise ethylene. In this aspect, examples of suitable olefin comonomers an include, but are not limited to, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-ethyl-1-hexene, 1-heptene, 2-heptene, 3-heptene, 1-octene, 1-decene, styrene, and the like, or combinations thereof. In another aspect, the comonomer can comprise 1-butene, 1-pentene, 1-hexene, 1-octene, 1-decene, styrene, or any combination thereof; or alternatively, 1-butene, 1-hexene, 1-octene, or any combination thereof. In yet another aspect, the olefin monomer can comprise ethylene and the olefin comonomer can comprise a $C_4$-$C_{10}$ alpha-olefin (e.g., 1-butene, 1-hexene, 1-octene, or a mixture thereof). In still another aspect, the olefin monomer can comprise ethylene and the olefin comonomer can comprise 1-hexene.

Generally, the amount of comonomer introduced into a reactor zone to produce a copolymer can be from about 0.01 to about 50 weight percent of the comonomer based on the total weight of the monomer and comonomer. According to another aspect of the present invention, the amount of comonomer introduced into a reactor zone can be from about 0.01 to about 40 weight percent comonomer based on the total weight of the monomer and comonomer. In still another aspect, the amount of comonomer introduced into a reactor zone can be from about 0.1 to about 35 weight percent comonomer based on the total weight of the monomer and comonomer. Yet, in another aspect, the amount of comonomer introduced into a reactor zone can be from about 0.5 to about 20 weight percent comonomer based on the total weight of the monomer and comonomer. In still another aspect, the weight percentage of comonomer based on the total amount of monomer and comonomer can be in a range from about 4 to about 20 weight percent, or alternatively, from about 8 to about 15 weight percent.

While not intending to be bound by this theory, where branched, substituted, or functionalized olefins are used as reactants, it is believed that a steric hindrance can impede and/or slow the polymerization process. Thus, branched and/or cyclic portion(s) of the olefin removed somewhat from the carbon-carbon double bond would not be expected to hinder the reaction in the way that the same olefin substituents situated more proximate to the carbon-carbon double bond might. According to one aspect of the present invention, at least one monomer/reactant can be ethylene, so the polymerizations are either a homopolymerization involving only ethylene, or copolymerizations with a different acyclic, cyclic, terminal, internal, linear, branched, substituted, or unsubstituted olefin. In addition, the catalyst compositions of this invention can be used in the polymerization of diolefin compounds including, but not limited to, 1,3-butadiene, isoprene, 1,4-pentadiene, and 1,5-hexadiene.

Catalyst Compositions

In some aspects, the present invention employs catalyst compositions containing catalyst component I, catalyst component II, and an activator-support (one or more than one). These catalyst compositions can be utilized to produce polyolefins—homopolymers, copolymers, and the like—for a variety of end-use applications. Catalyst component I and catalyst component II are discussed hereinabove. In aspects of the present invention, it is contemplated that the catalyst composition can contain more than one catalyst component I bridged metallocene compound and/or more than one catalyst component II metallocene compound. Further, additional catalytic compounds—other than those specified as catalyst component I or catalyst component II—can be employed in the catalyst compositions and/or the polymerization processes, provided that the additional catalytic compound(s) does not detract from the advantages disclosed herein. Additionally, more than one activator-support also may be utilized.

The metallocene compounds of catalyst component I are discussed above. For instance, in some aspects, catalyst component I can comprise (or consist essentially of, or consist of) a single atom bridged metallocene compound having formula (A). The metallocene compounds of catalyst component II also are discussed above. For instance, in some aspects, catalyst component II can comprise (or consist essentially of, or consist of) an unbridged metallocene compound having formula (B) or a two carbon bridged metallocene compound having two indenyl groups.

Generally, catalyst compositions of the present invention comprise catalyst component I, catalyst component II, and an activator-support (e.g., an activator-support comprising a solid oxide treated with an electron-withdrawing anion). Activator-supports useful in the present invention are disclosed above. Optionally, such catalyst compositions can further comprise one or more than one co-catalyst compound or compounds (suitable co-catalysts, such as organoaluminum compounds, also are discussed above). Thus, a catalyst composition of this invention can comprise catalyst component I, catalyst component II, an activator-support, and an organoaluminum compound. For instance, the activator-support can comprise (or consist essentially of, or consist of) fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, and the like, or combinations thereof. Additionally, the organoaluminum compound can comprise (or consist essentially of, or consist of) trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, and the like, or combinations thereof. Accordingly, a catalyst composition consistent with aspects of the invention can comprise (or consist essentially of, or consist of) a zirconium or hafnium based metallocene compound with a cyclopentadienyl group and a fluorenyl group, and with an alkenyl substituent on the bridging group and/or on the cyclopentadienyl group; an unbridged zirconium or hafnium based metallocene compound containing two cyclopentadienyl groups, two indenyl groups, or a cyclopentadienyl and an indenyl group, or a two carbon bridged metallocene compound containing two indenyl groups; sulfated alumina (or fluorided silica-alumina, or fluorided silica-coated alumina); and triethylaluminum (or triisobutylaluminum).

In another aspect of the present invention, a catalyst composition is provided which comprises catalyst component I, catalyst component II, an activator-support, and an organoaluminum compound, wherein this catalyst composition is substantially free of aluminoxanes, organoboron or organoborate compounds, ionizing ionic compounds, and/or other similar materials; alternatively, substantially free of aluminoxanes; alternatively, substantially free or organoboron or organoborate compounds; or alternatively, substantially free of ionizing ionic compounds. In these aspects, the catalyst composition has catalyst activity, to be discussed below, in the absence of these additional materials. For example, a catalyst composition of the present invention can consist essentially of catalyst component I, catalyst component II, an activator-support, and an organoaluminum compound, wherein no other materials are present in the catalyst composition which would increase/decrease the activity of the catalyst composition by more than about 10% from the catalyst activity of the catalyst composition in the absence of said materials.

However, in other aspects of this invention, these activators/co-catalysts can be employed. For example, a catalyst composition comprising catalyst component I, catalyst component II, and an activator-support can further comprise an optional co-catalyst. Suitable co-catalysts in this aspect can include, but are not limited to, aluminoxane compounds, organoboron or organoborate compounds, ionizing ionic compounds, organoaluminum compounds, organozinc compounds, organomagnesium compounds, organolithium compounds, and the like, or any combination thereof; or alternatively, organoaluminum compounds, organozinc compounds, organomagnesium compounds, organolithium compounds, or any combination thereof. More than one co-catalyst can be present in the catalyst composition.

In a particular aspect contemplated herein, the catalyst composition is a dual catalyst composition comprising an activator-support (one or more than one), only one catalyst component I metallocene compound (e.g., only one single atom bridged metallocene compound with an alkenyl substituent), and only one catalyst component II metallocene compound (e.g., only one unbridged zirconium or hafnium based metallocene compound or only one two carbon bridged, zirconium based metallocene compound containing two indenyl groups). In these and other aspects, the catalyst composition can comprise an activator-support comprising a solid oxide treated with an electron-withdrawing anion); only one metallocene compound having formula (A); and only metallocene compound having formula (B).

This invention further encompasses methods of making these catalyst compositions, such as, for example, contacting the respective catalyst components in any order or sequence.

Catalyst component I, catalyst component II, or both, can be precontacted with an olefinic monomer if desired, not necessarily the olefin monomer to be polymerized, and an organoaluminum compound for a first period of time prior to contacting this precontacted mixture with an activator-support. The first period of time for contact, the precontact time, between the metallocene compound(s), the olefinic monomer, and the organoaluminum compound typically ranges from a time period of about 1 minute to about 24 hours, for example, from about 3 minutes to about 1 hour. Precontact times from about 10 minutes to about 30 minutes also can be employed. Alternatively, the precontacting process can be carried out in multiple steps, rather than a single step, in which multiple mixtures can be prepared, each comprising a different set of catalyst components. For example, at least two catalyst components can be contacted forming a first mixture, followed by contacting the first mixture with at least one other catalyst component forming a second mixture, and so forth.

Multiple precontacting steps can be carried out in a single vessel or in multiple vessels. Further, multiple precontacting steps can be carried out in series (sequentially), in parallel, or a combination thereof. For example, a first mixture of two catalyst components can be formed in a first vessel, a second mixture comprising the first mixture plus one additional catalyst component can be formed in the first vessel or in a second vessel, which is typically placed downstream of the first vessel.

In another aspect, one or more of the catalyst components can be split and used in different precontacting treatments. For example, part of a catalyst component can be fed into a first precontacting vessel for precontacting with at least one other catalyst component, while the remainder of that same catalyst component can be fed into a second precontacting vessel for precontacting with at least one other catalyst component, or can be fed directly into the reactor, or a combination thereof. The precontacting can be carried out in any suitable equipment, such as tanks, stirred mix tanks, various static mixing devices, a flask, a vessel of any type, or combinations of these apparatus.

In another aspect of this invention, the various catalyst components (for example, a single atom bridged metallocene compound with an alkenyl substituent, an unbridged zirconium or hafnium based metallocene compound or a two carbon bridged metallocene compound with two indenyl groups, an activator-support, an organoaluminum co-catalyst, and optionally an unsaturated hydrocarbon) can be contacted in the polymerization reactor simultaneously while the polymerization reaction is proceeding. Alternatively, any two or more of these catalyst components can be precontacted in a vessel prior to entering the reaction zone. This precontacting step can be continuous, in which the precontacted product can be fed continuously to the reactor, or it can be a stepwise or batchwise process in which a batch of precontacted product can be added to make a catalyst composition. This precontacting step can be carried out over a time period that can range from a few seconds to as much as several days, or longer. In this aspect, the continuous precontacting step generally can last from about 1 second to about 1 hour. In another aspect, the continuous precontacting step can last from about 10 seconds to about 45 minutes, or from about 1 minute to about 30 minutes.

Once the precontacted mixture of catalyst component I and/or catalyst component II, the olefin monomer, and the organoaluminum co-catalyst is contacted with the activator-support, this composition (with the addition of the activator-support) can be termed the "postcontacted mixture." The postcontacted mixture optionally can remain in contact for a second period of time, the postcontact time, prior to initiating the polymerization process. Postcontact times between the precontacted mixture and the activator-support generally range from about 1 minute to about 24 hours. In a further aspect, the postcontact time can be in a range from about 3 minutes to about 1 hour. The precontacting step, the postcontacting step, or both, can increase the productivity of the polymer as compared to the same catalyst composition that is prepared without precontacting or postcontacting. However, neither a precontacting step nor a postcontacting step is required.

The postcontacted mixture can be heated at a temperature and for a time period sufficient to allow adsorption, impregnation, or interaction of precontacted mixture and the activator-support, such that a portion of the components of the precontacted mixture can be immobilized, adsorbed, or deposited thereon. Where heating is employed, the postcontacted mixture generally can be heated to a temperature of from between about 0° F. to about 150° F., or from about 40° F. to about 95° F.

According to one aspect of this invention, the weight ratio of catalyst component I to catalyst component II generally can be in a range from about 20:1 to about 1:20. In another aspect, the weight ratio can be in a range from about 10:1 to about 1:10, from about 10:1 to about 1:8, or from about 10:1 to about 1:5. Yet, in another aspect, the weight ratio can be in a range from about 8:1 to about 1:8, from about 8:1 to about 1:5, from about 8:1 to about 1:4, from about 5:1 to about 1:5; from about 4:1 to about 1:4, from about 3:1 to about 1:3, from about 2:1 to about 1:2, from about 1.5:1 to about 1:1.5, from about 1.25:1 to about 1:1.25, or from about 1.1:1 to about 1:1.1.

When a precontacting step is used, the molar ratio of the total moles of olefin monomer to total moles of metallocene(s) in the precontacted mixture typically can be in a range from about 1:10 to about 100,000:1. Total moles of each component are used in this ratio to account for aspects of this invention where more than one olefin monomer and/or more than one metallocene compound is employed in a precontacting step. Further, this molar ratio can be in a range from about 10:1 to about 1,000:1 in another aspect of the invention.

Generally, the weight ratio of organoaluminum compound to activator-support can be in a range from about 10:1 to about 1:1000. If more than one organoaluminum compound and/or more than one activator-support is employed, this ratio is based on the total weight of each respective component. In another aspect, the weight ratio of the organoaluminum compound to the activator-support can be in a range from about 3:1 to about 1:100, or from about 1:1 to about 1:50.

In some aspects of this invention, the weight ratio of metallocene compounds (total of catalyst component I and catalyst component II) to activator-support can be in a range from about 1:1 to about 1:1,000,000. If more than one activator-support is employed, this ratio is based on the total weight of the activator-support. In another aspect, this weight ratio can be in a range from about 1:5 to about 1:100,000, or from about 1:10 to about 1:10,000. Yet, in another aspect, the weight ratio of the metallocene compounds to the activator-support can be in a range from about 1:20 to about 1:1000.

Catalyst compositions of the present invention generally have a catalyst activity greater than about 100 grams of polyethylene (homopolymer, copolymer, etc., as the context requires) per gram of activator-support per hour (abbreviated g/g/hr). In another aspect, the catalyst activity can greater than about 150, greater than about 250, or greater than about 500 g/g/hr. In still another aspect, catalyst compositions of this invention can be characterized by having a catalyst activity greater than about 550, greater than about 650, or greater than about 750 g/g/hr. Yet, in another aspect, the catalyst activity can be greater than about 1000 g/g/hr. These activities are measured under slurry polymerization conditions using isobutane as the diluent, at a polymerization temperature of about 90° C. and a reactor pressure of about 390 psig. Generally, the reactor pressure is largely controlled by the pressure of the monomer, but other contributors to the reactor pressure can include hydrogen (if hydrogen is used), isobutane vapor, and comonomer gas or vapor (if comonomer is used). Moreover, such catalyst activities can be achieved when the catalyst composition contains a co-catalyst, such as an organoaluminum compound (e.g., triethylaluminum, triisobutylaluminum, etc.). Additionally, in some aspects, the activator-support can comprise sulfated alumina, fluorided silica-alumina, or fluorided silica-coated alumina, although not limited thereto.

As discussed above, any combination of catalyst component I, catalyst component II, the activator-support, the organoaluminum compound, and the olefin monomer, can be precontacted in some aspects of this invention. When any precontacting occurs with an olefinic monomer, it is not necessary that the olefin monomer used in the precontacting step be the same as the olefin to be polymerized. Further, when a precontacting step among any combination of the catalyst components is employed for a first period of time, this precontacted mixture can be used in a subsequent postcontacting step between any other combination of catalyst components for a second period of time. For example, one or more metallocene compounds, the organoaluminum compound, and 1-hexene can be used in a precontacting step for a first period of time, and this precontacted mixture then can be contacted with the activator-support to form a postcontacted mixture that can be contacted for a second period of time prior to initiating the polymerization reaction. For example, the first period of time for contact, the precontact time, between any combination of the metallocene compound(s), the olefinic monomer, the activator-support, and the organoaluminum compound can be from about 1 minute to about 24 hours, from about 3 minutes to about 1 hour, or from about 10 minutes to about 30 minutes. The postcontacted mixture optionally can be allowed to remain in contact for a second period of time, the postcontact time, prior to initiating the polymerization process. According to one aspect of this invention, postcontact times between the precontacted mixture and any remaining catalyst components can be from about 1 minute to about 24 hours, or from about 5 minutes to about 1 hour.

Polymerization Processes

Catalyst compositions of the present invention can be used to polymerize olefins to form homopolymers, copolymers, terpolymers, and the like. One such process for polymerizing olefins in the presence of a catalyst composition of the present invention can comprise contacting the catalyst composition with an olefin monomer and an olefin comonomer (one or more) under polymerization conditions to produce an olefin polymer, wherein the catalyst composition can comprise catalyst component I, catalyst component II, an activator-support, and an optional co-catalyst. Catalyst components I and II are discussed above. For instance, catalyst component I can comprise a single atom bridged metallocene compound having formula (A), and catalyst component II can comprise an unbridged metallocene compound having formula (B) or a two carbon bridged metallocene compound having two indenyl groups.

In accordance with one aspect of the invention, the polymerization process can employ a catalyst composition comprising catalyst component I, catalyst component II, and an activator-support. Activator-supports useful in the polymerization processes of the present invention are disclosed above. The catalyst composition, optionally, can further comprise one or more than one organoaluminum compound or compounds (or other suitable co-catalyst). Thus, a process for polymerizing olefins in the presence of a catalyst composition can employ a catalyst composition comprising catalyst component I, catalyst component II, an activator-support, and an organoaluminum compound. In some aspects, the activator-support can comprise (or consist essentially of, or consist of) fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, and the like, or combinations thereof. In some aspects, the organoaluminum compound can comprise (or consist essentially of, or consist of) trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, and the like, or combinations thereof.

In accordance with another aspect of the invention, the polymerization process can employ a catalyst composition comprising catalyst component I, catalyst component II, an activator-support, and an optional co-catalyst, wherein the co-catalyst can comprise an aluminoxane compound, an organoboron or organoborate compound, an ionizing ionic compound, an organoaluminum compound, an organozinc compound, an organomagnesium compound, or an organolithium compound, or any combination thereof. Hence, aspects of this invention are directed to a process for polymerizing olefins in the presence of a catalyst composition, the processes comprising contacting a catalyst composition with an olefin monomer and an olefin comonomer (one or more) under polymerization conditions to produce an olefin polymer, and the catalyst composition can comprise catalyst component I, catalyst component II, an activator-support, and an aluminoxane compound; alternatively, catalyst component I, catalyst component II, an activator-support, and an organoboron or organoborate compound; alternatively, catalyst component I, catalyst component II, an activator-support, and an ionizing ionic compound; alternatively, catalyst component I, catalyst component II, an activator-support, and an organoaluminum compound; alternatively, catalyst component I, catalyst component II, an activator-support, and an organozinc compound; alternatively, catalyst component I, catalyst component II, an activator-support, and an organomagnesium compound; or alternatively, catalyst component I, catalyst component II, an activator-support, and an organolithium compound. Furthermore, more than one co-catalyst can be employed, e.g., an organoaluminum compound and an aluminoxane compound, an organoaluminum compound and an ionizing ionic compound, etc.

In accordance with another aspect of the invention, the polymerization process can employ a catalyst composition comprising only one catalyst component I bridged metallocene compound, only one catalyst component II unbridged metallocene compound, an activator-support, and an organoaluminum compound.

The catalyst compositions of the present invention are intended for any olefin polymerization method using various types of polymerization reactors. As used herein, "polymerization reactor" includes any polymerization reactor capable of polymerizing olefin monomers and comonomers (one or more than one comonomer) to produce homopolymers, copolymers, terpolymers, and the like. The various types of reactors include those that can be referred to as a batch reactor, slurry reactor, gas-phase reactor, solution reactor, high pressure reactor, tubular reactor, autoclave reactor, and the like, or combinations thereof. Suitable polymerization conditions are used for the various reactor types. Gas phase reactors can comprise fluidized bed reactors or staged horizontal reactors. Slurry reactors can comprise vertical or horizontal loops. High pressure reactors can comprise autoclave or tubular reactors. Reactor types can include batch or continuous processes. Continuous processes could use intermittent or continuous product discharge. Processes can also include partial or full direct recycle of unreacted monomer, unreacted comonomer, and/or diluent.

Polymerization reactor systems of the present invention can comprise one type of reactor in a system or multiple reactors of the same or different type. Production of polymers in multiple reactors can include several stages in at least two separate polymerization reactors interconnected by a transfer device making it possible to transfer the polymers resulting from the first polymerization reactor into the second reactor. The desired polymerization conditions in one of the reactors can be different from the operating conditions of the other reactors. Alternatively, polymerization in multiple reactors can include the manual transfer of polymer from one reactor to subsequent reactors for continued polymerization. Multiple reactor systems can include any combination including, but not limited to, multiple loop reactors, multiple gas phase reactors, a combination of loop and gas phase reactors, multiple high pressure reactors, or a combination of high pressure with loop and/or gas phase reactors. The multiple reactors can be operated in series, in parallel, or both.

According to one aspect of the invention, the polymerization reactor system can comprise at least one loop slurry reactor comprising vertical or horizontal loops. Monomer, diluent, catalyst, and comonomer can be continuously fed to a loop reactor where polymerization occurs. Generally, continuous processes can comprise the continuous introduction of monomer/comonomer, a catalyst, and a diluent into a polymerization reactor and the continuous removal from this reactor of a suspension comprising polymer particles and the diluent. Reactor effluent can be flashed to remove the solid polymer from the liquids that comprise the diluent, monomer and/or comonomer. Various technologies can be used for this separation step including but not limited to, flashing that can include any combination of heat addition and pressure reduction, separation by cyclonic action in either a cyclone or hydrocyclone, or separation by centrifugation.

A typical slurry polymerization process (also known as the particle form process) is disclosed, for example, in U.S. Pat. Nos. 3,248,179, 4,501,885, 5,565,175, 5,575,979, 6,239,235, 6,262,191, and 6,833,415, each of which is incorporated herein by reference in its entirety.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example is polymerization of propylene monomer as disclosed in U.S. Pat. No. 5,455,314, which is incorporated by reference herein in its entirety.

According to yet another aspect of this invention, the polymerization reactor can comprise at least one gas phase reactor. Such systems can employ a continuous recycle stream containing one or more monomers continuously cycled through a fluidized bed in the presence of the catalyst under polymerization conditions. A recycle stream can be withdrawn from the fluidized bed and recycled back into the reactor. Simultaneously, polymer product can be withdrawn from the reactor and new or fresh monomer can be added to replace the polymerized monomer. Such gas phase reactors can comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 5,352,749, 4,588,790, and 5,436,304, each of which is incorporated by reference in its entirety herein.

According to still another aspect of the invention, a high pressure polymerization reactor can comprise a tubular reactor or an autoclave reactor. Tubular reactors can have several zones where fresh monomer, initiators, or catalysts are added. Monomer can be entrained in an inert gaseous stream and introduced at one zone of the reactor. Initiators, catalysts, and/or catalyst components can be entrained in a gaseous stream and introduced at another zone of the reactor. The gas streams can be intermixed for polymerization. Heat and pressure can be employed appropriately to obtain optimal polymerization reaction conditions.

According to yet another aspect of the invention, the polymerization reactor can comprise a solution polymerization reactor wherein the monomer/comonomer are contacted with the catalyst composition by suitable stirring or other means. A carrier comprising an inert organic diluent or excess monomer can be employed. If desired, the monomer/comonomer can be brought in the vapor phase into contact with the catalytic reaction product, in the presence or absence of liquid material. The polymerization zone is maintained at temperatures and pressures that will result in the formation of a solution of the polymer in a reaction medium. Agitation can be employed to obtain better temperature control and to maintain uniform polymerization mixtures throughout the polymerization zone. Adequate means are utilized for dissipating the exothermic heat of polymerization.

Polymerization reactors suitable for the present invention can further comprise any combination of at least one raw material feed system, at least one feed system for catalyst or catalyst components, and/or at least one polymer recovery system. Suitable reactor systems for the present invention can further comprise systems for feedstock purification, catalyst storage and preparation, extrusion, reactor cooling, polymer recovery, fractionation, recycle, storage, loadout, laboratory analysis, and process control.

Polymerization conditions that are controlled for efficiency and to provide desired polymer properties can include temperature, pressure, and the concentrations of various reactants. Polymerization temperature can affect catalyst productivity, polymer molecular weight, and molecular weight distribution. A suitable polymerization temperature can be any temperature below the de-polymerization temperature according to the Gibbs Free energy equation. Typically, this includes from about 60° C. to about 280° C., for example, or from about 60° C. to about 120° C., depending upon the type of polymerization reactor. In some reactor systems, such as slurry processes, the polymerization temperature generally can fall within a range from about 60° C. to about 100° C., from about 65° C. to about 90° C., or from about 60° C. to about 85° C.

Suitable pressures will also vary according to the reactor and polymerization type. The pressure for liquid phase polymerizations in a loop reactor is typically less than 1000 psig (6.9 MPa). Pressure for gas phase polymerization is usually at about 200 to 500 psig (1.4 MPa to 3.4 MPa). High pressure polymerization in tubular or autoclave reactors is generally run at about 20,000 to 75,000 psig (138 to 517 MPa). Polymerization reactors can also be operated in a supercritical region occurring at generally higher temperatures and pressures. Operation above the critical point of a pressure/temperature diagram (supercritical phase) may offer advantages.

Aspects of this invention are directed to olefin polymerization processes comprising contacting a catalyst composition with an olefin monomer and an olefin comonomer under polymerization conditions to produce an olefin polymer. The olefin polymer (e.g., ethylene copolymer) produced by the process can contain a higher molecular weight component and a lower molecular weight component, and the olefin polymer can have, for example, a density of less than about 0.930 g/cm$^3$, and/or a ratio of Mw/Mn in a range from about 6 to about 50, and/or a HLMI in a range from about 4 to about 50 g/10 min, and/or less than about 0.008 LCB per 1000 total carbon atoms.

Aspects of this invention also are directed to olefin polymerization processes conducted in the absence of added hydrogen. An olefin polymerization process of this invention can comprise contacting a catalyst composition with an olefin monomer and an olefin comonomer under polymerization conditions to produce an olefin polymer, wherein the catalyst composition can comprise catalyst component I, catalyst component II, an activator-support, and an optional co-catalyst, wherein the polymerization process is conducted in the absence of added hydrogen. As one of ordinary skill in the art would recognize, hydrogen can be generated in-situ by metallocene catalyst compositions in various olefin polymerization processes, and the amount generated can vary depending upon the specific catalyst composition and metallocene compound(s) employed, the type of polymerization process used, the polymerization reaction conditions utilized, and so forth.

In other aspects, it may be desirable to conduct the polymerization process in the presence of a certain amount of added hydrogen. Accordingly, an olefin polymerization process of this invention can comprise contacting a catalyst composition with an olefin monomer and an olefin comonomer under polymerization conditions to produce an olefin polymer, wherein the catalyst composition comprises catalyst component I, catalyst component II, an activator-support, and an optional co-catalyst, wherein the polymerization process is conducted in the presence of added hydrogen. For example, the ratio of hydrogen to the olefin monomer in the polymerization process can be controlled, often by the feed ratio of hydrogen to the olefin monomer entering the reactor. The added hydrogen to olefin monomer ratio in the process can be controlled at a weight ratio which falls within a range from about 25 ppm to about 1500 ppm, from about 50 to about 1000 ppm, or from about 100 ppm to about 750 ppm.

In some aspects of this invention, the feed or reactant ratio of hydrogen to olefin monomer can be maintained substantially constant during the polymerization run for a particular polymer grade. That is, the hydrogen:olefin monomer ratio can be selected at a particular ratio within a range from about 5 ppm up to about 1000 ppm or so, and maintained at the ratio to within about +/−25% during the polymerization run. For instance, if the target ratio is 100 ppm, then maintaining the hydrogen:olefin monomer ratio substantially constant would entail maintaining the feed ratio between about 75 ppm and about 125 ppm. Further, the addition of comonomer (or comonomers) can be, and generally is, substantially constant throughout the polymerization run for a particular polymer grade.

However, in other aspects, it is contemplated that monomer, comonomer (or comonomers), and/or hydrogen can be periodically pulsed to the reactor, for instance, in a manner similar to that employed in U.S. Pat. No. 5,739,220 and U.S. Patent Publication No. 2004/0059070, the disclosures of which are incorporated herein by reference in their entirety.

The concentration of the reactants entering the polymerization reactor can be controlled to produce resins with certain physical and mechanical properties. The proposed end-use product that will be formed by the polymer resin and the method of forming that product ultimately can determine the desired polymer properties and attributes. Mechanical properties include tensile, flexural, impact, creep, stress relaxation, and hardness tests. Physical properties include density, molecular weight, molecular weight distribution, melting temperature, glass transition temperature, temperature melt of crystallization, density, stereoregularity, crack growth, long chain branching, and rheological measurements.

This invention is also directed to, and encompasses, the polymers produced by any of the polymerization processes disclosed herein. Articles of manufacture can be formed from, and/or can comprise, the polymers produced in accordance with this invention.

Polymers and Articles

If the resultant polymer produced in accordance with the present invention is, for example, a polymer or copolymer of ethylene, its properties can be characterized by various analytical techniques known and used in the polyolefin industry. Articles of manufacture can be formed from, and/or can comprise, the ethylene polymers of this invention, whose typical properties are provided below. For example, the olefin polymer can be an ethylene/1-butene copolymer, an ethylene/1-hexene copolymer, or an ethylene/1-octene copolymer. In particular aspects of this invention, the olefin polymer is an ethylene/1-hexene copolymer.

Copolymers of ethylene produced in accordance with some aspects of this invention generally can have a high load melt index (HLMI) from about 3 to about 100 g/10 min. HLMI's in the range from about 4 to about 75 g/10 min, from about 4 to about 50 g/10 min, or from about 4 to about 35 g/10 min, are contemplated in other aspects of this invention. For example, a polymer of the present invention can have a HLMI in a range from about 5 to about 75, from about 5 to about 50, from about 7 to about 50, from about 5 to about 35, from about 7 to about 35, from about 10 to about 35, or from about 10 to about 30 g/10 min.

Ethylene copolymers produced in accordance with this invention can have a ratio of HLMI/MI of greater than about 25; alternatively, greater than about 30; alternatively, greater than about 50; alternatively, greater than about 75; alternatively, greater than about 100; alternatively, greater than about 150; or alternatively, greater than about 200. Suitable ranges for HLMI/MI can include, but are not limited to, from about 30 to about 350, from about 30 to about 300, from about 40 to about 350, from about 50 to about 300, from about 70 to about 250, or from about 100 to about 200, and the like.

The densities of ethylene-based copolymers produced using the catalyst systems and processes disclosed herein often are less than about 0.930 g/cm$^3$. In one aspect of this invention, the density of an ethylene copolymer can be less than about 0.925, less than about 0.920, or less than about 0.915 g/cm$^3$. Yet, in another aspect, the density can be in a range from about 0.870 to about 0.930 g/cm$^3$, such as, for example, from about 0.895 to about 0.930 g/cm$^3$, from about 0.905 to about 0.925 g/cm$^3$, or from about 0.910 to about 0.922 g/cm$^3$.

Ethylene copolymers consistent with various aspects of the present invention generally can have a broad molecular weight distribution, and often with weight-average molecular weights (Mw's) greater than about 100,000 g/mol, greater than about 150,000 g/mol, or greater than about 200,000 g/mol. Typical weight-average molecular weights (Mw's) of these polymers can be, for instance, in a range from 100,000 to about 600,000 g/mol, from about 150,000 to about 600,000 g/mol, from about 150,000 to about 500,000 g/mol, from about 200,000 to about 500,000 g/mol, or from about 200,000 to about 450,000 g/mol. Likewise, suitable non-limiting ranges of the number-average molecular weight (Mn) can include from about 7,000 to about 35,000 g/mol, from about 8,000 to about 30,000 g/mol, from about 8,000 to about 28,000 g/mol, from about 8,000 to about 25,000 g/mol, or from about 10,000 to about 25,000 g/mol.

The ratio of Mw/Mn, or the polydispersity index, for the polymers of this invention often can be in a range from about 6 to about 60. In some aspects disclosed herein, the ratio of Mw/Mn can be in a range from about 6 to about 50, from about 8 to about 50, or from about 8 to about 35. In other aspects, the ratio of Mw/Mn can be in a range from about 8 to about 30, from about 12 to about 25, or from about 15 to about 25. In these and other aspects, the olefin polymer can have a bimodal molecular weight distribution. The ratio of Mz/Mw for the polymers of this invention often can range from about 3 to about 15. For example, the Mz/Mw ratio can be in a range from about 3 to about 12, from about 4 to about 12, from about 4 to about 10, or from about 5 to about 9.

Generally, ethylene polymers produced in aspects of the present invention have low levels of long chain branching, with typically less than about 0.01 long chain branches (LCB) per 1000 total carbon atoms, but greater than zero. In some aspects, the number of LCB per 1000 total carbon atoms can be less than about 0.008, less than about 0.006, less than about 0.005, or less than about 0.003 LCB per 1000 total carbon atoms.

Ethylene copolymers produced using the polymerization processes and catalyst systems described above can, in some aspects, have a reverse comonomer distribution, i.e., a short chain branch content that increases as molecular weight increases, for example, the higher molecular weight components of the polymer generally have higher comonomer incorporation than the lower molecular weight components. Typically, there is increasing comonomer incorporation with increasing molecular weight. For instance, the number of short chain branches (SCB's) per 1000 total carbon atoms can be greater at Mw than at Mn. In one aspect, the ratio of the number of short chain branches (SCB) per 1000 total carbon atoms of the polymer at Mw to the number of SCB per 1000 total carbon atoms of the polymer at Mn can be a range from about 1.1:1 to about 5:1, or alternatively, in a range from about 1.5:1 to about 4:1.

As disclosed herein, the broad molecular weight polymers can have a higher molecular weight component and a lower molecular weight component. In some aspects, the ratio of the Mw of the higher molecular weight component to the Mw of the lower molecular weight component can be in a range from about 2:1 to about 60:1, or from about 5:1 to about 50:1. In another aspect, this ratio can be in a range from about 10:1 to about 50:1, from about 20:1 to about 50:1, from about 15:1 to about 45:1, or from about 25:1 to about 40:1.

The copolymers of this invention can be further characterized in that the ratio of Mw/Mn of the higher molecular weight component and/or the ratio of Mw/Mn of the lower molecular weight component can be less than about 5; alternatively, less than about 4; alternatively, less than about 3.5; or alternatively, less than about 3. Likewise, the ratio of Mz/Mw of the higher molecular weight component and/or the ratio of Mz/Mw of the lower molecular weight component can be less than about 4, less than about 3, less than about 2.5, or less than about 2.

In some aspects, catalyst component I can incorporate comonomer more efficiently than catalyst component II. Accordingly, the ratio of the number of short chain branches (SCB) per 1000 total carbon atoms of the higher molecular weight component to the number of short chain branches (SCB) per 1000 total carbon atoms of the lower molecular weight component can be greater than about 1.1:1, and in some aspects, greater than about 1.5:1, or in a range from about 1.5:1 to about 6:1, and the like.

As with the overall polymer, the higher molecular weight component can have low levels of long chain branching, with typically less than about 0.01 long chain branches (LCB) per 1000 total carbon atoms, less than about 0.008, less than about 0.006, less than about 0.005, or less than about 0.003 LCB per 1000 total carbon atoms.

An illustrative and non-limiting example of an ethylene copolymer of the present invention can have a higher molecular weight component and a lower molecular weight component, and the copolymer can be characterized by a density of less than about 0.930 g/cm$^3$, a ratio of Mw/Mn in a range from about 6 to about 50, a HLMI in a range from about 4 to about 50 g/10 min, and less than about 0.008 LCB per 1000 total carbon atoms.

Another illustrative and non-limiting example of an ethylene copolymer of the present invention can have a higher molecular weight component and a lower molecular weight component, and the copolymer can be characterized by a density in a range from about 0.895 to about 0.930 g/cm$^3$, a ratio of Mw/Mn in a range from about 8 to about 35, a HLMI in a range from about 4 to about 50 g/10 min, less than about 0.008 LCB per 1000 total carbon atoms, and a reverse comonomer distribution.

Polymers of ethylene, whether homopolymers, copolymers, terpolymers, and so forth, can be formed into various articles of manufacture. Articles which can comprise polymers of this invention include, but are not limited to, an agricultural film, an automobile part, a bottle, a drum, a fiber or fabric, a food packaging film or container, a food service article, a fuel tank, a geomembrane, a household container, a liner, a molded product, a medical device or material, a pipe, a sheet or tape, a toy, and the like. Various processes can be employed to form these articles. Non-limiting examples of these processes include injection molding, blow molding, rotational molding, film extrusion, sheet extrusion, profile extrusion, thermoforming, and the like. Additionally, additives and modifiers are often added to these polymers in order to provide beneficial polymer processing or end-use product attributes. Such processes and materials are described in *Modern Plastics Encyclopedia*, Mid-November 1995 Issue, Vol. 72, No. 12; and *Film Extrusion Manual—Process, Materials, Properties*, TAPPI Press, 1992; the disclosures of which are incorporated herein by reference in their entirety.

Applicants also contemplate a method for forming or preparing an article of manufacture comprising a polymer produced by any of the polymerization processes disclosed herein. For instance, a method can comprise (i) contacting a catalyst composition with an olefin monomer and an olefin comonomer (one or more) under polymerization conditions to produce an olefin polymer, wherein the catalyst composition can comprise catalyst component I, catalyst component II, an activator-support comprising a solid oxide treated with an electron-withdrawing anion, and an optional co-catalyst (e.g., an organoaluminum compound); and (ii) forming an article of manufacture comprising the olefin polymer. The forming step can comprise blending, melt processing, extruding, molding, or thermoforming, and the like, including combinations thereof.

In some aspects, the article produced from and/or comprising the ethylene polymer of this invention is a film product. In such aspects, the film can have a dart impact strength of greater than about 250 g/mil, a dart impact strength in a range from about 300 to about 2000 g/mil, or a dart impact strength in a range from about 450 to about 1500 g/mil. Additionally or alternatively, the film can have a MD Elmendorf tear strength of greater than 100 g/mil, a MD Elmendorf tear strength in a range from about 100 to about 750 g/mil, or a MD Elmendorf tear strength in a range from about 125 to about 500 g/mil. Additionally or alternatively, the film can have a TD Elmendorf tear strength of greater than about 600 g/mil, a TD Elmendorf tear strength in a range from about 650 to about 2000 g/mil, or a TD Elmendorf tear strength in a range from about 700 to about 1500 g/mil.

EXAMPLES

The invention is further illustrated by the following examples, which are not to be construed in any way as imposing limitations to the scope of this invention. Various other aspects, embodiments, modifications, and equivalents thereof which, after reading the description herein, may suggest themselves to one of ordinary skill in the art without departing from the spirit of the present invention or the scope of the appended claims.

Melt index (MI, g/10 min) was determined in accordance with ASTM D1238 at 190° C. with a 2,160 gram weight. High load melt index (HLMI, g/10 min) was determined in accordance with ASTM D1238 at 190° C. with a 21,600 gram weight.

Polymer density was determined in grams per cubic centimeter ($g/cm^3$) on a compression molded sample, cooled at about 15° C. per hour, and conditioned for about 40 hours at room temperature in accordance with ASTM D1505 and ASTM D4703.

Molecular weights and molecular weight distributions were obtained using a PL-GPC 220 (Polymer Labs, an Agilent Company) system equipped with a IR4 detector (Polymer Char, Spain) and three Styragel HMW-6E GPC columns (Waters, Mass.) running at 145° C. The flow rate of the mobile phase 1,2,4-trichlorobenzene (TCB) containing 0.5 g/L 2,6-di-t-butyl-4-methylphenol (BHT) was set at 1 mL/min, and polymer solution concentrations were in the range of 1.0-1.5 mg/mL, depending on the molecular weight. Sample preparation was conducted at 150° C. for nominally 4 hr with occasional and gentle agitation, before the solutions were transferred to sample vials for injection. An injection volume of about 200 μL was used. The integral calibration method was used to deduce molecular weights and molecular weight distributions using a Chevron Phillips Chemicals Company's HDPE polyethylene resin, MARLEX® BHB5003, as the broad standard. The integral table of the broad standard was pre-determined in a separate experiment with SEC-MALS. Mn is the number-average molecular weight, Mw is the weight-average molecular weight, Mz is the z-average molecular weight, and Mp is the peak molecular weight.

Melt rheological characterizations were performed as follows. Small-strain (10%) oscillatory shear measurements were performed on a Rheometrics Scientific, Inc. ARES rheometer using parallel-plate geometry. All rheological tests were performed at 190° C. The complex viscosity $|\eta^*|$ versus frequency (w) data were then curve fitted using the modified three parameter Carreau-Yasuda (CY) empirical model to obtain the zero shear viscosity—$\eta_0$, characteristic viscous relaxation time—$\tau_\eta$, and the breadth parameter—a. The simplified Carr-eau-Yasuda (CY) empirical model is as follows.

$$|\eta^*(\omega)| = \frac{\eta_0}{[1 + (\tau_\eta \omega)^a]^{(1-n)/a}},$$

wherein:
$\eta^*(\omega)|$=magnitude of complex shear viscosity;
$\eta_0$=zero shear viscosity;
$\tau_\eta$=viscous relaxation time (Tau($\eta$));
a="breadth" parameter (CY—a parameter);
n=fixes the final power law slope, fixed at 2/11; and
$\omega$=angular frequency of oscillatory shearing deformation.

Details of the significance and interpretation of the CY model and derived parameters may be found in: C. A. Hieber and H. H. Chiang, *Rheol. Acta*, 28, 321 (1989); C. A. Hieber and H. H. Chiang, *Polym. Eng. Sci.*, 32, 931 (1992); and R. B. Bird, R. C. Armstrong and O. Hasseger, *Dynamics of Polymeric Liquids, Volume 1, Fluid Mechanics*, 2nd Edition, John Wiley & Sons (1987); each of which is incorporated herein by reference in its entirety.

The long chain branches (LCB) per 1,000 total carbon atoms were calculated using the method of Janzen and Colby (*J. Mol. Struct.*, 485/486, 569-584 (1999)), from values of zero shear viscosity, $\eta_o$ (determined from the Carr eau-Yasuda model, described hereinabove), and measured values of Mw obtained using a Dawn EOS multiangle light scattering detector (Wyatt). See also U.S. Pat. No. 8,114,946; J. Phys. Chem. 1980, 84, 649; and Y. Yu, D. C. Rohlfing, G. R Hawley, and P. J. DesLauriers, *Polymer Preprints*, 44, 49-50 (2003). These references are incorporated herein by reference in their entirety.

Short chain branch (SCB) content and short chain branching distribution (SCBD) across the molecular weight distribution were determined via an IR5-detected GPC system (IR5-GPC), wherein the GPC system was a PL220 GPC/SEC system (Polymer Labs, an Agilent company) equipped with three Styragel HMW-6E columns (Waters, Mass.) for polymer separation. A thermoelectric-cooled IR5 MCT detector (IR5) (Polymer Char, Spain) was connected to the GPC columns via a hot-transfer line. Chromatographic data were obtained from two output ports of the IR5 detector. First, the analog signal goes from the analog output port to a digitizer before connecting to Computer "A" for molecular weight determinations via the Cirrus software (Polymer Labs, now an Agilent Company) and the integral calibration method using a broad MWD HDPE Marlex™ BHB5003 resin (Chevron Phillips Chemical) as the broad molecular weight standard. The digital signals, on the other hand, go via a USB cable directly to Computer "B" where they are collected by a LabView data collection software provided by Polymer Char. Chromatographic conditions were set as follows: column oven temperature of 145° C.; flowrate of 1 mL/min; injection volume of 0.4 mL; and polymer concentration of about 2 mg/mL, depending on sample molecular weight. The temperatures for both the hot-transfer line and IR5 detector sample cell were set at 150° C., while the temperature of the electronics of the IR5 detector was set at 60° C. Short chain branching content was determined via an in-house method using the intensity ratio of $CH_3$ ($I_{CH3}$) to $CH_2$ ($I_{CH2}$) coupled with a calibration curve. The calibration curve was a plot of SCB content ($x_{SCB}$) as a function of the intensity ratio of $I_{CH3}/I_{CH2}$. To obtain a calibration curve, a group of polyethylene resins (no less than 5) of SCB level ranging from zero to ca. 32 SCB/1,000 total carbons (SCB Standards) were used. All these SCB Standards have known SCB levels and flat SCBD profiles pre-determined separately by NMR and the solvent-gradient fractionation coupled with NMR (SGF-NMR) methods. Using SCB calibration curves thus established, profiles of short chain branching distribution across the molecular weight distribution were obtained for resins fractionated by the IR5-GPC system under exactly the same chromatographic conditions as for these SCB standards. A relationship between the intensity ratio and the elution volume was converted into SCB distribution as a function of MWD using a predetermined SCB calibration curve (i.e., intensity ratio of $I_{CH3}/I_{CH2}$ vs. SCB content) and MW calibration curve (i.e., molecular weight vs. elution time) to convert the intensity ratio of $I_{CH3}/I_{CH2}$ and the elution time into SCB content and the molecular weight, respectively.

Pilot plant polymerizations were conducted in a 23-gallon slurry loop reactor at a production rate of approximately 25 pounds of polymer per hour. Polymerization runs were carried out under continuous particle form process conditions in a loop reactor (also known as a slurry process) by contacting a dual metallocene solution in isobutane, an organoaluminum solution, and an activator-support in a 1-L stirred autoclave with continuous output to the loop reactor. The organoaluminum and dual metallocene solutions were fed as separate streams into a tee upstream of the autoclave where they contacted each other. The activator-support was flushed with isobutane into a tee between the aforementioned tee and the autoclave, contacting the organoaluminum/metallocene mixture just before entering the autoclave. The isobutane flush used to transport the activator-support into the autoclave was set at a rate that would result in a residence time of approximately 25 minutes in the autoclave. The total flow from the autoclave then entered the loop reactor.

Ethylene used was polymerization grade ethylene which was purified through a column of alumina (activated at 250° C. in nitrogen). 1-Hexene was polymerization grade 1-hexene (obtained from Chevron Phillips Chemical Company) which was purified by nitrogen purging and storage over 13-X molecular sieve activated at 250° C. (482° F.) in nitrogen. The loop reactor was a liquid full, 15.2 cm diameter, loop reactor, having a volume of 23 gallons (87 liters). Liquid isobutane was used as the diluent. Hydrogen was added to regulate the molecular weight and/or HLMI of the polymer product. The isobutane was polymerization grade isobutane (obtained from Chevron Phillips Chemical Company) that was further purified by distillation and subsequently passed through a column of alumina (activated at 250° C. in nitrogen).

Reactor conditions included a pressure around 580 psi (4 MPa), and a temperature that was varied from about 70° C. (158° F.) to about 100° C. (212° F.) as indicated in the examples. Also, the reactor was operated to have a residence time of about 1.25 hr. Metallocene concentrations in the reactor were within a range of about 1 to 2 parts per million (ppm) of the diluent in the polymerization reactor. Polymer was removed from the reactor at the rate of about 25 lb/hr and recovered in a flash chamber. A Vulcan dryer was used to dry the polymer under nitrogen at about 60-80° C.

Cocatalyst tri-isobutylaluminum (TIBA, obtained from Akzo Corporation) was also used. The cocatalyst was obtained as a one molar solution in heptane, but was further diluted to 1 weight percent. The cocatalyst was added in a concentration in a range of from about 50 to 60 parts per million of the diluent in the polymerization reactor. To prevent static buildup of the reactor, a small amount (less than 5 ppm, by weight, of diluent) of a commercial antistatic agent sold as "Stadis 450" was added as needed.

Metallocene A, phenyl-3-butenylmethylidene(eta$^5$-cyclopentadienyl)(eta$^5$-9,2-7-di-tert-butylfluorenyl)zirconium dichloride, was prepared as described in U.S. Pat. No. 7,312,283. Metallocene B, bis(indenyl)zirconium dichloride, was purchased from Witco (Eurecene 5032). Metallocene C, diphenylmethylidene{$\eta^5$-[3-(penten-4-yl)cyclopentadien-1-ylidene]}[$\eta^5$-(2,7-di-tert-butylfluoren-9-ylidene)]hafnium dichloride, was synthesized as reported in U.S. Pat. No. 7,732,542. Metallocene D, [$\eta^5$-1-(propen-2-yl)indenyl][$\eta^5$-n-butylcyclopentadienyl]zirconium dichloride, was synthesized as reported in U.S. Pat. No. 7,732,542. Metallocene E was rac-ethylene-bis(indenyl) zirconium dichloride, and Metallocene F was diphenylmethylidene{$\eta^5$-[3-(penten-4-yl)cyclopentadien-1-ylidene]}[$\eta^5$-(2,7-di-tert-butylfluoren-9-ylidene)]zirconium dichloride.

Alumina A, from W.R. Grace Company, was impregnated to incipient wetness with an aqueous solution of ammonium sulfate. Typically, the alumina had a surface area of about 330 m$^2$/gram and a pore volume of about 1.3 mL/g. The amount of ammonium sulfate used was equal to 20% of the starting amount of alumina. The volume of water used to dissolve the ammonium sulfate was calculated from the total pore volume of the starting sample (e.g., 2.6 mL of water for each gram of alumina to be treated). Thus, a solution of about 0.08 grams of ammonium sulfate per mL of water was employed. The resulting wet sulfated alumina was dried in a vacuum oven overnight at 120° C., and then screened through a 35 mesh screen. Finally, the material was activated in a fluidizing stream of dry air at 550° C. for 8 hours. The resulting sulfated alumina was then stored under nitrogen.

Fluorided silica-coated aluminas were prepared as follows. Alumina A was first calcined in dry air at about 600° C. for approximately 6 hours, cooled to ambient temperature, and then contacted with tetraethylorthosilicate in isopropanol to equal 25 wt. % SiO$_2$. After drying, the silica-coated alumina was calcined at 600° C. for 3 hours. Fluorided silica-coated alumina (7 wt. % F) was prepared by impregnating the calcined silica-coated alumina with an ammonium bifluoride solution in methanol, drying, and then calcining for 3 hours at 600° C. (unless otherwise noted) in dry air. Afterward, the fluorided silica-coated alumina was collected and stored under dry nitrogen, and was used without exposure to the atmosphere.

Some of the blown film samples were made on a laboratory-scale blown film line using typical linear low density polyethylene conditions (LLDPE) as follows: 100 mm (4 inch) die diameter, 1.5 mm (0.060 inch) die gap, 37.5 mm (1.5 inch) diameter single-screw extruder fitted with a barrier screw with a Maddock mixing section at the end (L/D=24, 2.2:1 compression ratio), about 27 kg/hr (60 lb/hr) output rate, 2.5:1 blow-up ratio (BUR), "in-pocket" bubble with a "frost line height" (FLH) of about 28 cm (11 inch), 190° C. (375° F.) barrel and die set temperatures, and 1 mil (25 micron) film and 3 mil (75 micron) film. Cooling was accomplished with a Dual Lip air ring using ambient (laboratory) air at about 25° C. (75-80° F.). These particular processing conditions were chosen because the film properties so obtained are typically representative of those obtained from larger, commercial scale film blowing conditions.

Other blown film samples were made on the same film line, but under high density polyethylene conditions (HDPE). Typically, the copolymer was blown into a 1 mil film on a 2-inch die, with a 35-mil die gap, at 205° C./220° C. barrel/die set temperatures, at a rate of 28-30 lb/hr, with a 4:1 blow-up ratio, and a 14 inch frost line height.

Dart impact strength was measured in accordance with ASTM D-1709 (method A). Machine (MD) and transverse (TD) direction Elmendorf tear strengths were measured on a Testing Machines Inc. tear tester (Model 83-11-00) in accordance with ASTM D-1922. Film haze was determined in accordance with ASTM D1003, film-to-film coefficient of friction (COF) was determined in accordance with ASTM D1894, film shrink properties were determined in accordance with ASTM D2732, and Spencer Impact was determined in accordance with ASTM D3420.

Examples 1-7

In Example 1, bimodal polymer was produced in the reactor described above using a solution containing two metallocenes in the following amounts: the first (producing higher molecular weight) component was metallocene A at 45%, and the second (producing lower molecular weight) component was metallocene B at 55%. The total metallocene concentration in the reactor was 1.2 ppm, and the activator-support (sulfate treated alumina, described above) was fed to the reactor at the rate of approximately 0.25 lb per hour, to achieve a yield of about 2000 lb polymer per lb of alumina Triisobutylaluminum was fed to the reactor to maintain a concentration of 50 ppm in the isobutane. 1-Hexene was added to the reactor to maintain a concentration of about 0.6 wt. % of the isobutane diluent. Ethylene was added to maintain a concentration of 15 mol %. About 4.5 mlb of hydrogen were added to adjust the average HLMI to 10.3 g/10 min. Reactor temperature was set at 99° C., and reactor polymer concentration was set at 20-30 wt. %. Approximately 150 lb of polymer were made under these conditions, having an average HLMI of 10.3 g/10 min and an average density of 0.9502 g/cm$^3$. The HLMI/MI ratio was 56, Mw (weight-average molecular weight) was 190 kg/mol, polydispersity (Mw/Mn) was 15.3, and the overall polymer had 2.5 long chain branches per million carbons in accordance with the Janzen-Colby method.

From analysis of the bimodal GPC curves, the lower molecular weight component was estimated to have a Mw of 31 kg/mol, whereas the higher molecular weight component was estimated to have a Mw of 840 kg/mol. Thus, the higher molecular weight component had a Mw that was 27 times higher than that of the lower molecular weight component.

When run separately, metallocene A produced polymer having a Mw of about 220 kg/mol, a polydispersity of 2.7, a Mz/Mw of 1.9, and 2.3 long chain branches per million total carbon atoms. Polymer made with metallocene A, when run alone under the conditions described above and analyzed by FTIR, contained 1.8 butyl branches per 1000 carbons, whereas metallocene B generated 0.5 butyl branches per 1000 carbons, thus giving a ratio of 1.8/0.5=3.6 (i.e., more branches in the higher molecular weight component than in the lower molecular weight component).

In Constructive Example 2, polymer can be produced in substantially the same manner as in Example 1, except as follows. The reactor temperature is set at 80° C., the 1-hexene feed is increased to equal 4.5 wt. % of the isobutane diluent, and 4.1 mlb of hydrogen is added to adjust the average HLMI to 8.8. The average density can be 0.9271 g/cm$^3$, the HLMI/MI ratio can be 75, the Mw can be 205 kg/mol, and the polydispersity can be 16.2. The overall polymer can have 1.5 long chain branches per million carbons in accordance with the Janzen-Colby method.

GPC analysis of the polymer can be performed, and the lower molecular component can have an estimated Mw of 36 kg/mol, whereas the higher molecular weight component can have an estimated Mw of 745 kg/mol. Thus, the Mw of the higher molecular weight component can be 21 times higher than that of the Mw of the lower molecular weight component.

When run separately, metallocene A can produce polymer having a Mw of about 201 kg/mol, a polydispersity of 2.7, an Mz/Mw of 1.8, and 1.8 long chain branches per million total carbon atoms. Polymer made with metallocene A, when run alone under the conditions described above and analyzed by FTIR, can contain 13.3 butyl branches per 1000 carbons, whereas metallocene B can generate 3.6 butyl branches per 1000 carbons, giving a ratio of 13.3/3.6=3.7 (i.e., more branches are expected in the higher molecular weight component than in the lower molecular weight component). Using SEC-FTIR analysis, the short-chain branching distribution for the polymer of Constructive Example 2 can be measured, and the expected results are shown in FIG. 1 as a function of molecular weight.

The bimodal polymer of Example 1 was blown into film under the high density conditions (HD) described above and then again under the linear low density (LL) conditions described above. Film was produced at a 1-mil thickness and tested for impact and tear resistance. The polymer and film properties of Example 1 are shown in Table I and Table II, respectively. The projected polymer properties of Constructive Example 2 are shown in Table I, while the projected/estimated film properties of Constructive Example 2 are shown in Table II. Example 3 was a commercially-available high molecular weight film resin from Equistar Corporation (L5005). Example 4 was a commercially-available broad monomodal LLDPE film resin from Chevron-Phillips Chemical Company LP (TR257). The lower density of Constructive Example 2 is expected to greatly improve mechanical properties.

In Example 5, bimodal polymer was produced in substantially the same manner as in Example 1. For Example 5, a solution containing two metallocenes was fed to the reactor in the following amounts: the first (producing higher molecular weight) component was metallocene C at 57%, and the second (producing lower molecular weight) component was metallocene D at 43%. The total metallocene concentration in the reactor was 1.6 ppm, and the activator-support (sulfate treated alumina, described above) was fed to the reactor at the rate of approximately 0.25 lb per hour, to achieve a yield of about 2000 lb polymer per lb of alumina Triisobutylaluminum was fed to the reactor to maintain a concentration of 55 ppm in the isobutane. 1-Hexene was added to the reactor to maintain a concentration of about 0.5 wt. % of the isobutane diluent. Ethylene was added to maintain a concentration of 15 mol %. About 4.5 mlb of hydrogen were added to adjust the average HLMI to 9.5 g/10 min. Reactor temperature was set at 100° C., and reactor polymer concentration was set at 28 wt. %. Approximately 250 lb of polymer were made under these conditions, having an average HLMI of 9.5 g/10 min and an average density of 0.9511 g/cm$^3$. The HLMI/MI ratio was 185, Mw (weight-average molecular weight) was 240 kg/mol, polydispersity (Mw/Mn) was 22.4, and the overall polymer had 1.5 long chain branches per million carbons in accordance with the Janzen-Colby method.

From analysis of the bimodal GPC curves, the lower molecular weight component was estimated to have a Mw of 26 kg/mol, whereas the higher molecular weight component was estimated to have a Mw of 1200 kg/mol. Thus, the higher molecular weight component had a Mw that was 46 times higher than that of the lower molecular weight component.

When run separately, metallocene C produced polymer having a Mw of about 190 kg/mol, a polydispersity of 2.8, a Mz/Mw of 1.8, and 1.5 long chain branches per million total carbon atoms. Polymer made with metallocene C, when run alone under the conditions described above and analyzed by FTIR, contained 2 butyl branches per 1000 carbons, whereas metallocene D generated 0.4 butyl branches per 1000 carbons, thus giving a ratio of 2/0.4=5 (i.e., more branches in the higher molecular weight component than in the lower molecular weight component).

In Constructive Example 6, polymer can be produced in substantially the same manner as in Example 5, except as follows. The reactor temperature is set at 80° C., the 1-hexene feed is increased to equal 5 wt. % of the isobutane diluent, and 3.9 mlb of hydrogen is added to adjust the average HLMI to 9.6 g/10 min. The average density can be about 0.9243 g/cm$^3$, the HLMI/MI ratio can be 210, the Mw can be 253 kg/mol, and the polydispersity can be 26.1. The overall polymer can have 0.7 long chain branches per million carbons in accordance with the Janzen-Colby method.

GPC analysis of the polymer can be performed, and the lower molecular component can have an estimated Mw of 24 kg/mol, whereas the higher molecular weight component can have an estimated Mw of 955 kg/mol. Thus, the Mw of the higher molecular weight component can be 40 times higher than that of the Mw of the lower molecular weight component.

When run separately, metallocene C can produce polymer having a Mw of about 193 kg/mol, a polydispersity of 2.8, a Mz/Mw of 1.9, and 0.8 long chain branches per million total carbon atoms. Polymer made with metallocene C, when run alone under the conditions described above and analyzed by FTIR, can contain 18 butyl branches per 1000 carbons, whereas metallocene D can generate 4 butyl branches per 1000 carbons, giving a ratio of 18/4=4.5 (i.e., more branches are expected in the higher molecular weight component than in the lower molecular weight component).

The bimodal polymer of Example 5 was blown into film under the high density conditions (HD) described above and then again under the linear low density (LL) conditions described above. Film was produced at a 1-mil thickness and tested for impact and tear resistance. The polymer and film properties of Example 5 are shown in Table I and Table II, respectively. The projected polymer properties of Constructive Example 6 are shown in Table I, while the projected/ estimated film properties of Constructive Example 6 are shown in Table II. The lower density of Constructive Example 6 is expected to greatly improve mechanical properties, such as dart impact strength and Elmendorf Tear strength. It is expected that the dart impact and MD tear strength of Constructive Example 6 will be comparable to or superior to that of Example 4.

In Constructive Example 7, polymer can be produced in substantially the same manner as in Example 5, except as follows. The reactor temperature is set at 74° C., the 1-hexene feed is increased to equal 7.6 wt. % of the isobutane diluent, and 2.4 mlb of hydrogen is added to adjust the average HLMI to 12.1 g/10 min. The average density can be about 0.9151 g/cm$^3$, the HLMI/MI ratio can be 168, the Mw can be 202 kg/mol, and the polydispersity can be 18.1. The overall polymer can have 0.6 long chain branches per million carbons in accordance with the Janzen-Colby method.

GPC analysis of the polymer can be performed, and the lower molecular component can have an estimated Mw of 23 kg/mol, whereas the higher molecular weight component can have an estimated Mw of 845 kg/mol. Thus, the Mw of the higher molecular weight component can be 37 times higher than that of the Mw of the lower molecular weight component.

When run separately, metallocene C can produce polymer having a Mw of about 187 kg/mol, a polydispersity of 2.7, a Mz/Mw of 1.9, and 0.8 long chain branches per million total carbon atoms. Polymer made with metallocene C, when run alone under the conditions described above and analyzed by FTIR, can contain 24 butyl branches per 1000 carbons, whereas metallocene D can generate 5 butyl branches per 1000 carbons, giving a ratio of 24/5=4.8 (i.e., more branches are expected in the higher molecular weight component than in the lower molecular weight component).

The projected polymer properties of Constructive Example 7 are shown in Table I, while the projected/estimated film properties of Constructive Example 7 are shown in Table II. The lower density of Constructive Example 7 is expected to greatly improve mechanical properties, such as dart impact strength and Elmendorf Tear strength. It is expected that the dart impact and MD tear strength of Constructive Example 7 will be a significant improvement over that of Example 4.

TABLE I

Polymer Properties of Examples 1-7.

| Example | Sample | HLMI (g/10 min) | HLMI/MI | Density (g/cm$^3$) | Mw/Mn |
|---|---|---|---|---|---|
| 1 | Working | 10.3 | 56 | 0.9502 | 15.3 |
| 2 | Constructive | 8.8 | 75 | 0.9271 | 16.2 |
| 3 | Working | 8.0 | 185 | 0.9511 | 22.1 |
| 4 | Working | 18.7 | 91 | 0.9241 | 18.2 |
| 5 | Working | 9.5 | 185 | 0.9511 | 22.4 |
| 6 | Constructive | 9.6 | 210 | 0.9243 | 26.1 |
| 7 | Constructive | 12.1 | 168 | 0.9151 | 18.1 |

TABLE II

Film Properties of Examples 1-7.

| Example | Sample | Film Line Conditions | Dart Impact (g) | MD Tear (g) | TD Tear (g) |
|---|---|---|---|---|---|
| 1 | Working | HD | 195 | 25 | 320 |
| 2 | Constructive | HD | 350 | 100 | 700 |
| 3 | Working | HD | 220 | 30 | 210 |
| 4 | Working | HD | 530 | 100 | 650 |
| 5 | Working | HD | 290 | 30 | 650 |
| 6 | Constructive | HD | 500 | 150 | 800 |
| 7 | Constructive | HD | 700 | 250 | 600 |
| 1 | Working | LL | 130 | 25 | 230 |

TABLE II-continued

Film Properties of Examples 1-7.

| Example | Sample | Film Line Conditions | Dart Impact (g) | MD Tear (g) | TD Tear (g) |
|---|---|---|---|---|---|
| 2 | Constructive | LL | 400 | 150 | 800 |
| 3 | Working | LL | 23 | 10 | 1300 |
| 4 | Working | LL | 80 | 20 | 800 |
| 5 | Working | LL | 150 | 20 | 1000 |
| 6 | Constructive | LL | 300 | 100 | 1000 |
| 7 | Constructive | LL | 500 | 100 | 1000 |

Examples 8-16

Example 8 was a broad monomodal LLDPE film resin, having a nominal 0.2 melt index and a density of 0.924 g/cm$^3$, commercially available from Chevron-Phillips Chemical Company LP. Each of Examples 9-16 utilized a dual catalyst system containing a two carbon bridged, zirconium based metallocene compound containing two indenyl groups (Metallocene E) and a single atom bridged, zirconium based metallocene compound containing a cyclopentadienyl and a fluorenyl group (Metallocene F).

In Example 9, bimodal polymer was produced in the reactor described above using a solution containing Metallocenes E and F at an E:F weight ratio of 8:1. The total metallocene concentration in the reactor was 0.8 ppm by weight, and the activator-support (fluorided silica-coated alumina, described above) was fed to the reactor at the rate of approximately 0.25 lb per hour, to achieve a yield of about 2000 lb polymer per lb of the fluorided silica-coated alumina Triisobutylaluminum was fed to the reactor to maintain a concentration of 50 ppm by weight in the isobutane. 1-Hexene was added to the reactor to maintain a concentration of about 2.5 mol %, and ethylene was added to maintain a concentration of about 12 mol % (based on the isobutane diluent). About 4.5 mlb of hydrogen were added to the reactor per hour. Reactor temperature was set at 79-80° C., the reactor residence time was about 1.2 hr, and the reactor % solids were 29.4-30.3%. Examples 10-16 were produced in the same manner as Example 9, generally at 11.4-12.4 mol % ethylene and 2.5-2.9 mol % 1-hexene, and with the following different amounts of the metallocene catalysts: Example 10 (1.12 ppm of metallocenes at a 12:1 weight ratio of E:F), Example 11 (0.92 ppm of metallocenes at a 8:1 weight ratio of E:F), Example 12 (1.02 ppm of metallocenes at a 20:1 weight ratio of E:F), Example 13 (1.6 ppm of metallocenes at a 20:1 weight ratio of E:F), Example 14 (0.83 ppm of metallocenes at a 20:1 weight ratio of E:F), Example 15 (0.79 ppm of metallocenes at a 20:1 weight ratio of E:F), and Example 16 (0.66 ppm of metallocenes at a 30:1 weight ratio of E:F)

Table III summarizes the polymer properties of Examples 8-16. For instance, the polymers of Examples 9-14 exhibited a unique combination of density, Mw/Mn, HLMI, LCB content, and SCB distribution. The broad molecular weight distribution and reverse comonomer distribution of the polymers produced using the dual metallocene-based catalyst systems disclosed herein are illustrated in FIGS. 2-9 for the polymers of Examples 9-16, respectively (e.g., there are relatively more short chain branches (SCB) at the higher molecular weights; assumes 2 methyl chain ends (CE)). In FIGS. 2-9, the number of SCB per 1000 total carbon (TC) atoms of the polymer at Mz (or Mw) is greater than at Mn.

Table IV summarizes the properties of the lower molecular weight (LMW) component and the higher molecular weight (HMW) component of the polymers of Examples 9-15. The respective LMW and HMW component properties were determined by deconvoluting the molecular weight distribution (see FIGS. 2-8) of each polymer. The relative amounts of the LMW and HMW components (area percentages) in the polymer, and Mp of the LMW component and Mp of the HMW component, were determined using a commercial software program (Systat Software, Inc., Peak Fit™ v. 4.05). The other molecular weight parameters for the LMW and HMW components (e.g., Mn, Mw, Mz, etc., of each component) were determined by using the deconvoluted data from the Peak Fit™ program, and applying a Schulz-Flory distribution mathematical function and a Gaussian peak fit, as generally described in U.S. Pat. No. 7,300,983, which is incorporated herein by reference in its entirety.

The LCB of the polymers of Examples 9-16 were determined using Janzen-Colby method, as described herein. The LCB of the HMW component was determined by first producing a polymer using Metallocene F alone at conditions suitable to produce a polymer having a molecular weight (Mw) in the 100-125 kg/mol range, and then determining the LCB content using the Janzen-Colby method. The LCB of the LMW component was likewise determined by first producing a polymer using Metallocene E alone at conditions suitable to produce a polymer having a Mw in the 100-125 kg/mol range, and then determining the LCB content using the Janzen-Colby method. The polymerization runs used to produce these polymers were conducted in a one-gallon stainless steel reactor with 1.8 L of isobutane. About 1 mmol triisobutylaluminum, 100 mg of fluorided silica-coated alumina, and 3 mg of the respective metallocene compound were added in that order through a charge port while slowly venting isobutane vapor. The charge port was closed and isobutane was added. The contents of the reactor were stirred and heated to the polymerization temperature of 80° C., and ethylene and 40 mL of 1-hexene were then introduced into the reactor. Ethylene was fed on demand to maintain the target pressure of 400 psig pressure for the 30 min length of the polymerization run. If needed, hydrogen was added with the ethylene feed to produce a polymer with a Mw in the 100-125 kg/mol range. The reactor was maintained at the desired temperature throughout the run by an automated heating-cooling system. Using Metallocene E, polymers were produced at a Mw of 110 kg/mol and at a Mw of 112 kg/mol, and these polymers had 12.4 and 12.3 LCB, respectively, per million carbon atoms. Using Metallocene F, polymers were produced at a Mw of 107 kg/mol and at 122 kg/mol, and both polymers had 1.1 LCB per million carbon atoms. Hence, the ratio of the number of LCB of the LMW component to the number of LCB of the HMW component, per million total carbon atoms, was about 11:1.

Blown films were produced under the HDPE conditions provided hereinabove at an output rate of 28-30 lb/hr and a melt temperature of 191-192° C. In Table V, blown films labeled with an "A" were made without a polymer processing aid (e.g., Example 10A), while those labeled with a "B" were made with 400-800 ppm of a polymer processing aid (e.g., Example 10B). Gels were measured using an automated camera-based gel counting machine made by Optical Control System (OCS), Model FS-5. The system consisted of a light source and a detector. The film was passed through the system, between the light source and the detector, with a 150 mm (6 inch) inspection width. A total of 10 square meters of film area was inspected and the gels with sizes less than or greater than 200 microns were analyzed. The numbers in the table represent the numbers of each category of gel sizes counted per square foot. Films made from the polymers of Examples 9-13, as shown in Table V, exhibited a unique combination of dart impact strength, MD tear strength, haze, COF, and shrink properties. In particular, the films made from the polymers of Examples 9-13 had dart impact strengths 3-7 times greater than that of the film produced from the polymer of Example 8.

Blown films were produced under the LLDPE conditions provided hereinabove at an output rate of about 27 kg/hr (60 lb/hr) and a melt temperature of 179-184° C., except for Example 9, which was produced at an output rate of 45-48 lb/hr due to pressure limitations. In Tables VI-VII, blown films with an "A" were made without a polymer processing aid (e.g., Example 10A), while those with a "B" were made with 400-800 ppm of a polymer processing aid (e.g., Example 10B). Films made from the polymers of Examples 9-15, as shown in Table VI, exhibited a unique combination of dart impact strength, MD tear strength, haze, COF, and shrink properties. In particular, the films made from the polymers of Examples 9-15 had lower gels and higher dart impact strengths than that of the film produced from the polymer of Example 8.

TABLE III

Polymer Properties of Examples 8-16.

|  | 8 | 9 | 10 | 11 | 12 | 13 | 14 | 15 | 16 |
|---|---|---|---|---|---|---|---|---|---|
| Melt Index | 0.16 | 0.04 | 0.08 | 0.14 | 0.18 | 0.07 | 0.31 | 0.57 | 1.01 |
| HLMI | 15.9 | 5.1 | 12.7 | 9.6 | 15.7 | 6.7 | 24.0 | 59.6 | 92.9 |
| HLMI/MI | 99 | 128 | 159 | 69 | 87 | 95 | 77 | 105 | 92 |
| Density | 0.9246 | 0.9223 | 0.9242 | 0.9189 | 0.9220 | 0.9219 | 0.9249 | 0.9243 | 0.9252 |
| Molecular weight parameters (kg/mol) | | | | | | | | | |
| Mn | 11.6 | 16.6 | 16.1 | 17.5 | 15.7 | 17.3 | 14.1 | 14.4 | 14.7 |
| Mw | 181 | 214 | 189 | 181 | 167 | 192 | 149 | 138 | 123 |
| Mz | 896 | 759 | 764 | 644 | 657 | 72 | 727 | 729 | 673 |
| Mw/Mn | 15.6 | 12.9 | 11.7 | 10.3 | 10.7 | 11.1 | 10.6 | 9.6 | 8.4 |
| Mz/Mw | 5.0 | 3.5 | 4.1 | 3.6 | 3.9 | 3.8 | 4.9 | 5.3 | 5.5 |
| Mp | 77.5 | 26.2 | 28.0 | 120.4 | 55.1 | 55.1 | 36.6 | 37.6 | 36.6 |
| Dynamic Rheology @ 190° C. | | | | | | | | | |
| $\eta_0$ (Pa-sec) | 6.3E+05 | 1.5E+05 | 1.0E+05 | 7.4E+04 | 8.2E+04 | 1.7E+05 | 6.3E+04 | 4.3E+04 | 3.4E+04 |
| Tau($\eta$) (sec) | 2.30 | 1.33 | 1.11 | 0.41 | 0.52 | 1.18 | 0.54 | 0.27 | 0.12 |
| CY-a | 0.176 | 0.415 | 0.385 | 0.330 | 0.290 | 0.300 | 0.250 | 0.228 | 0.193 |
| LCB content (per 1,000,000 carbon atoms) and SCB distribution (SCBD) | | | | | | | | | |
| LCB content | 12.7 | 3.7 | 3.6 | 3.3 | 4.5 | 4.6 | 7.4 | 7.4 | 10.1 |
| SCBD | reverse | reverse | reverse | reverse | reverse | reverse | reverse | reverse | reverse |

TABLE IV

Lower Molecular Weight and Higher Molecular Weight Component Properties of Examples 9-15.

| | Lower Molecular Component Properties (kg/mol) | | | | | | | Higher Molecular Weight Component Properties (kg/mol) | | | | | | | Mp (HMW)/ Mp (LMW) |
|---|---|---|---|---|---|---|---|---|---|---|---|---|---|---|---|
| | % | Mn | Mw | Mz | Mp | Mw/Mn | Mz/Mw | % | Mn | Mw | Mz | Mp | Mw/Mn | Mz/Mw | |
| 9 | 54 | 10.5 | 38.4 | 113.7 | 20.1 | 3.7 | 3.0 | 46 | 164.4 | 406.1 | 736.7 | 258.4 | 2.5 | 1.8 | 13 |
| 10 | 62 | 10.8 | 39.8 | 111.5 | 20.8 | 3.7 | 2.8 | 38 | 178.0 | 424.8 | 762.9 | 275.0 | 2.4 | 1.8 | 13 |
| 11 | 45 | 11.0 | 45.2 | 185.9 | 22.3 | 4.1 | 4.1 | 55 | 99.6 | 438.7 | 746.4 | 186.4 | 4.4 | 1.7 | 8 |
| 12 | 58 | 11.4 | 46.6 | 115.0 | 23.0 | 4.1 | 2.5 | 42 | 120.8 | 362.5 | 715.4 | 209.3 | 3.0 | 2.0 | 9 |
| 13 | 56 | 9.4 | 52.3 | 213.0 | 22.1 | 5.6 | 4.1 | 44 | 116.9 | 367.7 | 780.6 | 267.3 | 3.1 | 2.1 | 12 |
| 14 | 72 | 12.8 | 47.6 | 133.1 | 24.7 | 3.7 | 2.8 | 28 | 123.7 | 417.8 | 831.5 | 227.3 | 3.4 | 2.0 | 9 |
| 15 | 75 | 15.3 | 58.3 | 134.2 | 29.9 | 3.8 | 2.3 | 25 | 151.1 | 453.2 | 812.1 | 261.6 | 3.0 | 1.8 | 9 |

TABLE V

Film Properties of Examples 8-13 at 1 mil - HDPE processing conditions.

| HDPE | 8 | 9A | 9B | 10A | 10B | 11A | 11B | 12B | 13A | 13B |
|---|---|---|---|---|---|---|---|---|---|---|
| Gels <200 μm | 289 | 82 | 120 | 93 | 80 | 121 | 197 | 433 | 83 | 119 |
| Gels >200 μm | 49 | 49 | 141 | 40 | 42 | 46 | 75 | 121 | 32 | 54 |
| Dart Impact (g) | 173 | 1003 | 936 | 965 | 741 | 1274 | 1128 | 861 | 634 | 978 |
| MD Tear (g) | 41 | 111 | 84 | 108 | 85 | 121 | 91 | 107 | 99 | 82 |
| TD Tear (g) | 473 | 206 | 232 | 310 | 257 | 333 | 296 | 288 | 243 | 249 |
| Haze, % | 43.5 | 86.0 | 85.8 | 83.3 | 84.7 | 68.2 | 66.9 | 69.4 | 78.7 | 80.4 |
| Spencer Impact (J) | 0.51 | 1.94 | 1.91 | 1.88 | 1.85 | 1.86 | 1.85 | 1.82 | 1.86 | 1.87 |

TABLE V-continued

Film Properties of Examples 8-13 at 1 mil - HDPE processing conditions.

| HDPE | 8 | 9A | 9B | 10A | 10B | 11A | 11B | 12B | 13A | 13B |
|---|---|---|---|---|---|---|---|---|---|---|
| Kinetic COF (in/in) | 0.315 | 0.350 | 0.331 | 0.345 | 0.341 | 0.379 | 0.410 | 0.381 | 0.364 | 0378 |
| Static COF (in/in) | 0.334 | 0.401 | 0.378 | 0.438 | 0.416 | 0.480 | 0.464 | 0.441 | 0.401 | 0.440 |
| Oil Shrinkage at 250 F. | | | | | | | | | | |
| MD (%) | 35 | 53 | 53 | 45 | 57 | 52 | 42 | 43 | 40 | 35 |
| TD (%) | 27 | 45 | 42 | 40 | 40 | 42 | 28 | 33 | 27 | 23 |
| Oil Shrinkage at 275 F. | | | | | | | | | | |
| MD (%) | 73 | 65 | 67 | 68 | 65 | 58 | 58 | 67 | 65 | 62 |
| TD (%) | 43 | 55 | 48 | 48 | 45 | 43 | 40 | 52 | 47 | 47 |
| Oil Shrinkage at 300 F. | | | | | | | | | | |
| MD (%) | 80 | 72 | 75 | 70 | 70 | 70 | 70 | 75 | 70 | 70 |
| TD (%) | 43 | 52 | 50 | 50 | 50 | 48 | 45 | 45 | 52 | 47 |

TABLE VI

Film Properties of Examples 8-15 at 1 mil - LLDPE processing conditions.

| LLDPE | 8 | 9A | 9B | 10A | 10B | 11A | 11B | 12B | 13A | 13B | 14B | 15A |
|---|---|---|---|---|---|---|---|---|---|---|---|---|
| Gels <200 μm | 87 | 84 | 3 | 3 | 3 | 35 | 2 | 63 | 6 | 2 | 33 | 21 |
| Gels >200 μm | 43 | 55 | 2 | 1 | 2 | 11 | 2 | 27 | 2 | 1 | 17 | 6 |
| Dart Impact (g) | 53 | 513 | 984 | 378 | 603 | 1285 | 1376 | 685 | 1305 | 1225 | 120 | 109 |
| MD Tear (g) | 35 | 23 | 67 | 40 | 75 | 63 | 97 | 74 | 89 | 62 | 82 | 112 |
| TD Tear (g) | 817 | 678 | 752 | 855 | 874 | 543 | 634 | 688 | 518 | 674 | 466 | 419 |
| Haze, % | 42.1 | 91.3 | 94.1 | 91.9 | 91.0 | 75.6 | 68.9 | 75.3 | 85.7 | 86.1 | 85.9 | 77.9 |
| Spencer Impact (J) | 1.12 | 1.90 | 1.93 | 1.88 | 1.92 | 1.90 | 1.91 | 1.90 | 1.92 | 1.93 | 0.39 | 0.39 |
| Kinetic COF (in/in) | 0.328 | 0.338 | 0.340 | 0.336 | 0.343 | 0.398 | 0.372 | 0.373 | 0.347 | 0.353 | 0.346 | 0.372 |
| Static COF (in/in) | 0.352 | 0.408 | 0.393 | 0.406 | 0.427 | 0.425 | 0.453 | 0.451 | 0.393 | 0.404 | 0.391 | 0.448 |
| Oil Shrinkage at 250 F. | | | | | | | | | | | | |
| MD (%) | 20 | 33 | 33 | 42 | 38 | 57 | 48 | 38 | 35 | 27 | 25 | 30 |
| TD (%) | 8 | 15 | 13 | 13 | 17 | 13 | 12 | 12 | 15 | 13 | 12 | 13 |
| Oil Shrinkage at 275 F. | | | | | | | | | | | | |
| MD (%) | 80 | 80 | 70 | 72 | 75 | 77 | 77 | 73 | 70 | 75 | 75 | 70 |
| TD (%) | 13 | 3 | 13 | 25 | 13 | 10 | 20 | 8 | 28 | 13 | 13 | 13 |
| Oil Shrinkage at 300 F. | | | | | | | | | | | | |
| MD (%) | 84 | 80 | 80 | 77 | 80 | 80 | 80 | 80 | 75 | 80 | 80 | 80 |
| TD (%) | 10 | 15 | 20 | 13 | 15 | 15 | 20 | 15 | 30 | 15 | 20 | 15 |

TABLE VII

Film Properties of Examples 8-15 at 3 mils - LLDPE processing conditions.

| LLDPE | 8 | 9A | 9B | 10A | 10B | 11A |
|---|---|---|---|---|---|---|
| Dart Impact (g) | 253 | >1400 | >1400 | >1400 | >1400 | >1400 |
| MD Tear (g) | 255 | 284 | 415 | 433 | 514 | 520 |
| TD Tear (g) | 1792 | 1201 | 1260 | 1346 | 1293 | 1127 |
| Haze, % | 47.6 | 95.4 | 95.4 | 91.2 | 89.8 | 79.2 |
| Spencer Impact (J) | 1.29 | 2.18 | 2.20 | 2.20 | 2.19 | 2.17 |
| Kinetic COF (in/in) | 0.317 | 0.327 | 0.335 | 0.327 | 0.327 | 0.365 |
| Static COF (in/in) | 0.323 | 0.396 | 0.464 | 0.457 | 0.448 | 0.466 |
| Oil Shrinkage at 250 F. | | | | | | |
| MD (%) | 10 | 40 | 25 | 13 | 20 | 15 |
| TD (%) | 5 | 13 | 12 | 3 | 3 | 5 |

TABLE VII-continued

Film Properties of Examples 8-15 at 3 mils - LLDPE processing conditions.

| Oil Shrinkage at 275 F. | | | | | | |
|---|---|---|---|---|---|---|
| MD (%) | 52 | 53 | 55 | 63 | 62 | 58 |
| TD (%) | 15 | 13 | 10 | 15 | 20 | 15 |
| Oil Shrinkage at 300 F. | | | | | | |
| MD (%) | 75 | 70 | 65 | 65 | 65 | 65 |
| TD (%) | 15 | 25 | 25 | 15 | 25 | 15 |

| LLDPE | 11B | 12B | 13A | 13B | 14B | 15A |
|---|---|---|---|---|---|---|
| Dart Impact (g) | >1400 | >1400 | >1400 | >1400 | 107 | 353 |
| MD Tear (g) | 516 | 565 | 487 | 384 | 433 | 652 |
| TD Tear (g) | 1100 | 1282 | 1165 | 1100 | 900 | 1201 |
| Haze, % | 72.9 | 71.2 | 88.7 | 88.2 | 82.4 | 76.1 |
| Spencer Impact (J) | 2.15 | 2.18 | 2.18 | 2.16 | 0.84 | 0.88 |
| Kinetic COF (in/in) | 0.373 | 0.354 | 0.332 | 0.349 | 0.335 | 0.347 |
| Static COF (in/in) | 0.496 | 0.463 | 0.425 | 0.425 | 0.407 | 0.479 |
| Oil Shrinkage at 250 F. | | | | | | |
| MD (%) | 12 | 18 | 18 | 28 | 40 | 20 |
| TD (%) | 10 | 13 | 8 | 15 | 8 | 8 |
| Oil Shrinkage at 275 F. | | | | | | |
| MD (%) | 65 | 60 | 55 | 60 | 65 | 53 |
| TD (%) | 15 | 15 | 18 | 13 | 12 | 15 |
| Oil Shrinkage at 300 F. | | | | | | |
| MD (%) | 70 | 70 | 70 | 70 | 70 | 57 |
| TD (%) | 20 | 20 | 20 | 17 | 15 | 20 |

We claim:

1. An ethylene/α-olefin copolymer comprising a higher molecular weight component and a lower molecular weight component, wherein the copolymer has:
    a density in a range from about 0.895 to about 0.930 g/cm$^3$;
    a ratio of Mw/Mn in a range from about 8 to about 35;
    a HLMI in a range from about 4 to about 50 g/10 min;
    a ratio of HLMI/MI in a range from about 50 to about 300;
    less than about 0.008 LCB per 1000 total carbon atoms; and
    a number of short chain branches per 1000 total carbon atoms at Mw that is greater than at Mn.

2. The copolymer of claim 1, wherein the copolymer has:
    a Mn in a range from about 10,000 to about 25,000 g/mol; and
    a ratio of Mz/Mw in a range from about 3 to about 12.

3. The copolymer of claim 2, wherein the copolymer is an ethylene/1-butene copolymer, an ethylene/1-hexene copolymer, or an ethylene/1-octene copolymer.

4. The copolymer of claim 3, wherein the copolymer has a density in a range from about 0.905 to about 0.925 g/cm$^3$.

5. The copolymer of claim 4, wherein the copolymer has less than about 0.005 LCB per 1000 total carbon atoms.

6. The copolymer of claim 5, wherein the copolymer has a ratio of HLMI/MI in a range from about 70 to about 250.

7. The copolymer of claim 6, wherein the copolymer is an ethylene/1-hexene copolymer.

8. The copolymer of claim 4, wherein:
    a ratio of the Mw of the higher molecular weight component to the Mw of the lower molecular weight component is in a range from about 5:1 to about 50:1;
    a ratio of Mw/Mn of the higher molecular weight component and a ratio of Mw/Mn of the lower molecular weight component are less than about 5; and
    a ratio of Mz/Mw of the higher molecular weight component and a ratio of Mz/Mw of the lower molecular weight component are less than about 4.

9. The copolymer of claim 8, wherein the copolymer is an ethylene/1-hexene copolymer.

10. An article of manufacture comprising an ethylene/α-olefin copolymer, wherein the copolymer comprises a higher molecular weight component and a lower molecular weight component, and wherein the copolymer is characterized by:
    a density in a range from about 0.895 to about 0.930 g/cm$^3$;
    a ratio of Mw/Mn in a range from about 8 to about 35;
    a HLMI in a range from about 4 to about 50 g/10 min;
    a ratio of HLMI/MI in a range from about 50 to about 300;
    less than about 0.008 LCB per 1000 total carbon atoms; and
    a number of short chain branches per 1000 total carbon atoms at Mw that is greater than at Mn.

11. The article of claim 10, wherein the article is a film.

12. The article of claim 11, wherein the film has a dart impact strength of greater than about 250 g/mil.

13. The article of claim 11, wherein the film has a dart impact strength in a range from about 300 to about 2000 g/mil.

14. The article of claim 13, wherein the copolymer is further characterized by:
    a Mn in a range from about 10,000 to about 25,000 g/mol;
    a ratio of Mz/Mw in a range from about 3 to about 12; and
    a density in a range from about 0.905 to about 0.925 g/cm$^3$.

15. The article of claim 14, wherein the copolymer is an ethylene/1-butene copolymer, an ethylene/1-hexene copolymer, or an ethylene/1-octene copolymer.

16. The article of claim 15, wherein:
    a ratio of the Mw of the higher molecular weight component to the Mw of the lower molecular weight component is in a range from about 5:1 to about 50:1;

a ratio of Mw/Mn of the higher molecular weight component and a ratio of Mw/Mn of the lower molecular weight component are less than about 5; and a ratio of Mz/Mw of the higher molecular weight component and a ratio of Mz/Mw of the lower molecular weight component are less than about 4.

17. The article of claim 16, wherein the copolymer is an ethylene/1-hexene copolymer.

18. A polymerization process, the process comprising:
contacting a catalyst composition with an olefin monomer and an olefin comonomer in a polymerization reactor system under polymerization conditions to produce an olefin copolymer, wherein the catalyst composition comprises a first metallocene compound, a second metallocene compound, an activator, and an optional co-catalyst, wherein the olefin copolymer is characterized by:

a density in a range from about 0.895 to about 0.930 g/cm$^3$;
a ratio of Mw/Mn in a range from about 8 to about 35;
a HLMI in a range from about 4 to about 50 g/10 min;
a ratio of HLMI/MI in a range from about 50 to about 300;
less than about 0.008 LCB per 1000 total carbon atoms; and
a number of short chain branches per 1000 total carbon atoms at Mw that is greater than at Mn.

19. The process of claim 18, wherein:
the polymerization reactor system comprises a slurry reactor, a gas-phase reactor, a solution reactor, or a combination thereof; and
the olefin monomer comprises ethylene, and the olefin comonomer comprises 1-butene, 1-hexene, 1-octene, or a mixture thereof.

20. The process of claim 19, wherein the polymerization reactor system comprises a loop slurry reactor.

21. The process of claim 19, wherein the polymerization reactor system comprises two or more reactors.

22. The process of claim 19, wherein the polymerization conditions comprise a polymerization temperature in a range from about 60° C. to about 100° C.

23. The process of claim 19, wherein:
the activator comprises an activator-support comprising a fluorided solid oxide, a sulfated solid oxide, or a combination thereof; and
the catalyst composition comprises an organoaluminum co-catalyst.

24. The process of claim 18, wherein a weight percentage of comonomer based on the total amount of monomer and comonomer is in a range from about 4 to about 20 wt %.

25. The process of claim 24, wherein:
the polymerization reactor system comprises a loop slurry reactor; and
the olefin copolymer is an ethylene/1-butene copolymer, an ethylene/1-hexene copolymer, or an ethylene/1-octene copolymer.

26. The process of claim 25, wherein:
the polymerization conditions comprise a polymerization temperature in a range from about 60° C. to about 100° C.;
the activator comprises an activator-support comprising a fluorided solid oxide, a sulfated solid oxide, or a combination thereof; and
the catalyst composition comprises an organoaluminum co-catalyst.

* * * * *